US011576114B2

(12) United States Patent
Tu et al.

(10) Patent No.: US 11,576,114 B2
(45) Date of Patent: *Feb. 7, 2023

(54) DATA PACKET PROCESSING METHOD, NETWORK TRAFFIC MANAGEMENT METHOD, APPARATUS, AND SYSTEM

(71) Applicant: Huawei Technologies Co., Ltd., Shenzhen (CN)

(72) Inventors: Yi Tu, Shenzhen (CN); Yulong Zeng, Shenzhen (CN); Xihua Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,800

(22) Filed: Apr. 22, 2019

(65) Prior Publication Data

US 2019/0261263 A1 Aug. 22, 2019

Related U.S. Application Data

(63) Continuation of application No. 15/082,259, filed on Mar. 28, 2016, now Pat. No. 10,313,962, which is a (Continued)

(30) Foreign Application Priority Data

Sep. 26, 2013 (CN) .......................... 201310446322.4

(51) Int. Cl.
*H04W 88/06* (2009.01)
*H04W 48/18* (2009.01)
(Continued)

(52) U.S. Cl.
CPC .......... *H04W 48/18* (2013.01); *H04L 45/245* (2013.01); *H04L 47/193* (2013.01); *H04W 8/04* (2013.01);
(Continued)

(58) Field of Classification Search
CPC . H04W 48/18; H04W 72/0413; H04W 28/08; H04W 88/06; H04L 47/193; H04L 47/14; H04L 45/245
See application file for complete search history.

(56) References Cited

U.S. PATENT DOCUMENTS 8,547,835 B2    10/2013  Haddad et al.
2002/0124104 A1  9/2002  Rappaport et al.
(Continued)

FOREIGN PATENT DOCUMENTS

CN         1556625 A    12/2004
CN       101296157 A    10/2008
(Continued)

OTHER PUBLICATIONS

K.-c. Lan and C.-Y. Li, "Improving TCP performance over an on-board multi-homed network," 2012 IEEE Wireless Communications and Networking Conference (WCNC), 2012, pp. 2961-2966, doi: 10.1109/WCNC.2012.62 (Year: 2012).*
(Continued)

*Primary Examiner* — Thinh D Tran
(74) *Attorney, Agent, or Firm* — Conley Rose, P.C.

(57) ABSTRACT

A data packet processing method, a terminal, and a gateway, where the terminal, determines to transmit network traffic using a first network and a second network simultaneously based on an aggregation flow table, and upon that determination, the terminal sends a quantity of first uplink data packets to the gateway using a first network interface card corresponding to the first network, and sends a quantity of second uplink data packets belonging to the same Transmission Control Protocol (TCP) connection as the first uplink data packets to the gateway using a second network interface card corresponding to the second network, where a source Internet Protocol (IP) address carried in each of the first uplink data packets is the IP address of the first network (Continued)

interface card, and a source IP address carried in each of the second uplink data packets is the IP address of the second network interface card.

20 Claims, 27 Drawing Sheets

Related U.S. Application Data continuation of application No. PCT/CN2014/077993, filed on May 21, 2014.

(51) Int. Cl.
*H04L 45/24* (2022.01)
*H04W 8/04* (2009.01)
*H04L 47/193* (2022.01)
*H04W 72/04* (2009.01)
*H04W 28/08* (2009.01)

(52) U.S. Cl.
CPC .... *H04W 72/0413* (2013.01); *H04W 28/0933* (2020.05); *H04W 88/06* (2013.01)

(56) References Cited

U.S. PATENT DOCUMENTS

| | | |
|---|---|---|
| 2009/0168701 A1 | 7/2009 | White et al. |
| 2010/0128696 A1* | 5/2010 | Fantini ............ H04L 29/12028 370/331 |
| 2011/0296006 A1* | 12/2011 | Krishnaswamy ....... H04L 45/00 709/224 |
| 2011/0314129 A1 | 12/2011 | Rezaiifar et al. |
| 2012/0057511 A1 | 3/2012 | Sivakumar et al. |
| 2012/0077483 A1 | 3/2012 | Abraham et al. |
| 2012/0144062 A1 | 6/2012 | Livet et al. |
| 2012/0207026 A1 | 8/2012 | Sato |
| 2013/0021968 A1 | 1/2013 | Reznik et al. |
| 2013/0065588 A1 | 3/2013 | Roedbro et al. |
| 2013/0286941 A1 | 10/2013 | Lee et al. |
| 2014/0328179 A1 | 11/2014 | Kabakura |
| 2014/0351447 A1* | 11/2014 | Annamalaisami ......................... H04L 65/1069 709/227 |
| 2015/0043336 A1* | 2/2015 | Zhu ................... H04W 28/0268 370/230 |
| 2015/0085781 A1* | 3/2015 | Itoh ........................ H04W 8/26 370/329 |
| 2015/0319270 A1* | 11/2015 | Roeland ............. H04L 61/6013 370/254 |
| 2015/0358857 A1 | 12/2015 | Duan et al. |
| 2017/0155590 A1 | 6/2017 | Dillon et al. |

FOREIGN PATENT DOCUMENTS

| | | |
|---|---|---|
| CN | 102209030 A | 10/2011 |
| CN | 102368725 A | 3/2012 |
| CN | 102656862 A | 9/2012 |
| CN | 102665257 A | 9/2012 |
| CN | 102984784 A | 3/2013 |
| CN | 103125141 A | 5/2013 |
| CN | 103209440 A | 7/2013 |
| CN | 103532878 A | 1/2014 |
| WO | 2012165794 A2 | 12/2012 |
| WO | 2012165809 A2 | 12/2012 |
| WO | 2013105551 A1 | 7/2013 |

OTHER PUBLICATIONS

Partial English Translation and Abstract of Chinese Patent Application No. CN1556625, Nov. 3, 2016, 17 pages.
Partial English Translation and Abstract of Chinese Patent Application No. CN101296157, Nov. 3, 2016, 10 pages.
Partial English Translation and Abstract of Chinese Patent Application No. CN102368725, Nov. 3, 2016, 15 pages.
Partial English Translation and Abstract of Chinese Patent Application No. CN102665257, Nov. 3, 2016, 10 pages.
Partial English Translation and Abstract of Chinese Patent Application No. CN103532878, Mar. 29, 2016, 7 pages.
Yap, K., et al., "Making Use of All the Networks Around Us: A Case Study in Android," CellNet, Aug. 13, 2012, pp. 19-24.
"OpenFlow Switch Specification," Version 1.1.0 Implemented (Wire Protocol 0x02), Feb. 28, 2011, 56 pages.
Foreign Communication From a Counterpart Application, European Application No. 14848996.6, Extended European Search Report dated Aug. 16, 2016, 10 pages.
Foreign Communication From a Counterpart Application, PCT Application No. PCT/CN2014/077993, English Translation of International Search Report dated Aug. 6, 2014, 2 pages.
Foreign Communication From a Counterpart Application, PCT Application No. PCT/CN2014/077993, English Translation of Written Opinion dated Aug. 6, 2014, 13 pages.
Foreign Communication From a Counterpart Application, Chinese Application No. 201310446322.4, Chinese Office Action dated Jan. 22, 2016, 10 pages.
Foreign Communication From a Counterpart Application, Chinese Application No. 201310446322.4, Chinese Notice of Allowance dated Aug. 25, 2016, 2 pages.

* cited by examiner

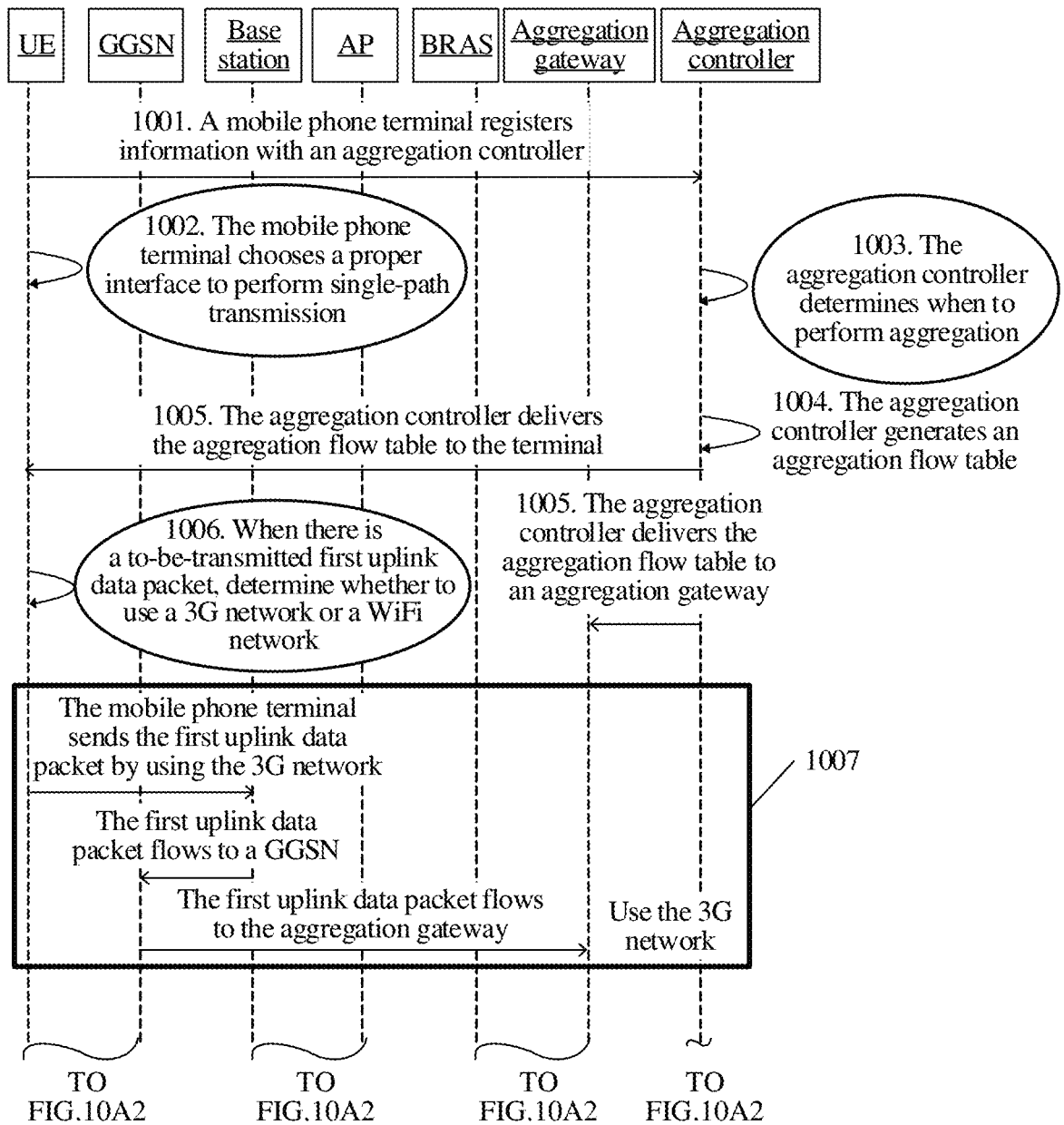
FIG. 10A1

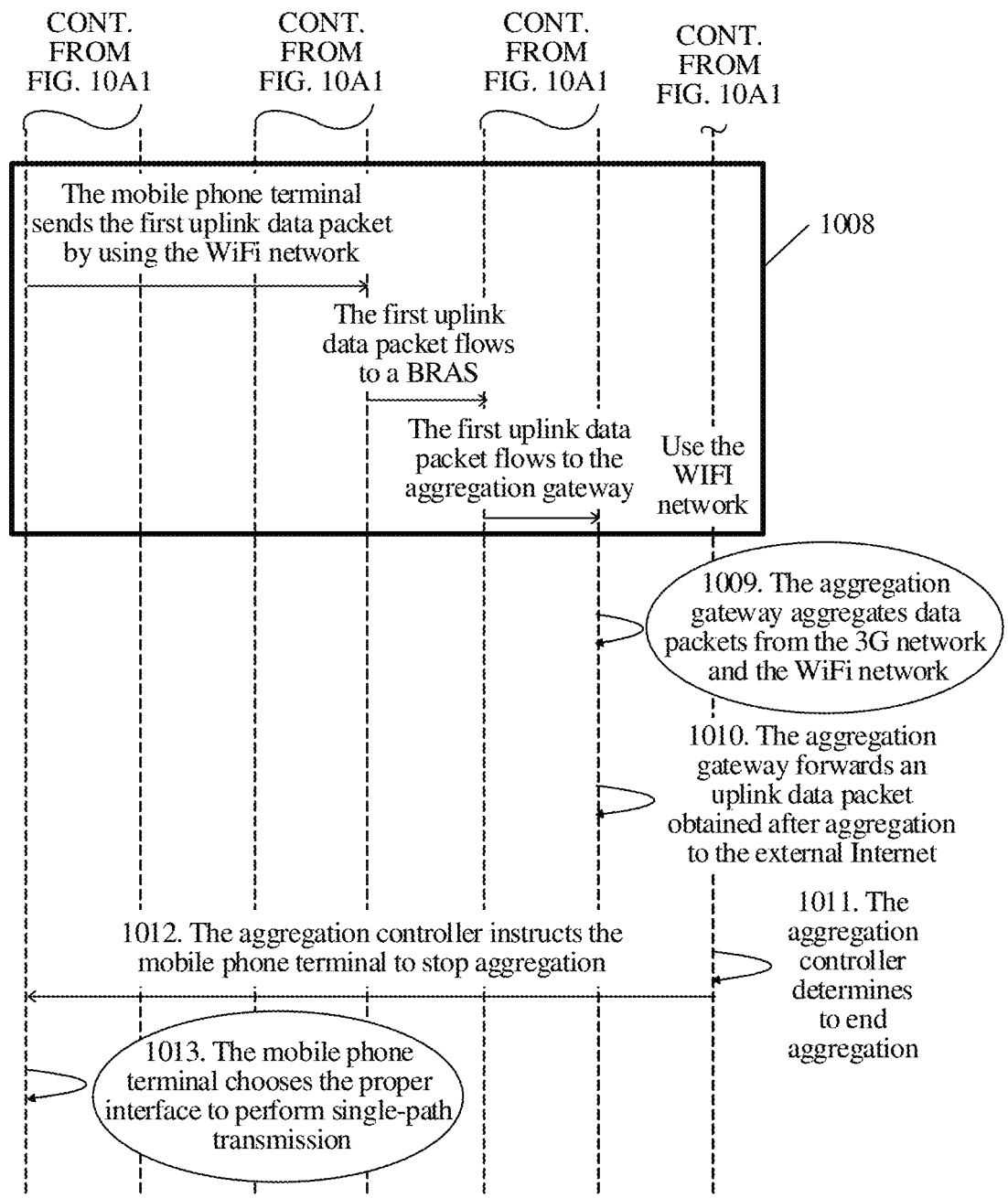
FIG. 10A2

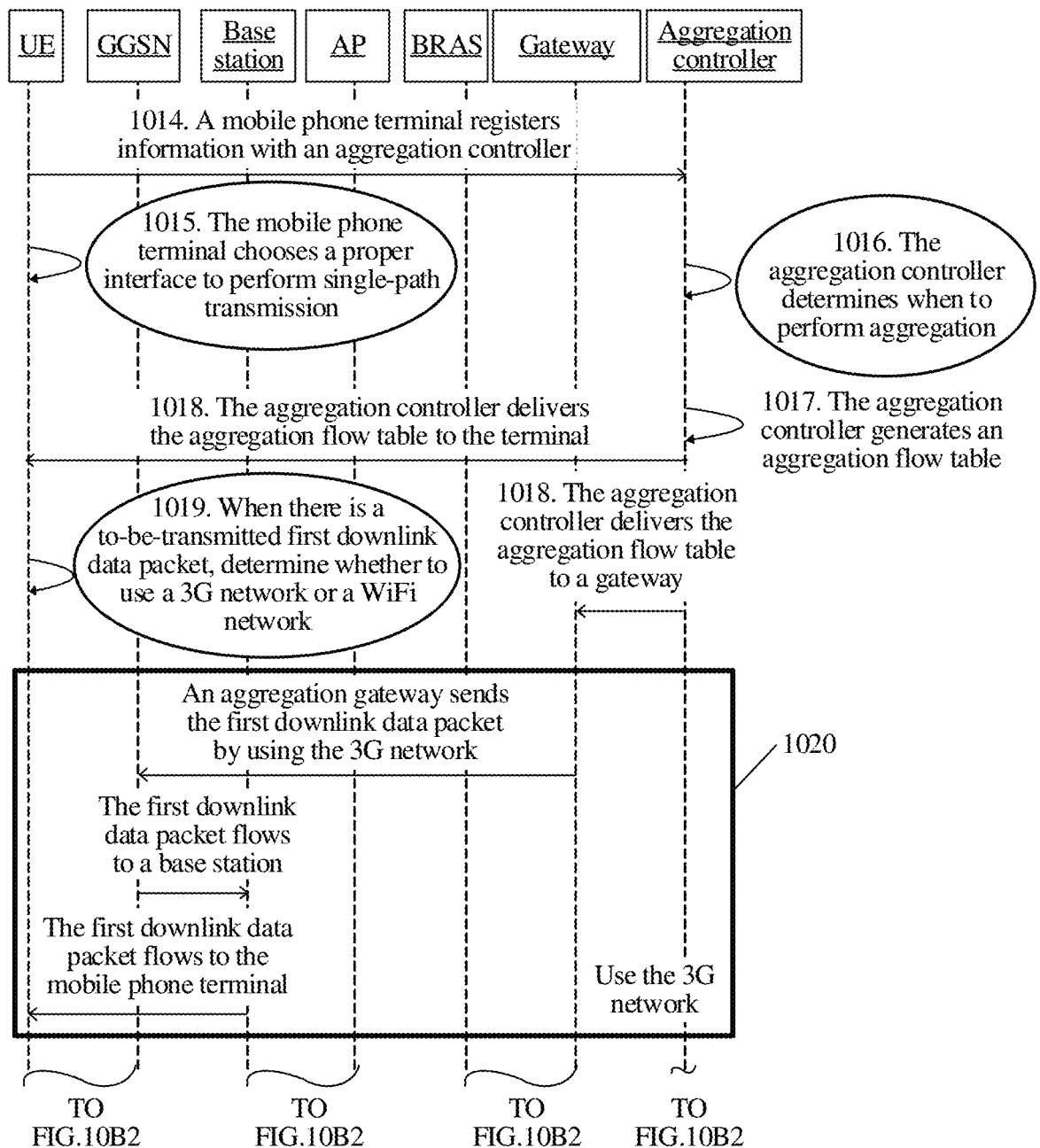
FIG. 10B1

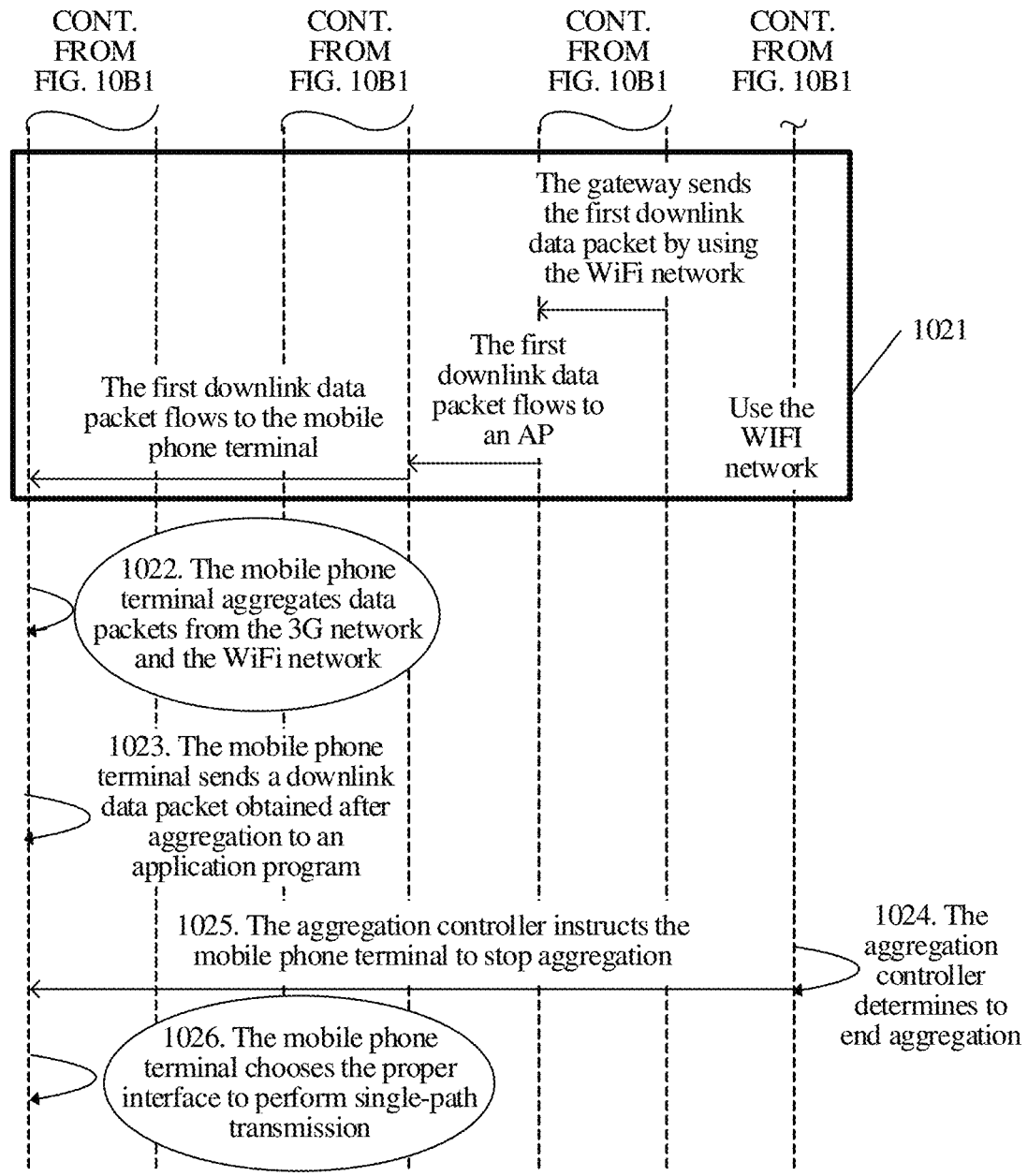
FIG. 10B2

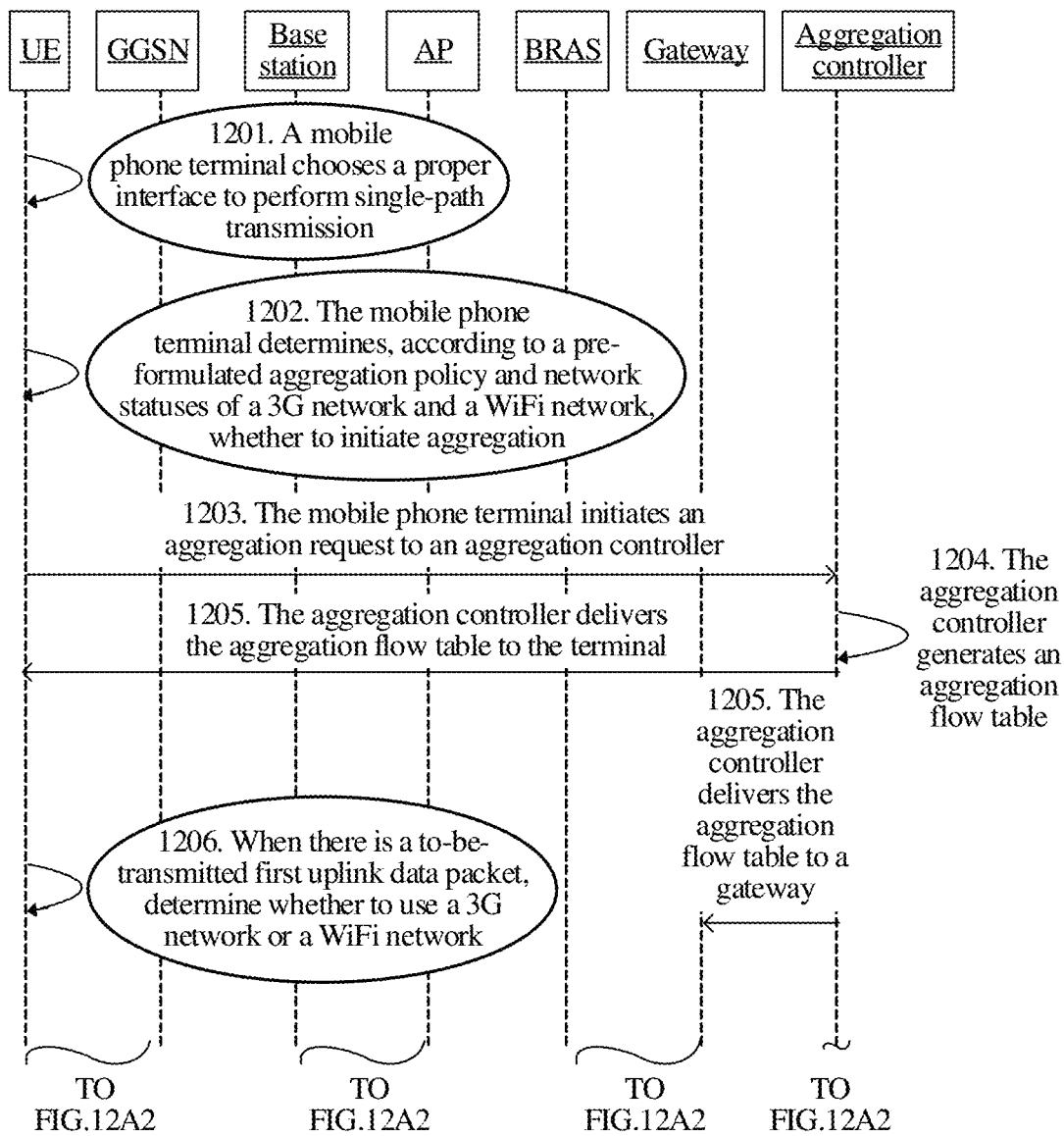
FIG. 12A1

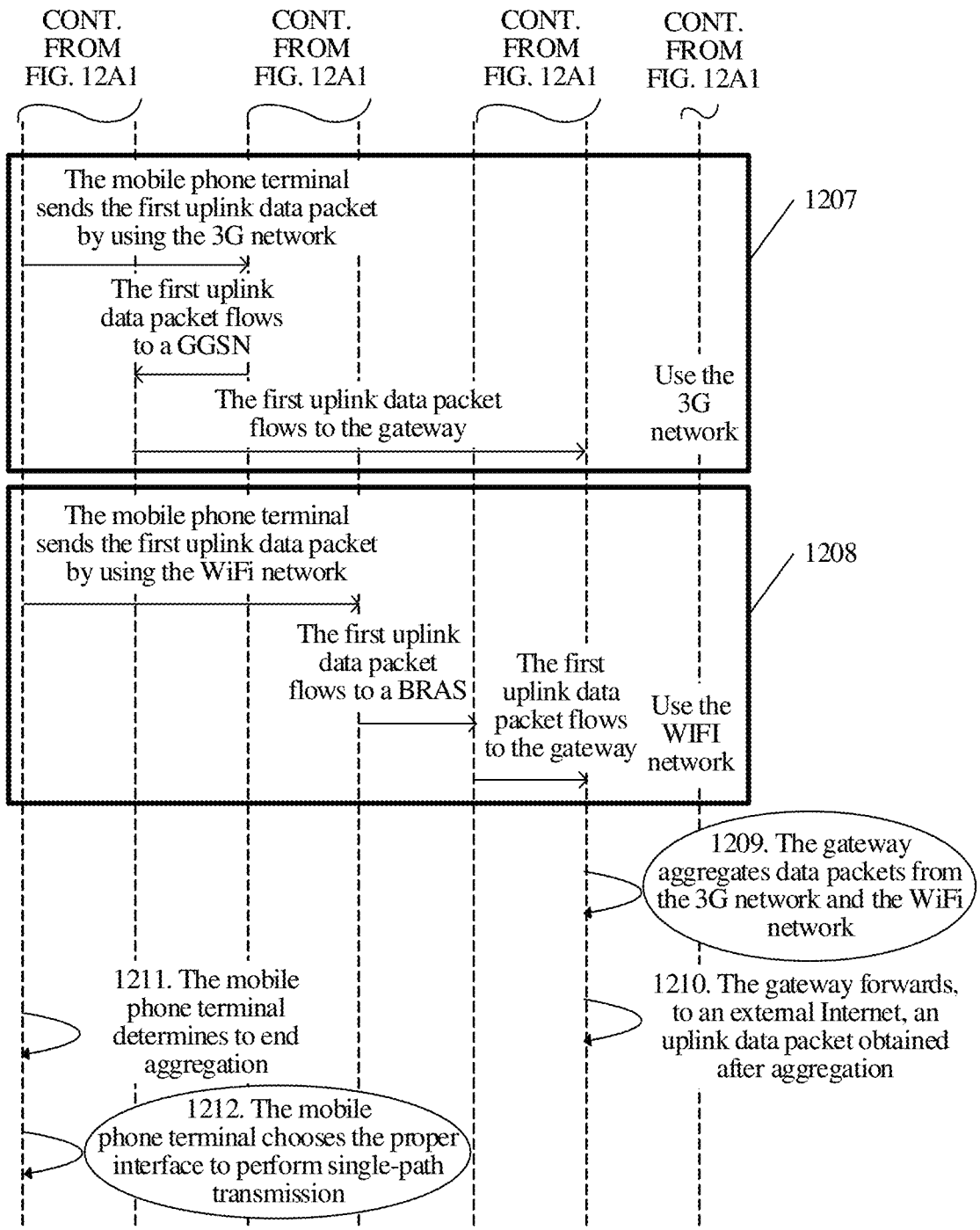
FIG. 12A2

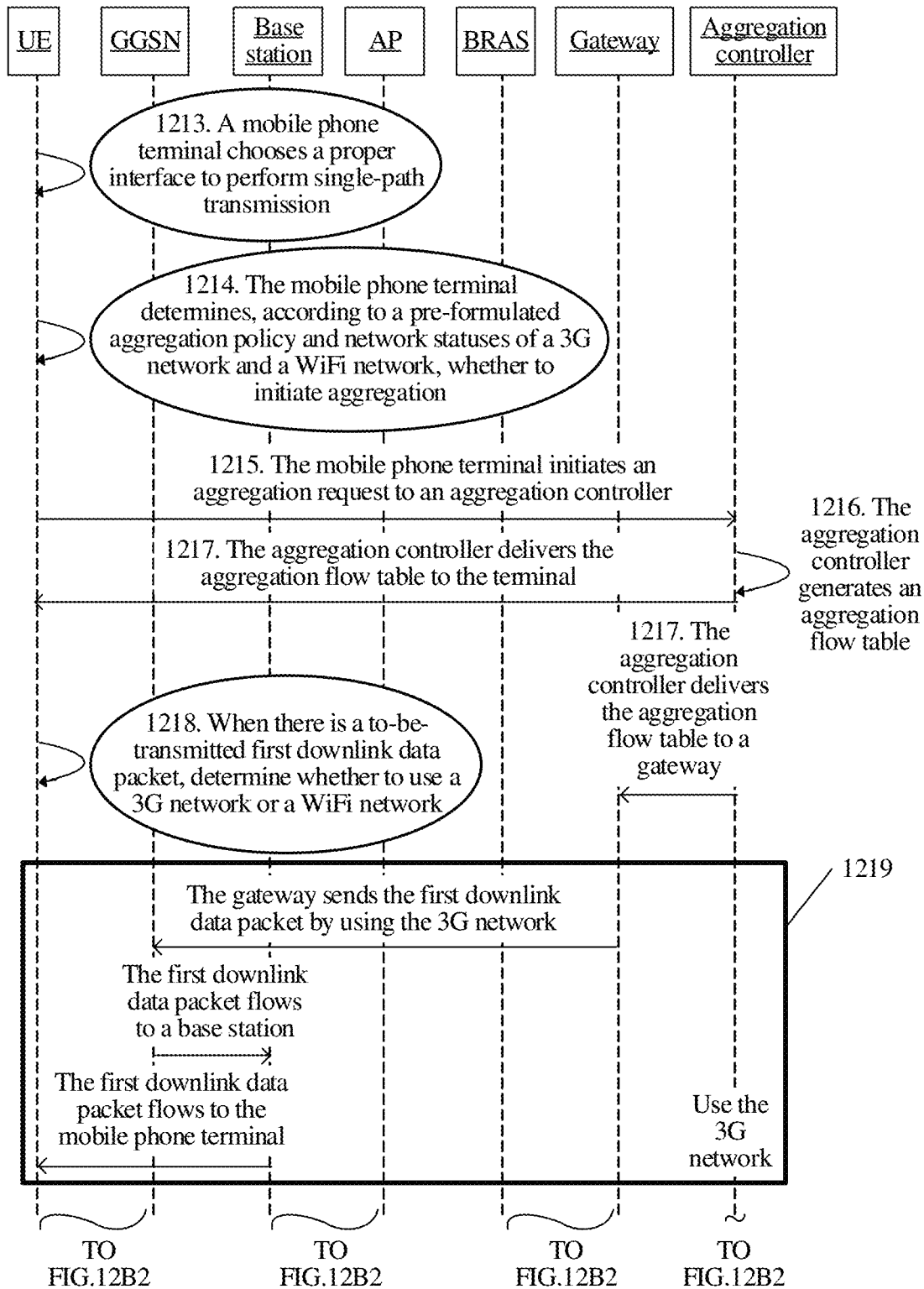
FIG. 12B1

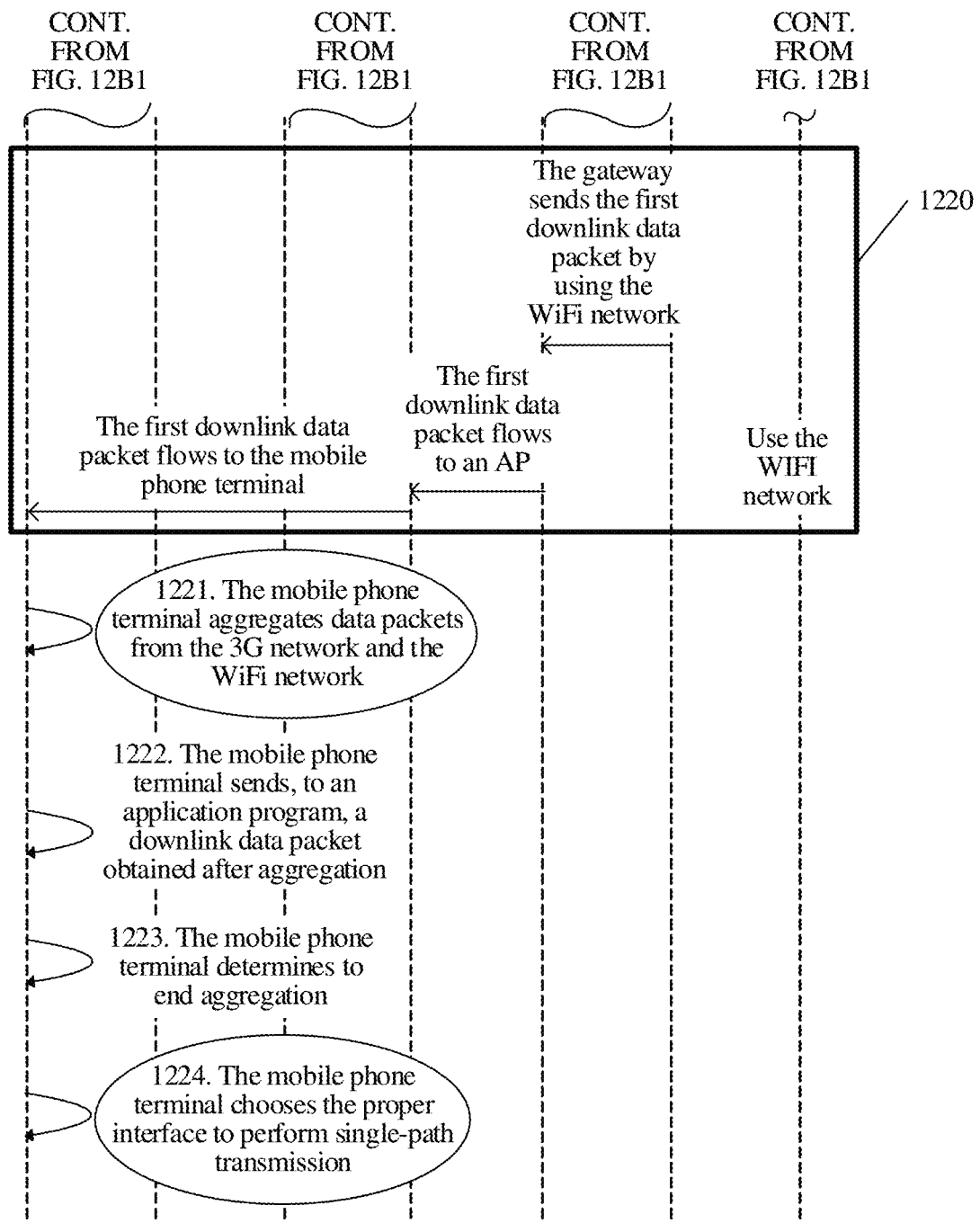
FIG. 12B2

DATA PACKET PROCESSING METHOD, NETWORK TRAFFIC MANAGEMENT METHOD, APPARATUS, AND SYSTEM

CROSS-REFERENCE TO RELATED APPLICATIONS

This application is a continuation of U.S. patent application Ser. No. 15/082,259 filed on Mar. 28, 2016, which is a continuation of International Patent Application No. PCT/CN2014/077993, filed on May 21, 2014, which claims priority to Chinese Patent Application No. 201310446322.4 filed on Sep. 26, 2013. All of the afore-mentioned patent applications are hereby incorporated by reference in their entireties.

TECHNICAL FIELD

The present disclosure relates to the field of communications technologies, and in particular, to a data packet processing method, a network traffic management method, an apparatus, and a system.

BACKGROUND

With popularization of a mobile network and a smartphone, a user more frequently accesses a network using a mobile phone terminal, and frequent access of the user to the mobile network puts a strain on air interface resources. Currently, the mobile terminal can use only one network at a time, but when a high-definition video is browsed using the mobile phone terminal or high-speed downloading is performed on the mobile terminal, bandwidth provided by only one network cannot meet a requirement of the user. Therefore, if the mobile phone terminal can use multiple networks, a problem that bandwidth of one network cannot meet the requirement of the user can be resolved, and a research on using multiple networks by a mobile phone terminal also gradually becomes an inevitable trend of industry development.

Currently, there is a method for using multiple networks in an ANDROID system of a mobile phone terminal, where multiple network interface cards (NICs) are integrated together in the mobile phone terminal, and a virtual NIC is established between an application program and the multiple NICs at a bottom layer by changing a connection service of an ANDROID kernel, to simultaneously manage all physical NICs. When multiple application programs on the mobile phone terminal are connected to a mobile network, a Transmission Control Protocol (TCP) connection is established for each application program, and each TCP connection communicates with an external Internet using a different network. For example, if the mobile phone terminal initiates two download requests in total, two TCP connections are established for the two download requests, where one TCP connection uses a third generation (3G) mobile communications technology NIC and data is downloaded from the external Internet using a 3G network, and the other TCP connection uses a wireless fidelity (WiFi) NIC and data is downloaded from the external Internet using a WiFi network. Data packets that belong to a same TCP connection can be forwarded to a virtual NIC only using a NIC corresponding to the connection, and then the data packets are forwarded to an upper-layer protocol stack by the virtual NIC, and are finally returned to an application layer. In this way, the 3G network and the WiFi network can be used in the system, to achieve an objective of increasing network bandwidth by means of aggregation.

The prior art has the following disadvantages during implementation of the present disclosure. An existing manner is for a case in which one NIC is chosen for a single TCP connection to connect to the external Internet, and multiple networks can be used to communicate with the external Internet only if multiple TCP connections need to be established, that is, the multiple networks can be aggregated only when at least two TCP connections are established for the mobile phone terminal, and the data packets that belong to the same TCP connection still need to be forwarded to the virtual NIC using the NIC corresponding to the connection, and therefore used traffic of each network cannot be controlled. In addition, if only one TCP connection is established, the TCP connection can be connected to the external Internet only by choosing one NIC and using one network, but the multiple networks cannot be used, and therefore, an objective of increasing network bandwidth by means of aggregation cannot be achieved, and the used traffic of each network also cannot be controlled, which is unfavorable for network traffic management.

SUMMARY

Embodiments of the present disclosure provide a data packet processing method, a network traffic management method, an apparatus, and a system. If only one TCP connection is established, multiple networks can be used, and used traffic of each network can be controlled.

The embodiments of the present disclosure provide the following technical solutions.

According to a first aspect, an embodiment of the present disclosure provides a data packet processing method, including acquiring, by a terminal, an aggregation flow table, where the aggregation flow table includes a management policy for managing network traffic of a first network and network traffic of a second network, determining, by the terminal, from the first network and the second network and according to the aggregation flow table, a transmission network used for transmitting a first uplink data packet, where an internet working Internet protocol (IP) address of a first NIC that is in the terminal and that is corresponding to the first network is a first address, and an IP address of a second NIC that is in the terminal and that is corresponding to the second network is a second address, and if the terminal determines to transmit the first uplink data packet using the first network, sending, by the terminal, the first uplink data packet to the first network using the first NIC corresponding to the first network, and forwarding the first uplink data packet to a gateway using the first network, where a source IP address carried when the first uplink data packet is transmitted using the first network is the first address, or if the terminal determines to transmit the first uplink data packet using the second network, sending, by the terminal, the first uplink data packet to the second network using the second NIC corresponding to the second network, and forwarding the first uplink data packet to the gateway using the second network, where a source IP address carried when the first uplink data packet is transmitted using the second network is the second address.

With reference to the first aspect, in a first possible implementation manner of the first aspect, before the acquiring, by a terminal, an aggregation flow table, the method further includes acquiring, by the terminal, network load of the first network and network load of the second network using the first NIC and the second NIC, or using an application program installed on the terminal, and determining, by the terminal according to the network load of the first network, the network load of the second network, and a configured aggregation policy, whether to use a network transmission manner of aggregating the first network with the second network, acquiring, by a terminal, an aggregation flow table includes, if the terminal determines to use the network transmission manner of aggregating the first network with the second network, sending, by the terminal, an aggregation request to an aggregation controller, where there is a communication connection between the aggregation controller and the terminal, and receiving, by the terminal, an aggregation flow table returned after the aggregation controller receives the aggregation request, or if the terminal determines to use the network transmission manner of aggregating the first network with the second network, generating, by the terminal, the aggregation flow table, or if the terminal determines to use the network transmission manner of aggregating the first network with the second network, sending, by the terminal, an aggregation request to the gateway, and receiving an aggregation flow table returned after the gateway receives the aggregation request.

With reference to the first possible implementation manner of the first aspect, in a second possible implementation manner of the first aspect, after the sending the first uplink data packet to the first network using the first NIC corresponding to the first network or the sending the first uplink data packet to the second network using the second NIC corresponding to the second network, the method further includes acquiring, by the terminal, the network load of the first network and the network load of the second network using the first NIC and the second NIC, or the application program installed on the terminal, determining, by the terminal according to the network load of the first network, the network load of the second network, and the aggregation policy, whether to stop using the network transmission manner of aggregating the first network with the second network, and if the terminal determines to stop using the network transmission manner of aggregating the first network with the second network and if there is a to-be-transmitted second uplink data packet, sending, by the terminal using a NIC that is in the terminal and that is corresponding to a transmission network configured using the aggregation policy, the second uplink data packet to the transmission network configured using the aggregation policy, where a source IP address carried by the second uplink data packet is an IP address of the NIC that is in the terminal and that is corresponding to the transmission network configured using the aggregation policy.

With reference to the first aspect or the first or the second possible implementation manner of the first aspect, in a third possible implementation manner of the first aspect, the aggregation flow table includes a network traffic offloading ratio obtained when data packets are sent using the first network and the second network, or a policy used to indicate that a data packet is sent using the first network when the network traffic of the first network is less than a first threshold, or a policy used to indicate that a data packet is sent using the second network when the network traffic of the second network is less than a second threshold.

With reference to the first or the second or the third possible implementation manner of the first aspect, in a fourth possible implementation manner of the first aspect, the aggregation policy includes, when a load ratio of the first network is greater than a third threshold and a load ratio of the second network is less than a fourth threshold, using the network transmission manner of aggregating the first network with the second network, or when the network traffic of the first network is greater than a fifth threshold and the network traffic of the second network is less than a sixth threshold, using the network transmission manner of aggregating the first network with the second network, or when a transmission delay of the first network is greater than a seventh threshold and a transmission delay of the second network is less than an eighth threshold, using the network transmission manner of aggregating the first network with the second network.

According to a second aspect, an embodiment of the present disclosure further provides another data packet processing method, including receiving, by a gateway, a second uplink data packet from a first network or a second network, and acquiring a host identifier and a source port number that are of the second uplink data packet from the second uplink data packet, where the second uplink data packet is a data packet that is sent by a terminal using the first network or the second network determined according to an aggregation flow table, encapsulating, by the gateway, the second uplink data packet and a first uplink data packet into a third uplink data packet, where the first uplink data packet is a data packet that is received by the gateway from the first network or the second network and that has a same host identifier and a same source port number as the second uplink data packet, and sending, by the gateway, the third uplink data packet to the Internet, and sending the third uplink data packet to a target server using the Internet, where a source IP address of the third uplink data packet is a third address, and the third address is an IP address that is allocated by the Internet to the gateway and that is used to receive data from the Internet and send data to the Internet.

With reference to the second aspect, in a first possible implementation manner of the second aspect, before the receiving, by a gateway, a second uplink data packet from a first network or a second network, the method further includes receiving, by the gateway, an aggregation request, where the aggregation request is sent to the gateway after the terminal determines to use a network transmission manner of aggregating the first network with the second network, learning, by the gateway according to the aggregation request, that the terminal determines to use the network transmission manner of aggregating the first network with the second network, and generating an aggregation flow table, where the aggregation flow table includes a management policy for managing network traffic of the first network and network traffic of the second network, and returning, by the gateway to the terminal, the aggregation flow table requested in the aggregation request.

With reference to the first possible implementation manner of the second aspect, in a second possible implementation manner of the second aspect, the aggregation flow table includes a network traffic offloading ratio obtained when data packets are sent using the first network and the second network, or a policy used to indicate that a data packet is sent using the first network when the network traffic of the first network is less than a first threshold, or a policy used to indicate that a data packet is sent using the second network when the network traffic of the second network is less than a second threshold.

According to a third aspect, an embodiment of the present disclosure further provides a network traffic management method, including receiving, by an aggregation controller, respective network load reported by a first network and a second network, determining, by the aggregation controller according to the network load of the first network, the network load of the second network, and a configured aggregation policy, whether to use a network transmission manner of aggregating the first network with the second network, if the aggregation controller determines to use the network transmission manner of aggregating the first network with the second network, generating, by the aggregation controller, an aggregation flow table, where the aggregation flow table includes a management policy for managing network traffic of the first network and network traffic of the second network, and separately sending, by the aggregation controller, the aggregation flow table to a terminal and a gateway, where there is a communication connection between the aggregation controller and each of the terminal and the gateway.

With reference to the third aspect, in a first possible implementation manner of the third aspect, after the separately sending, by the aggregation controller, the aggregation flow table to a terminal and a gateway, the method further includes receiving, by the aggregation controller, the respective network load reported by the first network and the second network, determining, by the aggregation controller according to the network load of the first network, the network load of the second network, and the configured aggregation policy, whether to stop using the network transmission manner of aggregating the first network with the second network, and if the aggregation controller determines to stop using the network transmission manner of aggregating the first network with the second network, instructing, by the aggregation controller, the terminal and the gateway to stop using the network transmission manner of aggregating the first network with the second network.

With reference to the third aspect or the first possible implementation manner of the third aspect, in a second possible implementation manner of the third aspect, the aggregation policy includes, when a load ratio of the first network is greater than a third threshold and a load ratio of the second network is less than a fourth threshold, using the network transmission manner of aggregating the first network with the second network, or when the network traffic of the first network is greater than a fifth threshold and the network traffic of the second network is less than a sixth threshold, using the network transmission manner of aggregating the first network with the second network, or when a transmission delay of the first network is greater than a seventh threshold and a transmission delay of the second network is less than an eighth threshold, using the network transmission manner of aggregating the first network with the second network.

With reference to the third aspect or the first or the second possible implementation manner of the third aspect, in a third possible implementation manner of the third aspect, the aggregation flow table includes a network traffic offloading ratio obtained when data packets are sent using the first network and the second network, or a policy used to indicate that a data packet is sent using the first network when the network traffic of the first network is less than a first threshold, or a policy used to indicate that a data packet is sent using the second network when the network traffic of the second network is less than a second threshold.

According to a fourth aspect, an embodiment of the present disclosure further provides another data packet processing method, including acquiring, by a gateway, an aggregation flow table, where the aggregation flow table includes a management policy for managing network traffic of a first network and network traffic of a second network, receiving, by the gateway, a first downlink data packet sent by a target server using the Internet, determining, by the gateway from the first network and the second network and according to the aggregation flow table, a transmission network used for transmitting the first downlink data packet, and if the gateway determines to transmit the first downlink data packet using the first network, sending, by the gateway, the first downlink data packet to the first network, and forwarding the first downlink data packet to a first NIC in a terminal using the first network, where a destination IP address carried when the first downlink data packet is transmitted using the first network is a first address, and the first address is an IP address of the first NIC that is in the terminal and that is corresponding to the first network, or if the gateway determines to transmit the first downlink data packet using the second network, sending, by the gateway, the first downlink data packet to the second network, and forwarding the first downlink data packet to a second NIC in the terminal using the second network, where a destination IP address carried when the first downlink data packet is transmitted using the second network is a second address, and the second address is an IP address of the second NIC that is in the terminal and that is corresponding to the second network.

With reference to the fourth aspect, in a first possible implementation manner of the fourth aspect, after the sending the first downlink data packet to the first network or the sending the first downlink data packet to the second network, the method further includes acquiring, by the gateway, aggregation end information, where the aggregation end information includes ending use of a network transmission manner of aggregating the first network with the second network, and if there is a to-be-transmitted second downlink data packet, sending, by the gateway using a transmission network configured using a stored aggregation policy, the second downlink data packet to the transmission network configured using the aggregation policy, where a destination IP address carried by the second downlink data packet is an IP address of a NIC that is in the terminal and that is corresponding to the transmission network configured using the aggregation policy.

With reference to the first possible implementation manner of the fourth aspect, in a second possible implementation manner of the fourth aspect, the acquiring, by the gateway, aggregation end information includes receiving, by the gateway, respective network load reported by the first network and the second network, determining, according to the network load of the first network, the network load of the second network, and the configured aggregation policy, whether to stop using the network transmission manner of aggregating the first network with the second network, and if the gateway determines to stop using the network transmission manner of aggregating the first network with the second network, generating the aggregation end information, or receiving, by the gateway, the aggregation end information sent by an aggregation controller or the terminal, where there is a communication connection between the gateway and the aggregation controller.

With reference to the fourth aspect or the first or the second possible implementation manner of the fourth aspect, in a third possible implementation manner of the fourth aspect, the aggregation flow table includes a network traffic offloading ratio obtained when data packets are received using the first network and the second network, or a policy used to indicate that a data packet is received using the first network when the network traffic of the first network is less than a first threshold, or a policy used to indicate that a data packet is received using the second network when the network traffic of the second network is less than a second threshold.

With reference to the fourth aspect or the first or the second or the third possible implementation manner of the fourth aspect, in a fourth possible implementation manner of the fourth aspect, acquiring, by a gateway, an aggregation flow table includes receiving, by the gateway, the aggregation flow table sent by the aggregation controller or the terminal, or receiving, by the gateway, an aggregation request sent by the terminal, and generating the aggregation flow table according to the aggregation request.

According to a fifth aspect, an embodiment of the present disclosure further provides another data packet processing method, including receiving, by a terminal, a second downlink data packet from a first network or a second network, and acquiring a destination port number of the second downlink data packet from the second downlink data packet, where the second downlink data packet is a data packet that is sent by a gateway using the first network or the second network determined according to an aggregation flow table, encapsulating, by the terminal, the second downlink data packet and a first downlink data packet into a third downlink data packet, where the first downlink data packet is a data packet that is received by the terminal from the first network or the second network and that has a same host identifier and a same destination port number as the second downlink data packet, and sending, by the terminal according to a destination port of the third downlink data packet, the third downlink data packet to an application program corresponding to the third downlink data packet.

With reference to the fifth aspect, in a first possible implementation manner of the fifth aspect, before the receiving, by a terminal, a first downlink data packet from a first network or a second network, the method further includes acquiring, by the terminal, network load of the first network and network load of the second network using a first NIC and a second NIC, or using an application program installed on the terminal, where the first NIC is a NIC that is in the terminal and that is corresponding to the first network, and the second NIC is a NIC that is in the terminal and that is corresponding to the second network, determining, by the terminal according to the network load of the first network, the network load of the second network, and a configured aggregation policy, whether to use a network transmission manner of aggregating the first network with the second network, and if the terminal determines to use the network transmission manner of aggregating the first network with the second network, sending, by the terminal, an aggregation request to an aggregation controller such that the aggregation controller generates the aggregation flow table after receiving the aggregation request and sends the aggregation flow table to the gateway, where there is a communication connection between the aggregation controller and the terminal, or if the terminal determines to use the network transmission manner of aggregating the first network with the second network, generating, by the terminal, the aggregation flow table, and sending the aggregation flow table to the gateway.

With reference to the fifth aspect or the first possible implementation manner of the fifth aspect, in a second possible implementation manner of the fifth aspect, after the sending, by the terminal according to a destination port of the third downlink data packet, the third downlink data packet to an application program corresponding to the third downlink data packet, the method further includes acquiring, by the terminal, the network load of the first network and the network load of the second network using the first NIC and the second NIC, or the application program installed on the terminal, determining, by the terminal according to the network load of the first network, the network load of the second network, and the configured aggregation policy, whether to stop using the network transmission manner of aggregating the first network with the second network, if the terminal determines to stop using the network transmission manner of aggregating the first network with the second network, initiating, by the terminal, an end request to the aggregation controller such that the aggregation controller generates aggregation end information and sends the aggregation end information to the terminal and the gateway, where the aggregation end information includes ending the use of the network transmission manner of aggregating the first network with the second network, receiving, by the terminal using a transmission network configured using the aggregation policy, a fourth downlink data packet forwarded by the gateway, and sending, by the terminal, the fourth downlink data packet to an application program corresponding to the fourth downlink data packet.

According to a sixth aspect, an embodiment of the present disclosure further provides a terminal, including modules for performing the steps of the method as described in the first aspect, or the fifth aspect, or any one of the possible implementation of the first aspect, or any one of the possible implementation of the fifth aspect.

According to a seventh aspect, an embodiment of the present disclosure further provides a gateway, including modules for performing the steps of the method as described in the second aspect, or the fourth aspect, or any one of the possible implementation of the second aspect, or any one of the possible implementation of the fourth aspect.

According to an eighth aspect, an embodiment of the present disclosure further provides an aggregation controller, including modules for performing the steps of the method as described in the third aspect, or any one of the possible implementation of the third aspect.

According to an eleventh aspect, an embodiment of the present disclosure further provides a data packet processing system, including the terminal according to any possible implementation manner of the foregoing sixth aspect, the gateway according to any possible implementation manner of the foregoing seventh aspect, and the aggregation controller according to any possible implementation manner of the foregoing eighth aspect, where the terminal accesses the first network and the second network, and the aggregation controller is separately connected to the terminal and the gateway in a communication-capable manner.

It can be learned from the foregoing technical solutions that the embodiments of the present disclosure have the following advantages.

In the embodiments of the present disclosure, a terminal first acquires an aggregation flow table, where the aggregation flow table includes a management policy for managing network traffic of a first network and network traffic of a second network, for a to-be-transmitted first uplink data packet, the terminal may choose, according to the aggregation flow table, the first network to transmit the first uplink data packet to a gateway, or the terminal may choose, according to the aggregation flow table, the second network to transmit the first uplink data packet to a gateway. After the gateway receives a second uplink data packet, the gateway encapsulates the second uplink data packet and the first uplink data packet into a third uplink data packet, where the first uplink data packet is a data packet that is received by the gateway from the first network and the second network and that has a same host identifier and a same source port number as the second uplink data packet, then the gateway sends the third uplink data packet to the Internet. Because the terminal may choose a transmission network for a single uplink data packet according to the aggregation flow table without being limited to a method in the prior art that data can be transmitted using multiple networks only when multiple TCP connections are established, used traffic of each network can be flexibly controlled according to the aggregation flow table, and even if only one TCP connection is established, a transmission network can also be chosen for a single uplink data packet such that an objective of using multiple networks is achieved, network bandwidth can be increased by means of aggregation, the used traffic of each network can be controlled according to the aggregation flow table, and management of network traffic is implemented.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons skilled in the art may still derive other drawings from these accompanying drawings.

FIG. 10A1 and FIG. 10A2 are a schematic diagram of a procedure in which a terminal sends a data packet when an aggregation controller actively initiates aggregation according to an embodiment of the present disclosure;

FIG. 10B1 and FIG. 10B2 are a schematic diagram of a procedure in which a terminal receives a data packet when an aggregation controller actively initiates aggregation according to an embodiment of the present disclosure;

FIG. 12A1 and FIG. 12A2 are a schematic diagram of a procedure in which a terminal sends a data packet when another aggregation controller passively initiates aggregation according to an embodiment of the present disclosure;

FIG. 12B1 and FIG. 12B2 are a schematic diagram of a procedure in which a terminal receives a data packet when another aggregation controller passively initiates aggregation according to an embodiment of the present disclosure;

DESCRIPTION OF EMBODIMENTS

Figure 1:
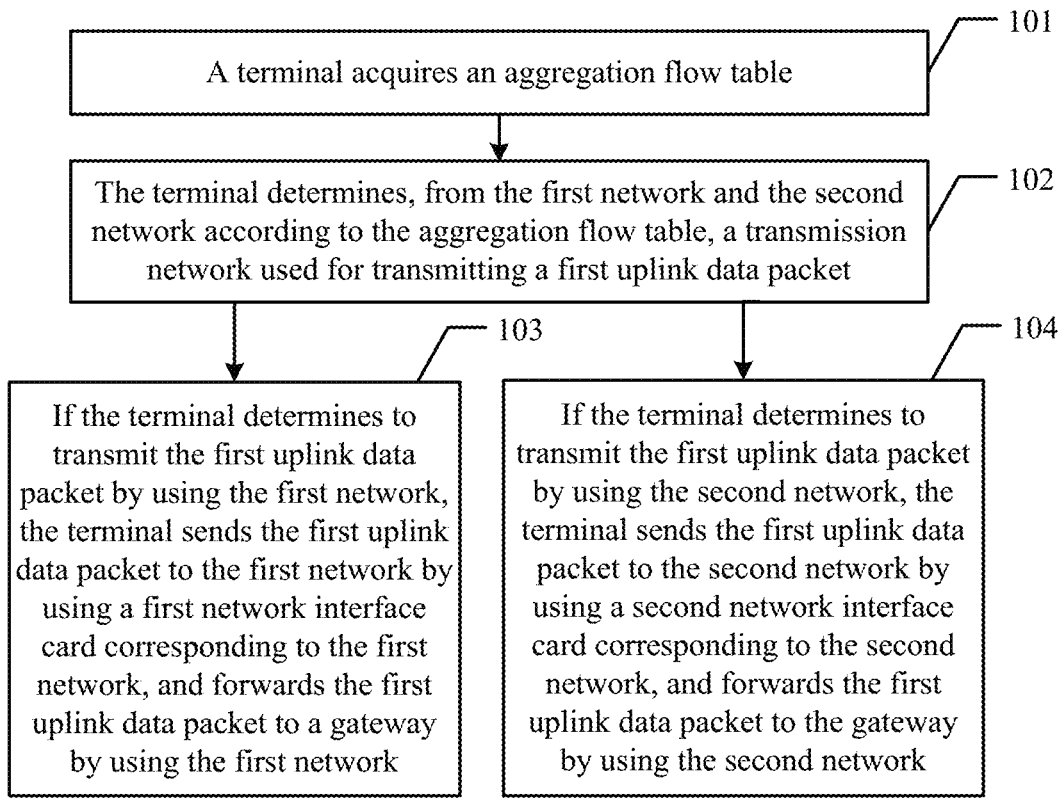
FIG. 1 is a schematic flowchart diagram of a procedure of a data packet processing method according to an embodiment of the present disclosure.

Embodiments of the present disclosure provide a data packet processing method, a network traffic management method, an apparatus, and a system. If only one TCP connection is established, multiple networks can be used, and used traffic of each network can be controlled.

To make the disclosure objectives, features, and advantages of the present disclosure clearer and more comprehensible, the following clearly describes the technical solutions in the embodiments of the present disclosure with reference to the accompanying drawings in the embodiments of the present disclosure. The embodiments described in the following are merely a part rather than all of the embodiments of the present disclosure. All other embodiments obtained by persons skilled in the art based on the embodiments of the present disclosure shall fall within the protection scope of the present disclosure.

Details are separately described in the following.

Terms, such as "first", "second", described in the specification, accompanying drawings, and claims of the present disclosure, and "third" and "fourth" that may occur are a naming manner used to distinguish similar objects, and are not necessarily used to describe a specific sequence or order. It should be understood that the terms may be used interchangeably in a proper case, to describe differentiated processing manners for processing objects of a same type in the embodiments of the present disclosure.

An embodiment of a data packet processing method in the present disclosure is implemented based on a terminal side, and may include acquiring, by a terminal, an aggregation flow table, where the aggregation flow table includes a management policy for managing network traffic of a first network and network traffic of a second network, determining, by the terminal, from the first network and the second network and according to the aggregation flow table, a transmission network used for transmitting a first uplink data packet, where an IP address of a first NIC that is in the terminal and that is corresponding to the first network is a first address, and an IP address of a second NIC that is in the terminal and that is corresponding to the second network is a second address, and if the terminal determines to transmit the first uplink data packet using the first network, sending, by the terminal, the first uplink data packet to the first network using the first NIC corresponding to the first network, and forwarding the first uplink data packet to a gateway using the first network, where a source IP address carried when the first uplink data packet is transmitted using the first network is the first address, or if the terminal determines to transmit the first uplink data packet using the second network, sending, by the terminal, the first uplink data packet to the second network using the second NIC corresponding to the second network, and forwarding the first uplink data packet to the gateway using the second network, where a source IP address carried when the first uplink data packet is transmitted using the second network is the second address.

Referring to FIG. 1, a data packet processing method provided in an embodiment of the present disclosure may include the following steps.

Step 101: A terminal acquires an aggregation flow table.

The aggregation flow table includes a management policy for managing network traffic of a first network and network traffic of a second network, and the first network and the second network may be transmission networks of different standards.

In some embodiments of the present disclosure, the first network may be a cellular network such as a second generation (2G) mobile communications technology network, a 3G network, or a fourth generation (4G) mobile communications technology network, and the second network may be a wireless local area network (WLAN). Certainly, the first network may also be a WLAN, and the second network may also be a cellular network such as a 2G network, an 3G network, or a 4G network.

The cellular network in embodiments of the present disclosure may be a general packet radio service (GPRS) network, a global system for mobile communications (GSM) network, a universal mobile telecommunications system (UMTS) network, a long term evolution (LTE) network, or a worldwide interoperability for microwave access (WiMax) network, and certainly, may be another cellular network.

The WLAN described in the embodiments of the present disclosure may be a WiFi network or another WLAN.

In some embodiments of the present disclosure, before the terminal acquires the aggregation flow table, the terminal may acquire network load of the first network and network load of the second network using a first NIC and a second NIC, or using an application program installed on the terminal, and the terminal determines, according to the network load of the first network, the network load of the second network, and a configured aggregation policy, whether to use a network transmission manner of aggregating the first network with the second network.

Step 101 may further include, if the terminal determines to use the network transmission manner of aggregating the first network with the second network, the terminal sends an aggregation request to an aggregation controller, where there is a communication connection between the aggregation controller and the terminal, and the terminal receives an aggregation flow table returned after the aggregation controller receives the aggregation request, or if the terminal determines to use the network transmission manner of aggregating the first network with the second network, the terminal generates the aggregation flow table, or if the terminal determines to use the network transmission manner of aggregating the first network with the second network, the terminal sends an aggregation request to a gateway, and receives an aggregation flow table returned after the gateway receives the aggregation request.

The configured aggregation policy may be generated by a user and sent to the terminal, or a user may write the aggregation policy into the terminal, and the terminal configures the aggregation policy as a configuration file, where a problem to be resolved by the aggregation policy is whether to initiate aggregation of the first network and the second network. For example, the aggregation policy may be configured as, when a load ratio of the first network is greater than a third threshold and a load ratio of the second network is less than a fourth threshold, using the network transmission manner of aggregating the first network with the second network, or when the network traffic of the first network is greater than a fifth threshold and the network traffic of the second network is less than a sixth threshold, using the network transmission manner of aggregating the first network with the second network, or when a transmission delay of the first network is greater than a seventh threshold and a transmission delay of the second network is less than an eighth threshold, using the network transmission manner of aggregating the first network with the second network.

Values of the third threshold, the fourth threshold, the fifth threshold, the sixth threshold, the seventh threshold, and the eighth threshold may be flexibly set according to specific network environment parameters, or may be set according to specific actual requirements of the user. For example, a value of the fifth threshold that is set for the network traffic of the first network may be set according to an upper limit of monthly total traffic, actually used by the user, of the first network.

It can be learned based on the description of the foregoing implementation manner that the terminal acquires the aggregation flow table in multiple manners. For example, the terminal may request the aggregation controller to deliver the aggregation flow table, the terminal may generate the aggregation flow table, or the terminal may request the gateway to deliver the aggregation flow table. If the terminal requests the aggregation controller to deliver the aggregation flow table, after the aggregation controller receives the aggregation request sent by the terminal, the aggregation controller may generate the aggregation flow table according to the collected network load of the first network, the collected network load of the second network, and the configured aggregation policy. The generating, by the aggregation controller, the aggregation flow table may be triggered according to the aggregation request initiated by the terminal, and it may be considered that the aggregation controller passively initiates aggregation. In an actual application, the aggregation controller may also not need to trigger, according to the aggregation request initiated by the terminal, a process of generating the aggregation flow table, but after collecting the network load of the first network and the network load of the second network, the aggregation controller actively generates the aggregation flow table and delivers the aggregation flow table to the terminal. In this application scenario, the aggregation controller may actively deliver the aggregation flow table without requiring the terminal to initiate the aggregation request, and the terminal may execute a subsequent procedure after receiving the aggregation flow table. In an actual application, there are many methods for the terminal to acquire the aggregation flow table. For example, the user directly generates the aggregation flow table according to network load statuses of the first network and the second network, and then sends the aggregation flow table to the terminal such that the terminal can acquire the aggregation flow table. For another example, the user directly allocates the network load statuses of the first network and the second network, and the preset aggregation policy to the terminal, the terminal writes the network load statuses of the first network and the second network, and the preset aggregation policy into a configuration file, and the terminal generates the aggregation flow table according to these configuration files.

The aggregation flow table includes the management policy for managing the network traffic of the first network and the network traffic of the second network, a problem to be resolved by the aggregation flow table is how to use the first network and the second network if the first network is to be aggregated with the second network, and there may be multiple specific implementation manners of the aggregation flow table. For example, the aggregation flow table includes a network traffic offloading ratio obtained when data packets are sent using the first network and the second network, or a policy used to indicate that a data packet is sent using the first network when the network traffic of the first network is less than a first threshold, or a policy used to indicate that a data packet is sent using the second network when the network traffic of the second network is less than a second threshold. The network traffic offloading ratio is an offloading ratio obtained when data packets are sent using the first network and the second network. For example, a network traffic offloading ratio of a 3G network to a WiFi network is 1:2, and when data packets are to be sent using the 3G network and the WiFi network, it can be determined, according to this offloading ratio 1:2, to choose which one of the two networks to send a data packet. For another example, network traffic of the 3G network is limited, and when the network traffic of the 3G network exceeds the first threshold, a data packet is sent only using the WiFi network, and therefore, precise management of network traffic can be implemented. Certainly, this embodiment of the present disclosure is not limited to a manner of the foregoing example. Values of the first threshold and the second threshold may be flexibly set according to specific network environment parameters, or may be set according to specific actual requirements of the user. For example, a value of the first threshold that is set for the network traffic of the first network may be set according to an upper limit of limited traffic, used by the user, of the first network.

Step 102: The terminal determines, from the first network and the second network and according to the aggregation flow table, a transmission network used for transmitting a first uplink data packet.

An IP address of the first NIC that is in the terminal and that is corresponding to the first network is a first address, and an IP address of the second NIC that is in the terminal and that is corresponding to the second network is a second address.

In this embodiment of the present disclosure, the terminal may manage the first NIC and the second NIC in a manner of setting a virtual bridge, for example, a virtual bridge may be set in the terminal to manage the first NIC and the second NIC.

The address (for example, the first address or the second address) mentioned in this embodiment of the present disclosure may be an IP address, an address of another type, or the like.

In some embodiments of the present disclosure, for multiple transmission networks accessed by the terminal, one NIC is disposed in the terminal for each transmission network, and a virtual bridge used for managing multiple NICs is further set in the terminal, where a source IP address of the to-be-transmitted first uplink data packet in the terminal is an IP address of the virtual bridge, and the IP address of the virtual bridge that is set in the terminal generally remains unchanged. For example, when the terminal separately accesses the 3G network (which may refer to the first network) and the WiFi network (which may refer to the second network), a 3G NIC and a WiFi NIC may be separately disposed in the terminal, and a virtual bridge used for managing the 3G NIC and the WiFi NIC is set in the terminal. If the source IP address of the first uplink data packet is an IP address of the virtual bridge, an IP address of the 3G NIC is the first address, and an IP address of the WiFi NIC is the second address.

In the following, descriptions are provided using the network traffic offloading ratio obtained when the data packets are sent using the first network and the second network as an example of the aggregation flow table. For example, if a network traffic offloading ratio of the 3G network to the WiFi network in the aggregation flow table is 1:2, and a current network traffic offloading ratio that is of the 3G network to the WiFi network and that is reported by the terminal using the 3G NIC and the WiFi NIC is 1:3, the terminal preferably chooses the 3G network when choosing the transmission network for the first uplink data packet, to change the current network traffic offloading ratio of the 3G network to the WiFi network, and therefore, determining, from the first network and the second network according to the aggregation flow table, the transmission network used for transmitting the first uplink data packet can be implemented.

After the transmission network is chosen for the first uplink data packet in step 102, if it is determined to transmit the first uplink data packet using the first network, step 103 may be executed, and if it is determined to transmit the first uplink data packet using the second network, step 104 may be executed, which are separately described in detail in the following.

Step 103: If the terminal determines to transmit the first uplink data packet using the first network, the terminal sends the first uplink data packet to the first network using a first NIC corresponding to the first network, and forwards the first uplink data packet to a gateway using the first network.

A source IP address carried when the first uplink data packet is transmitted using the first network is the first address.

The first network is connected to the gateway in a communication-capable manner. If the terminal chooses the first network to transmit the first uplink data packet, and if the virtual bridge used for managing the first NIC and the second NIC is set in the terminal, the terminal changes the source IP address of the first uplink data packet into a first address of the first NIC before sending the first uplink data packet using the first NIC, sends the first uplink data packet to the first network after changing the IP address, and forwards the first uplink data packet to the gateway using the first network.

Step 104: If the terminal determines to transmit the first uplink data packet using the second network, the terminal sends the first uplink data packet to the second network using a second NIC corresponding to the second network, and forwards the first uplink data packet to the gateway using the second network.

A source IP address carried when the first uplink data packet is transmitted using the second network is the second address.

The second network is connected to the gateway in a communication-capable manner. If the terminal chooses the second network to transmit the first uplink data packet, and if the virtual bridge used for managing the first NIC and the second NIC is set in the terminal, the terminal changes the source IP address of the first uplink data packet into a second address of the second NIC before sending the first uplink data packet using the second NIC, sends the first uplink data packet to the second network after changing the IP address, and forwards the first uplink data packet to the gateway using the second network.

In addition, the forwarding the first uplink data packet to the gateway using the first network or the forwarding the first uplink data packet to the gateway using the second network mentioned in the embodiments of the present disclosure means that forwarding is completed by a network side device of the first network or a network side device of the second network, where the network side device may be an access network device of a cellular network or a WLAN. For example, the network side device may be a base station, a base station controller, an radio network controller (RNC), a data gateway, or another network side device.

In some embodiments of the present disclosure, after sending the first uplink data packet to the first network using a first NIC corresponding to the first network or the sending the first uplink data packet to the second network using a second NIC corresponding to the second network, this embodiment of the present disclosure may further include the following manner. Acquiring, by the terminal, the network load of the first network and the network load of the second network using the first NIC and the second NIC, or the application program installed on the terminal, determining, by the terminal according to the network load of the first network, the network load of the second network, and the configured aggregation policy, whether to stop using the network transmission manner of aggregating the first network with the second network, and if the terminal determines to stop using the network transmission manner of aggregating the first network with the second network and if there is a to-be-transmitted second uplink data packet, sending, by the terminal using a NIC that is in the terminal and that is corresponding to a transmission network configured using the aggregation policy, the second uplink data packet to the transmission network configured using the aggregation policy, where a source IP address carried by the second uplink data packet is an IP address of the NIC that is in the terminal and that is corresponding to the transmission network configured using the aggregation policy.

That is, the terminal may determine, using the network load of the first network, the network load of the second network, and the configured aggregation policy, whether to end aggregation, and if the terminal initiates ending of aggregation, the terminal may choose, according to the configured aggregation policy, a transmission network to perform single-path transmission such that an existing implementation manner in which the terminal uses one network to transmit a data packet can be compatible in the terminal. The aggregation policy may indicate a transmission network that is used, after aggregation ends, to transmit the data packet.

It can be learned from the foregoing description that, a terminal first acquires an aggregation flow table, where the aggregation flow table includes a management policy for managing network traffic of a first network and network traffic of a second network, for a to-be-transmitted first uplink data packet, the terminal may choose, according to the aggregation flow table, the first network to transmit the first uplink data packet to a gateway, or the terminal may choose, according to the aggregation flow table, the second network to transmit the first uplink data packet to a gateway. Because the terminal may choose a transmission network for a single uplink data packet according to the aggregation flow table without being limited to a method in the prior art that data can be transmitted using multiple networks only when multiple TCP connections are established, used traffic of each network can be flexibly controlled according to the aggregation flow table, and even if only one TCP connection is established, a transmission network can also be chosen for a single uplink data packet such that an objective of using multiple networks is achieved, network bandwidth can be increased by means of aggregation, the used traffic of each network can be controlled according to the aggregation flow table, and management of network traffic is implemented.

In addition, after the terminal initiates ending of aggregation, the terminal may choose, according to a configured aggregation policy, a transmission network to perform single-path transmission such that an existing implementation manner in which the terminal uses one network to transmit a data packet can be compatible in the terminal.

Another embodiment of a data processing method in the present disclosure is implemented based on a gateway side, and may include receiving, by a gateway, a second uplink data packet from a first network or a second network, and acquiring a host identifier and a source port number that are of the second uplink data packet from the second uplink data packet, where the second uplink data packet is a data packet that is sent by a terminal using the first network or the second network determined according to an aggregation flow table, encapsulating, by the gateway, the second uplink data packet and a first uplink data packet into a third uplink data packet, where the first uplink data packet is a data packet that is received by the gateway from the first network or the second network and that has a same host identifier and a same source port number as the second uplink data packet, and sending, by the gateway, the third uplink data packet to the Internet, and sending the third uplink data packet to a target server using the Internet, where a source IP address of the third uplink data packet is a third address, and the third address is an IP address that is allocated by the Internet to the gateway and that is used to receive data from the Internet and send data to the Internet.

Figure 2:
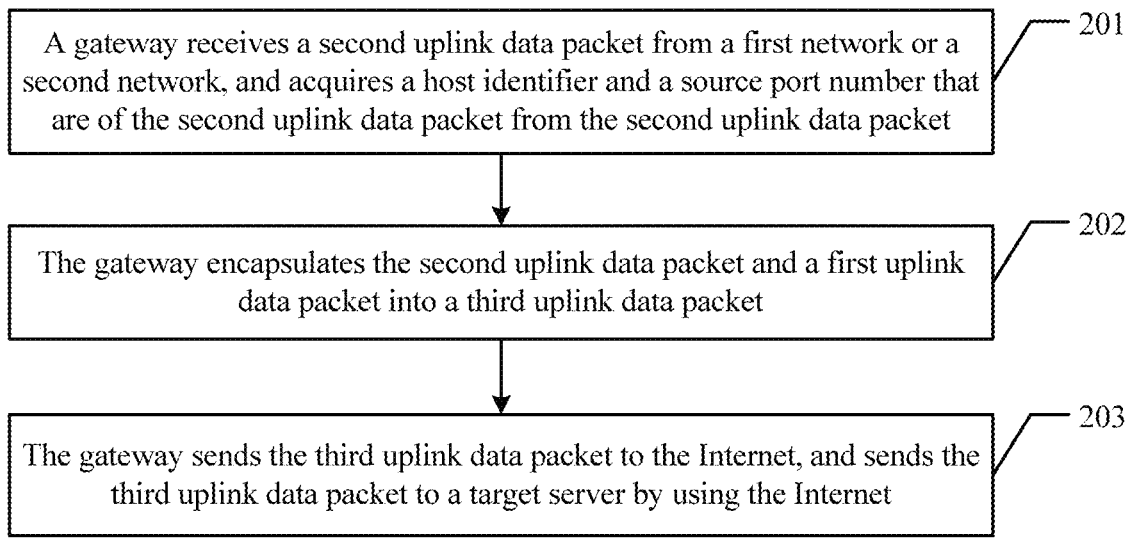
FIG. 2 is a schematic flowchart diagram of a procedure of another data packet processing method according to an embodiment of the present disclosure.

Referring to FIG. 2, a data packet processing method provided in another embodiment of the present disclosure may include the following steps.

Step 201: A gateway receives a second uplink data packet from a first network or a second network, and acquires a host identifier and a source port number that are of the second uplink data packet from the second uplink data packet.

The second uplink data packet is a data packet that is sent by a terminal using the first network or the second network determined according to an aggregation flow table.

In some embodiments of the present disclosure, before the gateway receives the second uplink data packet from the first network or the second network in step 201, the method in this embodiment of the present disclosure may further include receiving, by the gateway, an aggregation request, where the aggregation request is sent by the terminal to the gateway after the terminal determines to use a network transmission manner of aggregating the first network with the second network, learning, by the gateway according to the aggregation request, that the terminal determines to use the network transmission manner of aggregating the first network with the second network, and generating the aggregation flow table, where the aggregation flow table includes the management policy for managing the network traffic of the first network and the network traffic of the second network, and returning, to the terminal by the gateway, the aggregation flow table requested in the aggregation request. In this application scenario, the terminal initiates the aggregation request to the gateway, the gateway generates the aggregation flow table and delivers the aggregation flow table to the terminal, and after receiving the aggregation flow table, the terminal may choose, according to the aggregation flow table, a transmission network to transmit the uplink data packet.

It should be noted that, for detailed description of the aggregation flow table generated by the gateway, reference may be made to the description in the foregoing embodiment.

It can be learned from the description in the foregoing embodiment that the terminal may send a first uplink data packet to the first network, and forward the first uplink data packet to the gateway using the first network, or the terminal may send a first uplink data packet to the second network, and forward the first uplink data packet to the gateway using the second network. Similarly, for the to-be-transmitted second uplink data packet in the terminal, the terminal may also choose, according to the aggregation flow table, the first network to transmit the second uplink data packet, or may choose, according to the aggregation flow table, the second network to transmit the second uplink data packet, and therefore, the terminal can implement using of multiple transmission networks without being limited to a method that only one transmission network can be chosen for data packets that belong to a same TCP connection. The gateway may receive the first uplink data packet and the second uplink data packet from the first network or the second network, and the gateway may first acquire a host identifier and a source port number that are of the first uplink data packet from the first uplink data packet, and acquire the host identifier and the source port number that are of the second uplink data packet from the second uplink data packet. The first uplink data packet includes the host identifier and the source port number, where the host identifier is used to identify a terminal that sends the first uplink data packet, and the source port number identifies a port, through which the first uplink data packet is sent, of the terminal.

Step 202: The gateway encapsulates the second uplink data packet and a first uplink data packet into a third uplink data packet.

The first uplink data packet is a data packet that is received by the gateway from the first network or the second network and that has a same host identifier and a same source port number as the second uplink data packet.

A source IP address of the third uplink data packet is a third address, the third address is an IP address that is allocated by the Internet to the gateway and that is used to receive data from the Internet and send data to the Internet, and a source port number of the third uplink data packet is a port number of the gateway.

It should be noted that, in this embodiment of the present disclosure, uplink data packets sent by multiple application programs in the terminal may be indicated using different port numbers. Many ports are generally disposed on the terminal, and when different application programs send uplink data packets, different port numbers may be carried in the uplink data packets to indicate that the uplink data packets are from the different application programs in the terminal.

In some embodiments of the present disclosure, the gateway extracts the host identifier and the source port number from the received first uplink data packet. The gateway extracts the host identifier and the source port number from the received second uplink data packet in a same manner. The gateway searches multiple data packets received using the first network and the second network to find out whether there is a data packet that has a same host identifier and a same source port number as the second uplink data packet, and if there is the first uplink data packet that has the same host identifier and the same source port number as the second uplink data packet, the gateway encapsulates the first uplink data packet and the second uplink data packet into the third uplink data packet, and the gateway may aggregate the first uplink data packet and the second uplink data packet that are from a same terminal and a same port, into a same TCP connection in a re-encapsulating manner.

Step 203: The gateway sends the third uplink data packet to the Internet, and sends the third uplink data packet to a target server using the Internet.

The source IP address of the third uplink data packet is the third address, and the third address is the IP address that is allocated by the Internet to the gateway and that is used to receive data from the Internet and send data to the Internet.

In some embodiments of the present disclosure, the terminal establishes a TCP connection with the target server using the Internet, and the terminal may choose, according to the aggregation flow table, a transmission network for each of the first uplink data packet and the second uplink data packet that belong to a same TCP connection, and transmit the first uplink data packet and the second uplink data packet to the gateway. After the gateway receives the first uplink data packet and the second uplink data packet, the gateway encapsulates the first uplink data packet and the second uplink data packet into the third uplink data packet that belongs to the same TCP connection, and then forwards the third uplink data packet to the target server using the Internet. Therefore, in this embodiment of the present disclosure, even if only one TCP connection is established between the terminal and the target server, multiple transmission networks may also be used, which abandons an implementation idea in the prior art that only one transmission network can be used when only one TCP connection is established, and can facilitate management of network traffic.

In some embodiments of the present disclosure, after the gateway sends the third uplink data packet to the Internet, the gateway may further determine whether the TCP connection is completed, and if the TCP connection is completed, the gateway deletes a record of the TCP connection from a database, and therefore, the gateway may simplify the record of the TCP connection in the database, and only an uncompleted TCP connection is reserved.

It can be learned from the foregoing description that, after a gateway receives a second uplink data packet from a first network or a second network, the gateway may acquire a host identifier and a source port number that are of the second uplink data packet from the second uplink data packet. Then the gateway encapsulates the second uplink data packet and a first uplink data packet into a third uplink data packet, where the first uplink data packet is a data packet that is received by the gateway from the first network or the second network and that has a same host identifier and a same source port number as the second uplink data packet. After the gateway obtains the third uplink data packet by means of encapsulation, the gateway sends the third uplink data packet to the Internet, and sends the third uplink data packet to a target server using the Internet. Because a terminal may choose a transmission network for a single uplink data packet according to an aggregation flow table without being limited to a method in the prior art that data can be transmitted using multiple networks only when multiple TCP connections are established, used traffic of each network can be flexibly controlled according to the aggregation flow table, and even if only one TCP connection is established, a transmission network can also be chosen for a single uplink data packet such that an objective of using multiple networks is achieved, network bandwidth can be increased by means of aggregation, the used traffic of each network can be controlled according to the aggregation flow table, and management of network traffic is implemented.

An embodiment of a network traffic management method in the present disclosure is implemented based on an aggregation controller side, and may include receiving, by an aggregation controller, respective network load reported by a first network and a second network, determining, by the aggregation controller according to the network load of the first network, the network load of the second network, and a configured aggregation policy, whether to use a network transmission manner of aggregating the first network with the second network; if the aggregation controller determines to use the network transmission manner of aggregating the first network with the second network, generating, by the aggregation controller, an aggregation flow table, where the aggregation flow table includes a management policy for managing network traffic of the first network and network traffic of the second network, and separately sending, by the aggregation controller, the aggregation flow table to a terminal and a gateway, where there is a communication connection between the aggregation controller and each of the terminal and the gateway.

Figure 3:
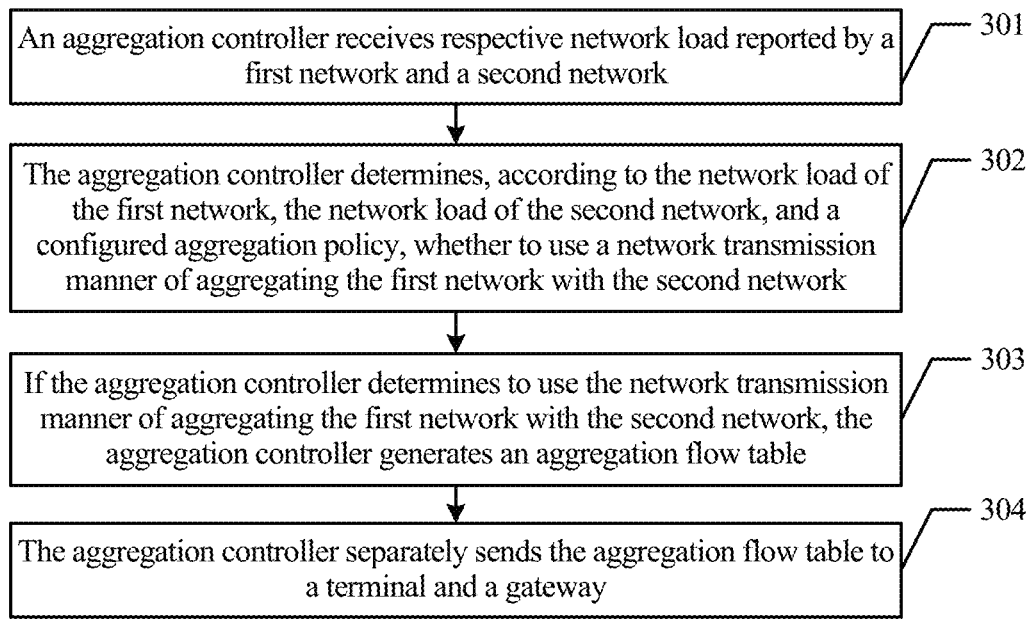
FIG. 3 is a schematic flowchart diagram of a procedure of a network traffic management method according to an embodiment of the present disclosure.

Referring to FIG. 3, a network traffic management method provided in an embodiment of the present disclosure may include the following steps.

Step 301: An aggregation controller receives respective network load reported by a first network and a second network.

The first network and the second network may be separately connected to the aggregation controller in a communication-capable manner, and the first network and the second network may report their respective network load to the aggregation controller at intervals. In embodiments of the present disclosure, periodically reporting, by the first network and the second network, their respective network load may further mean that forwarding is completed by a network side device of the first network or a network side device of the second network, where the network side device may be a core network device, or may be an access network device of a cellular network or a WLAN. For example, the network side device may be a base station, a base station controller, an RNC, a data gateway, or another network side device.

Step 302: The aggregation controller determines, according to the network load of the first network, the network load of the second network, and a configured aggregation policy, whether to use a network transmission manner of aggregating the first network with the second network.

In the foregoing embodiment of the present disclosure, a case in which a terminal initiates an aggregation request and then the aggregation controller generates an aggregation flow table is described, and it may be considered that the aggregation controller passively initiates aggregation. However, in the embodiment described herein, the aggregation controller may actively initiate aggregation, that is, the aggregation controller determines, according to the network load of the first network, the network load of the second network, and the configured aggregation policy, whether to use the network transmission manner of aggregating the first network with the second network, and if the aggregation controller determines to aggregate the first network with the second network, step 303 is executed.

The configured aggregation policy may be generated by a user and sent to the aggregation controller, or a user may write the aggregation policy into the aggregation controller, and the aggregation controller configures the aggregation policy as a configuration file.

Step 303: If the aggregation controller determines to use the network transmission manner of aggregating the first network with the second network, the aggregation controller generates an aggregation flow table.

The aggregation flow table includes a management policy for managing the network traffic of the first network and the network traffic of the second network.

Step 304: The aggregation controller separately sends the aggregation flow table to a terminal and a gateway.

The terminal and the gateway are separately connected to the aggregation controller in a communication-capable manner, and after generating the aggregation flow table, the aggregation controller may separately send the aggregation flow table to the terminal and the gateway, or may send the aggregation flow table in a broadcast or multicast manner, which is not limited herein.

In some embodiments of the present disclosure, after the aggregation controller separately sends the aggregation flow table to the terminal and the gateway, the aggregation controller may further receive the respective network load reported by the first network and the second network. The aggregation controller determines, according to the network load of the first network, the network load of the second network, and the configured aggregation policy, whether to stop using the network transmission manner of aggregating the first network with the second network. If the aggregation controller determines to stop using the network transmission manner of aggregating the first network with the second network, the aggregation controller instructs the terminal and the gateway to stop using the network transmission manner of aggregating the first network with the second network.

In the foregoing embodiment of the present disclosure, the terminal determines whether to stop using the network transmission manner of aggregating the first network with the second network, and if the terminal determines to end aggregation, when there is a to-be-transmitted uplink data packet, the terminal sends the uplink data packet in a manner of performing sending by independently using one transmission network. In the embodiment herein, the aggregation controller may actively determine whether to stop using the network transmission manner of aggregating the first network with the second network, and if the aggregation controller determines to end aggregation, the aggregation controller informs the terminal and the gateway such that the terminal and the network stop using the network transmission manner of aggregating the first network with the second network.

It can be learned from the foregoing description that, an aggregation controller determines, according to network load reported by a first network, network load reported by a second network, and a configured aggregation policy, whether to use a network transmission manner of aggregating the first network with the second network. If the aggregation controller determines to aggregate the first network with the second network, the aggregation controller generates an aggregation flow table. Finally, the aggregation controller sends the aggregation flow table to a terminal and a gateway. Because the aggregation controller may determine, according to network statuses of the first network and the second network, whether to initiate aggregation, generate the aggregation flow table, and send the aggregation flow table to the terminal and the gateway, the terminal and the gateway may choose a transmission network for a single data packet according to the aggregation flow table without being limited to a method in the prior art that data can be transmitted using multiple networks only when multiple TCP connections are established, used traffic of each network can be flexibly controlled according to the aggregation flow table, and even if only one TCP connection is established, a transmission network can also be chosen for a single uplink data packet such that an objective of using multiple networks is achieved, network bandwidth can be increased by means of aggregation, and management of network traffic is facilitated.

In the foregoing embodiments, a process of processing an uplink data packet is described, that is, a terminal generates a first uplink data packet, and then determines, according to an aggregation flow table, a transmission network used for transmitting the first uplink data packet. After the first uplink data packet is routed to a gateway, the gateway encapsulates the first uplink data packet and a second uplink data packet that are from a same terminal and a same port, into a third uplink data packet, and forwards the third uplink data packet to a target server using the Internet. The target server generates a downlink data packet according to the third uplink data packet, and sends the downlink data packet to the gateway using the Internet. In the following, a process in which the gateway and the terminal process the downlink data packet is described, that is, the target server sends the downlink data packet to the gateway, and then the gateway separately forwards the downlink data packets to the terminal using multiple transmission networks. For details, refer to descriptions in the following embodiments.

Another embodiment of a data packet processing method in the present disclosure is implemented based on a gateway side, and may include acquiring, by a gateway, an aggregation flow table, where the aggregation flow table includes a management policy for managing network traffic of a first network and network traffic of a second network, receiving, by the gateway, a first downlink data packet sent by a target server using the Internet, determining, by the gateway from the first network and the second network and according to the aggregation flow table, a transmission network used for transmitting the first downlink data packet, and if the gateway determines to transmit the first downlink data packet using the first network, sending, by the gateway, the first downlink data packet to the first network, and forwarding the first downlink data packet to a first NIC in a terminal using the first network, where the first address is an IP address of the first NIC that is in the terminal and that is corresponding to the first network, or if the gateway determines to transmit the first downlink data packet using the second network, sending, by the gateway, the first downlink data packet to the second network, and forwarding the first downlink data packet to a second NIC in a terminal using the second network, where a destination IP address carried when the first downlink data packet is transmitted using the second network is a second address, and the second address is an IP address of the second NIC that is in the terminal and that is corresponding to the second network.

Figure 4:
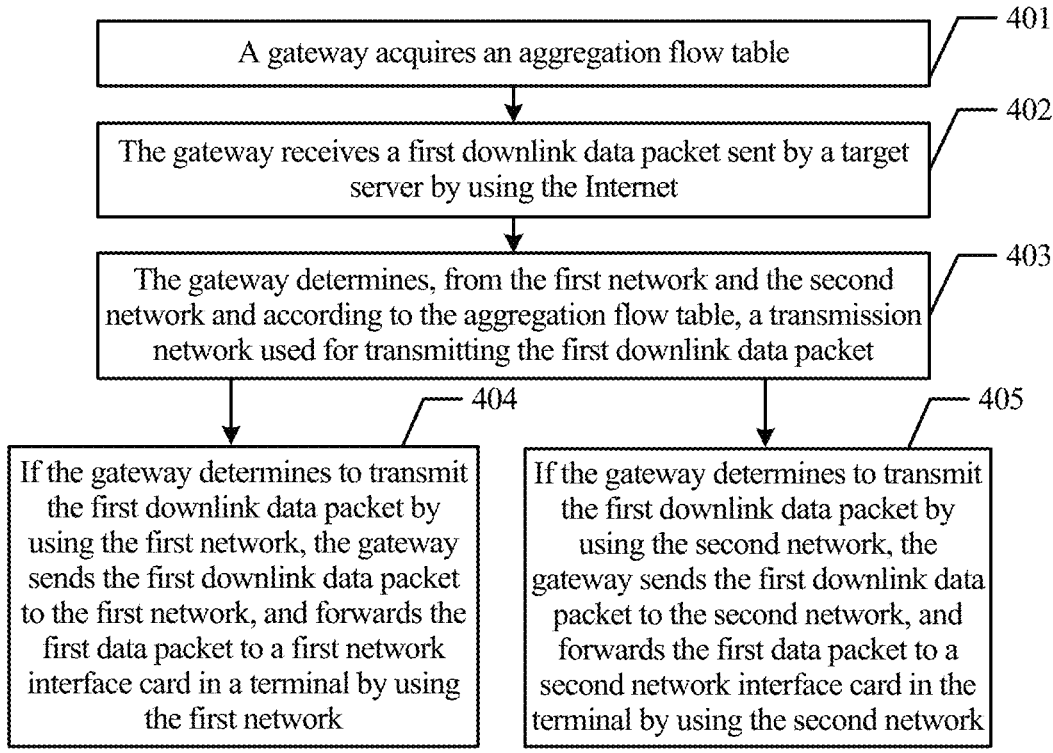
FIG. 4 is a schematic flowchart diagram of a procedure of another data packet processing method according to an embodiment of the present disclosure.

Referring to FIG. 4, a data packet processing method provided in another embodiment of the present disclosure may include the following steps.

Step 401: A gateway acquires an aggregation flow table.

In some embodiments of the present disclosure, step 401 may be further the gateway receives the aggregation flow table sent by an aggregation controller or a terminal, or the gateway receives an aggregation request sent by a terminal, and generates the aggregation flow table according to the aggregation request. For example, a manner in which the gateway acquires the aggregation flow table is that the gateway receives the aggregation flow table sent by the aggregation controller. The aggregation controller may generate the aggregation flow table according to collected network load of the first network, collected network load of the second network, and a configured aggregation policy, and deliver the aggregation flow table to the terminal and the gateway. In this application scenario, the aggregation controller may actively deliver the aggregation flow table without requiring the gateway to initiate the aggregation request, and the gateway may execute a subsequent procedure after receiving the aggregation flow table.

Step 402: The gateway receives a first downlink data packet sent by a target server using the Internet.

It should be noted that, there is no necessary sequence between steps 401 and 402, and the gateway may first acquire the aggregation flow table and then receive the first downlink data packet, which is a general implementation manner. In addition, the gateway may simultaneously execute steps 401 and 402. A destination IP address of the first downlink data packet received by the gateway from the target server is an IP address of the gateway.

Step 403: The gateway determines, from the first network and the second network and according to the aggregation flow table, a transmission network used for transmitting the first downlink data packet.

An IP address of a first NIC that is in the terminal and that is corresponding to the first network is a first address, and an IP address of a second NIC that is in the terminal and that is corresponding to the second network is a second address.

After the transmission network is chosen for the first downlink data packet in step 403, if it is determined to transmit the first downlink data packet using the first network, step 404 may be executed, and if it is determined to transmit the first downlink data packet using the second network, step 405 may be executed, which are separately described in detail in the following.

Step 404: If the gateway determines to transmit the first downlink data packet using the first network, the gateway sends the first downlink data packet to the first network, and forwards the first downlink data packet to a first NIC in a terminal using the first network.

A destination IP address carried when the first downlink data packet is transmitted using the first network is the first address, and the first address is the IP address of the first NIC that is in the terminal and that is corresponding to the first network.

Step 405: If the gateway determines to transmit the first downlink data packet using the second network, the gateway sends the first downlink data packet to the second network, and forwards the first downlink data packet to a second NIC in the terminal using the second network.

A destination IP address carried when the first downlink data packet is transmitted using the second network is the second address, and the second address is the IP address of the second NIC that is in the terminal and that is corresponding to the second network. In some embodiments of the present disclosure, after sending the first downlink data packet to the first network, or sending the first downlink data packet to the second network, this embodiment of the present disclosure may further include the following manner: acquiring, by the gateway, aggregation end information, where the aggregation end information includes ending use of the network transmission manner of aggregating the first network with the second network, and if there is a to-be-transmitted second downlink data packet, sending, by the gateway using a transmission network configured using a stored aggregation policy, the second downlink data packet to the transmission network configured using the aggregation policy, where a destination IP address carried by the second downlink data packet is an IP address of a NIC that is in the terminal and that is corresponding to the transmission network configured using the aggregation policy. That is, after the gateway receives the aggregation end information, the gateway may choose, according to the configured aggregation policy, a transmission network to perform single-path transmission such that an existing implementation manner in which one network is used to transmit a data packet can be compatible in the gateway. The aggregation policy may indicate a transmission network that is used, after aggregation ends, to transmit the data packet.

In some embodiments of the present disclosure, the acquiring, by the gateway, aggregation end information may include receiving, by the gateway, respective network load reported by the first network and the second network, determining, according to the network load of the first network, the network load of the second network, and the configured aggregation policy, whether to stop using the network transmission manner of aggregating the first network with the second network, and if the gateway determines to stop using the network transmission manner of aggregating the first network with the second network, generating the aggregation end information, or receiving, by the gateway, the aggregation end information sent by the aggregation controller or the terminal, where there is a communication connection between the gateway and the aggregation controller.

It can be learned from the foregoing description that, a gateway first acquires an aggregation flow table, where the aggregation flow table includes a management policy for managing network traffic of a first network and network traffic of a second network, the gateway receives a first downlink data packet sent by a target server using the Internet, according to the aggregation flow table, the gateway may choose the first network to transmit the first downlink data packet to a terminal, or the gateway may choose the second network to transmit the first downlink data packet to a terminal. Because the gateway may choose a transmission network for a single downlink data packet according to the aggregation flow table without being limited to a method in the prior art that data can be transmitted using multiple networks only when multiple TCP connections are established, used traffic of each network can be flexibly controlled according to the aggregation flow table, and even if only one TCP connection is established, a transmission network can also be chosen for a single downlink data packet such that an objective of using multiple networks is achieved, network bandwidth can be increased by means of aggregation, and management of network traffic is facilitated.

Another embodiment of a data packet processing method in the present disclosure is implemented based on a terminal side, and may include receiving, by a terminal, a second downlink data packet from a first network or a second network, and acquiring a destination port number of the second downlink data packet from the second downlink data packet, where the second downlink data packet is a data packet that is sent by a gateway using the first network or the second network determined according to the aggregation flow table, encapsulating, by the terminal, the second downlink data packet and a first downlink data packet into a third downlink data packet, where the first downlink data packet is a data packet that is received by the terminal from the first network or the second network and that has a same host identifier and a same destination port number as the second downlink data packet, and sending, by the terminal according to a destination port of the third downlink data packet, the third downlink data packet to an application program corresponding to the third downlink data packet.

Figure 5:
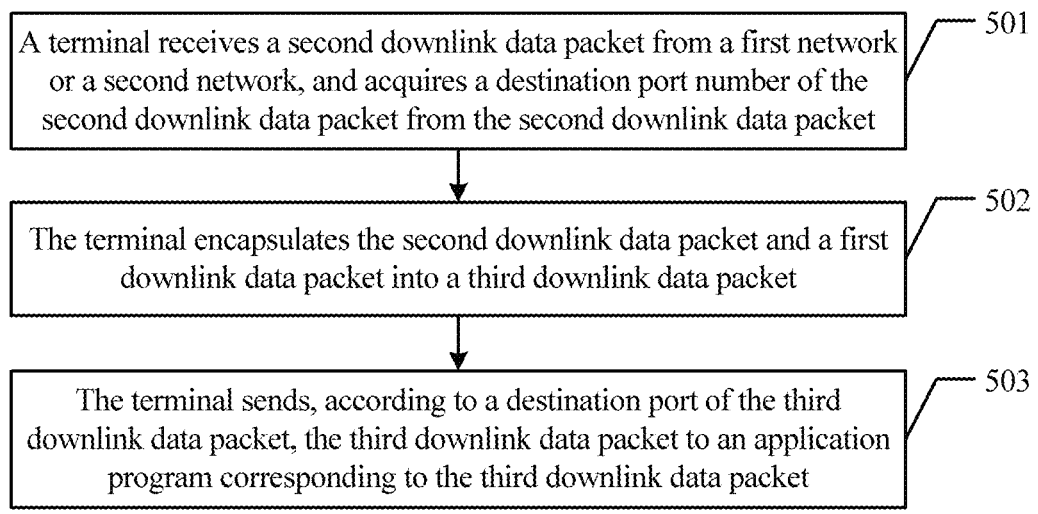
FIG. 5 is a schematic flowchart diagram of a procedure of another data packet processing method according to an embodiment of the present disclosure.

Referring to FIG. 5, a data packet processing method provided in another embodiment of the present disclosure may include the following steps.

Step 501: A terminal receives a second downlink data packet from a first network or a second network, and acquires a destination port number of the second downlink data packet from the second downlink data packet.

The second downlink data packet is a data packet that is sent by a gateway using the first network or the second network determined according to an aggregation flow table.

The aggregation flow table includes a management policy for managing network traffic of the first network and network traffic of the second network, and the first network and the second network are transmission networks of different standards.

In some embodiments of the present disclosure, before the terminal receives the second downlink data packet from the first network or the second network in step 501, this embodiment of the present disclosure may further include acquiring, by the terminal, network load of the first network and network load of the second network using a first NIC and a second NIC, or using an application program installed on the terminal, determining, by the terminal according to the network load of the first network, the network load of the second network, and a configured aggregation policy, whether to use a network transmission manner of aggregating the first network with the second network; if the terminal determines to use the network transmission manner of aggregating the first network with the second network, sending, by the terminal, an aggregation request to an aggregation controller such that the aggregation controller generates the aggregation flow table after receiving the aggregation request and sends the aggregation flow table to the gateway, where there is a communication connection between the aggregation controller and the terminal, or if the terminal determines to use the network transmission manner of aggregating the first network with the second network, generating, by the terminal, the aggregation flow table, and sending the aggregation flow table to the gateway.

Based on the foregoing implementation manner, after the aggregation controller receives the aggregation request sent by the terminal, the aggregation controller may generate the aggregation flow table according to the collected network load of the first network, the collected network load of the second network, and the preset aggregation policy. Generating, by the aggregation controller, the generation of the aggregation flow table is triggered according to the aggregation request initiated by the terminal, and it may be considered that the aggregation controller passively initiates aggregation. In an actual application, the aggregation controller may also not need to trigger, according to the aggregation request initiated by the terminal, a process of generating the aggregation flow table, but after collecting the network load of the first network and the network load of the second network, the aggregation controller actively generates the aggregation flow table and delivers the aggregation flow table to the gateway. In this application scenario, the aggregation controller may actively deliver the aggregation flow table without requiring the terminal to initiate the aggregation request, and the terminal may execute a subsequent procedure after receiving the aggregation flow table. In an actual application, there are many methods for the terminal to acquire the aggregation flow table. For example, the user directly generates the aggregation flow table according to network load statuses of the first network and the second network, and then sends the aggregation flow table to the gateway such that the gateway can acquire the aggregation flow table. For another example, the user directly allocates the network load statuses of the first network and the second network, and the configured aggregation policy to the terminal, the terminal writes the network load statuses of the first network and the second network, and the configured aggregation policy into a configuration file, and generates the aggregation flow table according to these configuration files, and then the terminal sends the aggregation flow table to the gateway.

In this embodiment of the present disclosure, the gateway may send a first downlink data packet to the first network, and forward the first downlink data packet to the terminal using the first network, or the gateway may send a first downlink data packet to the second network, and forward the first downlink data packet to the terminal using the second network. Similarly, for the second downlink data packet received by the gateway, the gateway may also choose, according to the aggregation flow table, the first network to transmit the second downlink data packet, or may choose, according to the aggregation flow table, the second network to transmit the second downlink data packet, and therefore, the gateway can implement use of multiple networks, that is, the gateway may perform switching to use the multiple networks without being limited to a method that only one network can be chosen for data packets that belong to a same TCP connection. The gateway receives the first downlink data packet and the second downlink data packet from the first network or the second network according to the aggregation flow table, and the gateway may first acquire a host identifier and a destination port number that of the first downlink data packet from the first downlink data packet, and acquire a host identifier and the destination port number that are of the second downlink data packet from the second downlink data packet. The first downlink data packet includes the host identifier and the destination port number, where the host identifier is used to identify a terminal to which the first downlink data packet needs to be sent, and the destination port number identifies a port, to which the first downlink data packet needs to be transmitted, of the terminal.

Step 502: The terminal encapsulates the second downlink data packet and a first downlink data packet into a third downlink data packet.

The first downlink data packet is a data packet that is received by the terminal from the first network or the second network and that has a same host identifier and a same destination port number as the second downlink data packet.

In some embodiments of the present disclosure, the terminal extracts the destination port number from the received second downlink data packet, searches multiple downlink data packets received by the terminal using the first network and the second network to find out whether there is a data packet that has a same destination port number as the second downlink data packet, and if there is the first downlink data packet that has the same destination port number as the second downlink data packet, encapsulates the first downlink data packet and the second downlink data packet into the third downlink data packet, and therefore, the terminal can aggregate the first downlink data packet and the second downlink data packet that are from a same target server and are to be sent to a same port, into a same TCP connection.

Step 503: The terminal sends, according to a destination port of the third downlink data packet, the third downlink data packet to an application program corresponding to the third downlink data packet.

In some embodiments of the present disclosure, the terminal establishes a TCP connection with the target server using the Internet, the target server may choose a transmission network for the first downlink data packet and the second downlink data packet that belong to a same TCP connection, and transmit the first downlink data packet and the second downlink data packet to the gateway, and the gateway encapsulates the first downlink data packet and the second downlink data packet into the third downlink data packet that belongs to the same TCP connection. Therefore, even if only one TCP connection is established between the terminal and the target server, the gateway may also use multiple transmission networks to transmit downlink data packets, which abandons an implementation idea in the prior art that only one transmission network can be used when only one TCP connection is established, and facilitates management of network traffic.

In some embodiments of the present disclosure, after the terminal sends, according to the destination port of the third downlink data packet, the third downlink data packet to the application program corresponding to the third downlink data packet, the method provided in this embodiment of the present disclosure may further include acquiring, by the terminal, the network load of the first network and the network load of the second network using the first NIC and the second NIC, or the application program installed on the terminal, determining, by the terminal according to the network load of the first network, the network load of the second network, and the configured aggregation policy, whether to stop using the network transmission manner of aggregating the first network with the second network; if the terminal determines to stop using the network transmission manner of aggregating the first network with the second network, initiating, by the terminal, an end request to the aggregation controller such that the aggregation controller generates aggregation end information and sends the aggregation end information to the terminal and the gateway, where the aggregation end information includes ending the use of the network transmission manner of aggregating the first network with the second network, receiving, by the terminal using a transmission network configured using the aggregation policy, a fourth downlink data packet forwarded by the gateway, and sending, by the terminal, the fourth downlink data packet to an application program corresponding to the fourth downlink data packet. That is, a transmission network used, after aggregation ends, to transmit data is preset in the aggregation policy, and when determining to end aggregation, the terminal initiates the end request to the aggregation controller; then the aggregation controller instructs the gateway not to offload a to-be-transmitted downlink data packet, when the gateway receives the fourth downlink data packet from the server using the Internet, the gateway directly changes a destination IP address into an IP address that is of a NIC in the terminal and that is preset in the aggregation policy, and sends the fourth downlink data packet to the terminal in a transmission manner that is set in the aggregation policy.

It can be learned from the foregoing description that, according to an aggregation flow table, a gateway may choose a first network to transmit a second downlink data packet to a terminal, or may choose a second network to transmit a second downlink data packet to a terminal. The terminal receives the second downlink data packet from the first network or the second network, then the terminal encapsulates the second downlink data packet and a first downlink data packet into a third downlink data packet. Finally, the terminal sends the third downlink data packet to an application program corresponding to the third downlink data packet. Because the gateway may choose a transmission network for a single downlink data packet according to the aggregation flow table without being limited to a method in the prior art that data can be transmitted using multiple networks only when multiple TCP connections are established, used traffic of each network can be flexibly controlled according to the aggregation flow table, and even if only one TCP connection is established, a transmission network can also be chosen for a single uplink data packet such that an objective of using multiple networks is achieved, network bandwidth can be increased by means of aggregation, the used traffic of each network can be controlled according to the aggregation flow table, and management of network traffic is implemented.

It should be noted that, in the foregoing embodiments of the present disclosure, the embodiments shown in FIG. 1 and FIG. 2 are a process in which a terminal initiates an uplink data packet and a process in which a gateway processes an uplink data packet, and the embodiments shown in FIG. 4 and FIG. 5 are a process in which a gateway receives a downlink data packet and a process in which a terminal receives a downlink data packet. A complete procedure of processing a data packet is described in the following, which may mainly include the following steps.

Step S01: A terminal acquires network load of a first network and network load of a second network using a first NIC and a second NIC, or using an application program installed on the terminal.

Step S02: The terminal determines, according to the network load of the first network, the network load of the second network, and a configured aggregation policy, whether to use a network transmission manner of aggregating the first network with the second network.

Step S03: If the terminal determines to use the network transmission manner of aggregating the first network with the second network, the terminal sends an aggregation request to an aggregation controller, where there is a communication connection between the aggregation controller and the terminal.

Step S04: The terminal receives an aggregation flow table returned after the aggregation controller receives the aggregation request, where the aggregation flow table includes a management policy for managing network traffic of the first network and network traffic of the second network.

Step S05: The terminal determines, from the first network and the second network and according to the aggregation flow table, a transmission network used for transmitting a first uplink data packet, where an internetworking IP address of the first NIC that is in the terminal and that is corresponding to the first network is a first address, and an IP address of the second NIC that is in the terminal and that is corresponding to the second network is a second address.

If the terminal determines to transmit the first uplink data packet using the first network, step S06 is executed. If the terminal determines to transmit the first uplink data packet using the second network, step S07 is executed.

Step S06: If the terminal determines to transmit the first uplink data packet using the first network, the terminal sends the first uplink data packet to the first network using the first NIC corresponding to the first network, and forwards the first uplink data packet to a gateway using the first network, where a source IP address carried when the first uplink data packet is transmitted using the first network is the first address.

Step S07: If the terminal determines to transmit the first uplink data packet using the second network, the terminal sends the first uplink data packet to the second network using the second NIC corresponding to the second network, and forwards the first uplink data packet to a gateway using the second network, where a source IP address carried when the first uplink data packet is transmitted using the second network is the second address.

The foregoing steps S01 to S07 describe a process in which the terminal sends the first uplink data packet, and the terminal sends a second uplink data packet to the gateway in a same manner. The following describes a process in which the gateway processes the first uplink data packet and the second uplink data packet.

Step S08: The gateway receives a second uplink data packet from the first network or the second network, and acquires a host identifier and a source port number that are of the second uplink data packet from the second uplink data packet, where the second uplink data packet is a data packet that is sent by the terminal using the first network or the second network determined according to the aggregation flow table.

Step S09: The gateway encapsulates the second uplink data packet and the first uplink data packet into a third uplink data packet, where the first uplink data packet is a data packet that is received by the gateway from the first network or the second network and that has a same host identifier and a same source port number as the second uplink data packet.

Step S10: The gateway sends the third uplink data packet to the Internet, and sends the third uplink data packet to a target server using the Internet, where a source IP address of the third uplink data packet is a third address, and the third address is an IP address that is allocated by the Internet to the gateway and that is used to receive data from the Internet and send data to the Internet.

According to the descriptions of step S01 to step S10, an entire process of sending an uplink data packet may be completed. Referring to descriptions of the following steps S11 to S17, the following describes a process in which the target server sends a first downlink data packet and a second downlink data packet to the gateway according to the third uplink data packet after receiving the third uplink data packet.

Step S11: The gateway acquires the aggregation flow table, where the aggregation flow table includes the management policy for managing the network traffic of the first network and the network traffic of the second network.

Step S12: The gateway receives a first downlink data packet sent by the target server using the Internet.

Step S13: The gateway determines, from the first network and the second network and according to the aggregation flow table, a transmission network used for transmitting the first downlink data packet.

If the gateway determines to transmit the first downlink data packet using the first network, step S14 is executed. If the gateway determines to transmit the first downlink data packet using the second network, step S15 is executed.

Step S14: If the gateway determines to transmit the first downlink data packet using the first network, the gateway sends the first downlink data packet to the first network, and forwards the first downlink data packet to the first NIC in the terminal using the first network, where a destination IP address carried when the first downlink data packet is transmitted using the first network is the first address, and the first address is the IP address of the first NIC that is in the terminal and that is corresponding to the first network.

Step S15: If the gateway determines to transmit the first downlink data packet using the second network, the gateway sends the first downlink data packet to the second network, and forwards the first downlink data packet to the second NIC in the terminal using the second network, where a destination IP address carried when the first downlink data packet is transmitted using the second network is the second address, and the second address is the IP address of the second NIC that is in the terminal and that is corresponding to the second network.

Step S16: The terminal receives a second downlink data packet from the first network or the second network, and acquires a destination port number of the second downlink data packet from the second downlink data packet, where the second downlink data packet is a data packet that is sent by the gateway using the first network or the second network determined according to the aggregation flow table.

Step S17: The terminal encapsulates the second downlink data packet and the first downlink data packet into a third downlink data packet, where the first downlink data packet is a data packet that is received by the terminal from the first network or the second network and that has a same host identifier and a same destination port number as the second downlink data packet.

Step S18: The terminal sends, according to a destination port of the third downlink data packet, the third downlink data packet to an application program corresponding to the third downlink data packet.

It can be learned from the descriptions of the foregoing embodiments that, because both a terminal and a gateway may choose a transmission network for a single data packet according to an aggregation flow table without being limited to a method in the prior art that data can be transmitted using multiple networks only when multiple TCP connections are established, used traffic of each network can be flexibly controlled according to the aggregation flow table, and even if only one TCP connection is established, a transmission network can also be chosen for a single data packet such that an objective of using multiple networks is achieved, that is, the multiple networks can be switched for using, network bandwidth can be increased by means of aggregation, the used traffic of each network can be controlled according to the aggregation flow table, and management of network traffic is implemented.

To facilitate better understanding and implementation of the foregoing solutions in the embodiments of the present disclosure, the following uses several application scenarios as examples for description.

Figure 6:
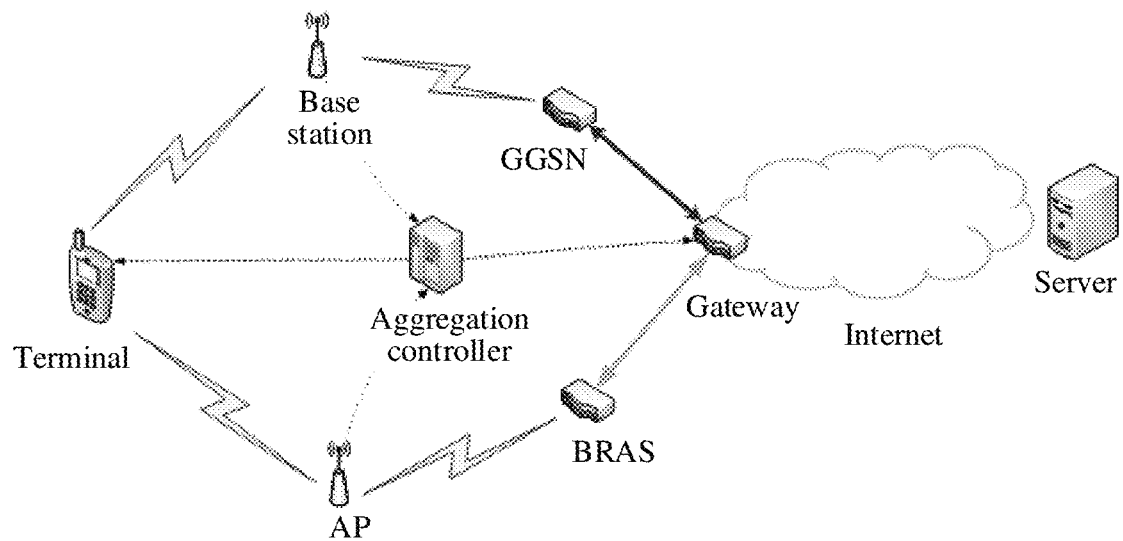
FIG. 6 is a schematic diagram of a network architecture of a data packet processing system according to an embodiment of the present disclosure.

Referring to FIG. 6, FIG. 6 is a diagram of a network architecture of a data packet processing system according to an embodiment of the present disclosure. For example, a first network is a 3G network, and a second network is a WiFi network. In FIG. 6, a terminal (for example, the terminal is a mobile phone terminal) separately accesses the 3G network and the WiFi network. The terminal is connected to a base station (including an RNC). The RNC is connected to an aggregation controller. The RNC is connected to a gateway using a gateway GPRS support node (GGSN). The terminal is connected to an access point (AP). The AP is connected to the aggregation controller, the AP is connected to the gateway using a broadband remote access server (BRAS). The aggregation controller is separately connected to the terminal and the gateway. The gateway is connected to a server using the Internet. In a specific embodiment of the present disclosure, the gateway may further refer to an aggregation gateway.

For the network architecture provided in FIG. 6, sending of an uplink data packet is used as an example. The RNC on the 3G network and the AP on the WIFI network report their respective network load to the aggregation controller at intervals, and the aggregation controller determines, according to a busy/idle status of each network, a network traffic offloading ratio obtained when the terminal and the gateway sends data packets, sets the network traffic offloading ratio in an aggregation flow table, and delivers the aggregation flow table to the terminal and the gateway when initiating aggregation. In this case, when the terminal sends a first uplink data packet, the terminal determines, according to the aggregation flow table delivered by the aggregation controller, a network to which the first uplink data packet is to be offloaded, and therefore, multiple networks can be used for one TCP connection, and management of network traffic can also be facilitated.

Figure 7:
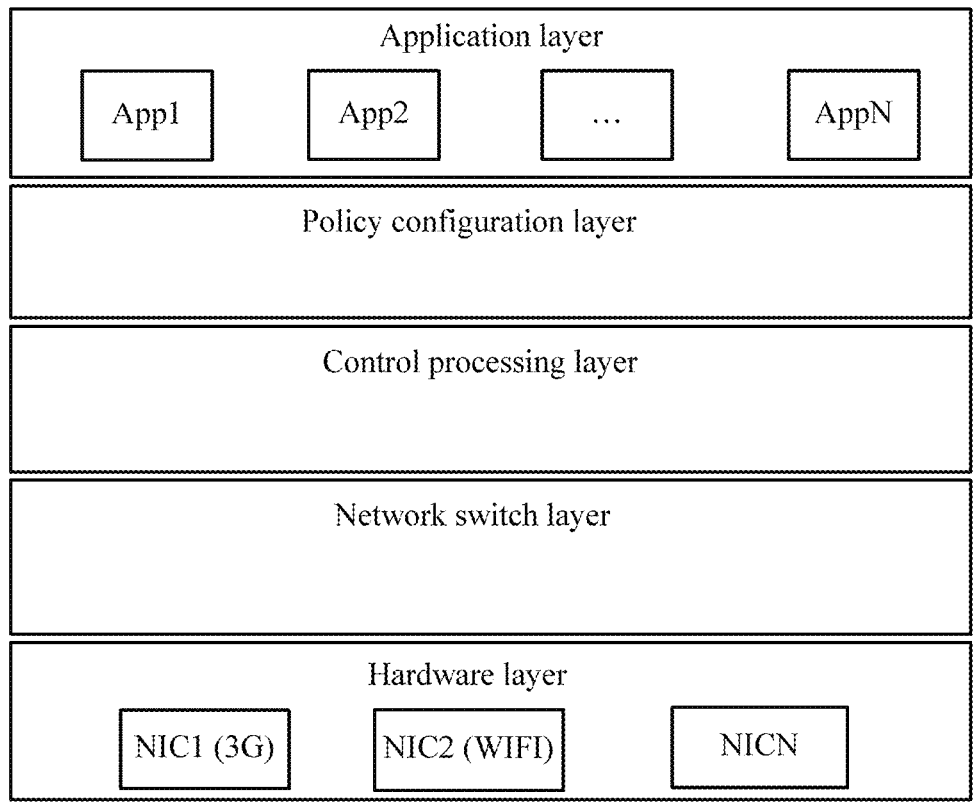
FIG. 7 is a schematic diagram of a logical architecture of a terminal according to an embodiment of the present disclosure.

Referring to FIG. 7, FIG. 7 is a diagram of a logical architecture of a terminal according to an embodiment of the present disclosure. The terminal supports multiple IP networks and the terminal includes multiple application programs (an App 1, an App 2, . . . , and an App N) at an application layer, a policy configuration layer (Profile), a control processing layer (Process), a network switch layer (OpenVswitch), and multiple NICs (an NIC 1, an NIC 2, . . . , and an NIC N) at a hardware layer, where the App 1, the App 2, . . . , and the App N are respectively corresponding to different applications programs.

Each NIC is corresponding to a specific network. For example, the NIC 1 is a 3G NIC, and the NIC 2 is a WiFi NIC.

The network switch layer may further configured as an openflow switch mode, where a virtual bridge is added to the network switch layer and is used to manage data forwarding of N network interfaces, and a fixed IP address is set for the virtual bridge, which remains unchanged before and after aggregation. The policy configuration layer is used to store configuration policy information. The control processing layer is responsible for determining, according to a configuration policy and a network status, when to initiate aggregation and when to end aggregation, and choosing, after ending aggregation, a proper interface to perform single-path transmission, and is responsible for interacting with the aggregation controller, initiating aggregation, or reporting interface information.

That the terminal executes a procedure of sending an uplink data packet is first described. For example, the control processing layer acquires an aggregation flow table, where the aggregation flow table includes a management policy for managing network traffic of a first network and network traffic of a second network. The network switch layer determines, from the first network and the second network and according to the aggregation flow table, a transmission network used for transmitting a first uplink data packet, where an internetworking IP address of a first NIC that is in the terminal and that is corresponding to the first network is a first address, and an IP address of a second NIC that is in the terminal and that is corresponding to the second network is a second address, and if the network switch layer determines to transmit the first uplink data packet using the first network, the control processing layer sends the first uplink data packet to the first network using the first NIC corresponding to the first network, and forwards the first uplink data packet to a gateway using the first network, where a source IP address carried when the first uplink data packet is transmitted using the first network is the first address, or if the network switch layer determines to transmit the first uplink data packet using the second network, the control processing layer sends the first uplink data packet to the second network using the second NIC corresponding to the second network, and forwards the first uplink data packet to the gateway using the second network, where a source IP address carried when the first uplink data packet is transmitted using the second network is the second address.

After the terminal completes sending of an uplink data packet, the following describes a procedure in which the terminal receives a downlink data packet from a gateway. For example, the terminal is controlled to receive a second downlink data packet from a first network or a second network, and acquire a destination port number of the second downlink data packet from the second downlink data packet, where the second downlink data packet is a data packet that is sent by the gateway using the first network or the second network determined according to an aggregation flow table. The network switch layer encapsulates the second downlink data packet and a first downlink data packet into a third downlink data packet, where the first downlink data packet is a data packet that is received by the terminal from the first network or the second network and that has a same host identifier and a same destination port number as the second downlink data packet, and the control processing layer sends, according to a destination port of the third downlink data packet, the third downlink data packet to an application program corresponding to the third downlink data packet.

Figure 8:
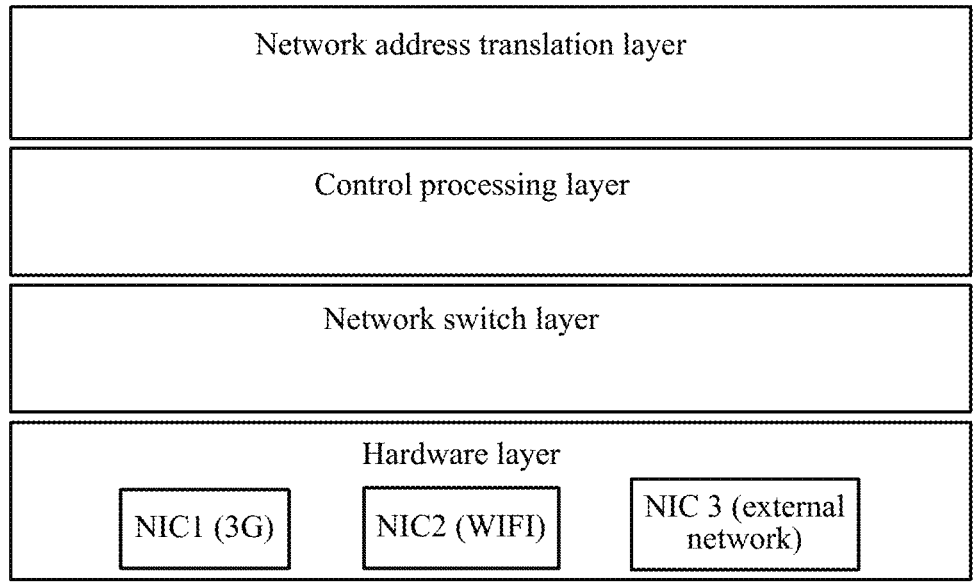
FIG. 8 is a schematic diagram of a logical architecture of a gateway according to an embodiment of the present disclosure.

Referring to FIG. 8, FIG. 8 is a diagram of a logical architecture of a gateway according to an embodiment of the present disclosure, where the gateway is configured to forward data packets of an internal network and an external network. The gateway includes a network address translation layer, a control processing layer, a network switch layer (OpenVswitch), and multiple NICs (an NIC 1, an NIC 2, and an NIC 3) at a hardware layer. Each NIC is corresponding to a specific network. For example, the NIC 1 is a 3G NIC, and the NIC 2 is a WiFi NIC.

The NIC 1 is configured to forward a data packet using a 3G network, the NIC 2 is configured to forward a data packet using a WIFI network, and the NIC 3 is configured to interact with an external Internet and receive and send a data packet. The network switch layer is used to manage data packet forwarding of multiple NICs at a bottom layer, and shield an upper layer from an architecture of the multiple NICs at the bottom layer. The network address translation layer is used to generate a network address translation rule and perform network address translation, and the control processing layer is used to control forwarding of a data packet.

That the gateway executes a procedure of sending an uplink data packet is first described. For example, the control processing layer receives a second uplink data packet from a first network or a second network, and acquires a host identifier and a source port number that are of the second uplink data packet from the second uplink data packet, where the second uplink data packet is a data packet that is sent by a terminal using the first network or the second network determined according to an aggregation flow table. The network switch layer encapsulates the second uplink data packet and a first uplink data packet into a third uplink data packet, where the first uplink data packet is a data packet that is received by the gateway from the first network or the second network and that has a same host identifier and a same source port number as the second uplink data packet, and the control processing layer sends the third uplink data packet to the Internet, and sends the third uplink data packet to a target server using the Internet, where a source IP address of the third uplink data packet is a third address, and the third address is an IP address that is allocated by the Internet to the gateway and that is used to receive data from the Internet and send data to the Internet.

After the gateway completes sending of an uplink data packet, the following describes a procedure in which the gateway receives a downlink data packet from a target server. For example, the control processing layer acquires an aggregation flow table, where the aggregation flow table includes a management policy for managing network traffic of a first network and network traffic of a second network. The control processing layer receives a first downlink data packet sent by the target server using the Internet. The network switch layer determines, from the first network and the second network and according to the aggregation flow table, a transmission network used for transmitting the first downlink data packet, and if the network switch layer determines to transmit the first downlink data packet using the first network, the control processing layer sends the first downlink data packet to the first network, and forwards the first downlink data packet to a first NIC in a terminal using the first network, where a destination IP address carried when the first downlink data packet is transmitted using the first network is a first address, and the first address is an IP address of the first NIC that is in the terminal and that is corresponding to the first network, or if the network switch layer determines to transmit the first downlink data packet using the second network, the control processing layer sends the first downlink data packet to the second network, and forwards the first downlink data packet to a second NIC in the terminal using the second network, where a destination IP address carried when the first downlink data packet is transmitted using the second network is a second address, and the second address is an IP address of the second NIC that is in the terminal and that is corresponding to the second network.

Figure 9:
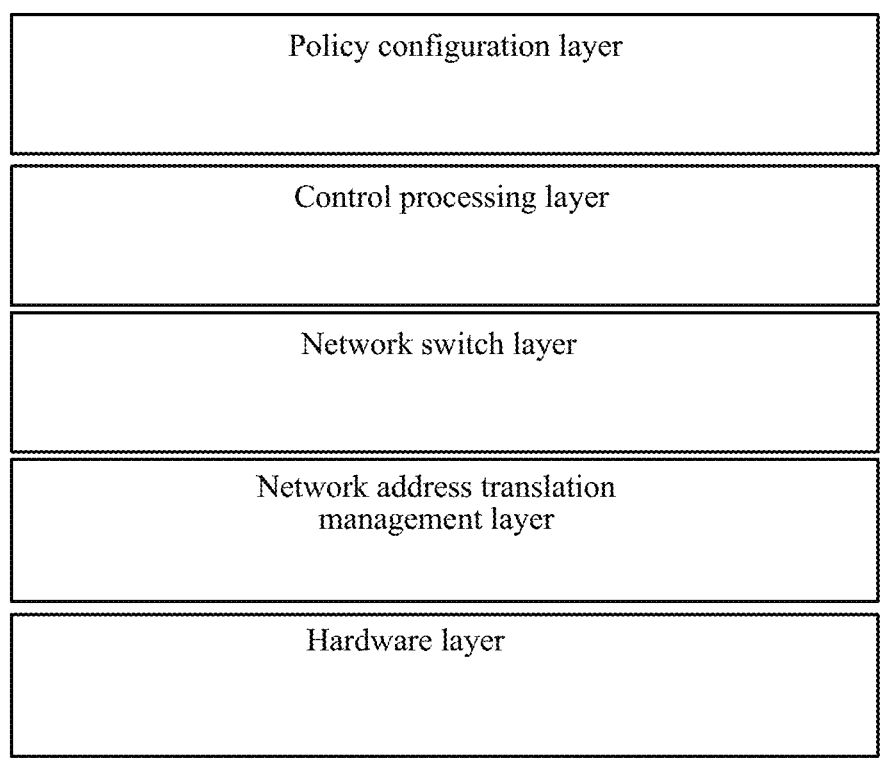
FIG. 9 is a schematic diagram of a logical architecture of an aggregation controller according to an embodiment of the present disclosure.

Referring to FIG. 9, FIG. 9 is a diagram of a logical architecture of an aggregation controller according to an embodiment of the present disclosure, where the aggregation controller includes a policy configuration layer, a control processing layer, a network switch layer, a network address translation management layer, and a hardware layer.

The control processing layer may be implemented by a Beacon of a JAVA program, and certainly, a network controller may also be developed based on a software-defined networking (SDN) technology, and the control processing layer includes many bundles. The control processing layer is used to receive an aggregation request message sent by a terminal, and when the terminal initiates aggregation, generate, according to an aggregation policy configured by the policy configuration layer, an aggregation flow table, and deliver the aggregation flow table to the terminal and a gateway. The network address translation management layer is used to generate a network address translation (NAT) rule, and translate, under control of the network switch layer, an IP address of an internal network into an IP address that is of an external network and that is allocated by the Internet to an aggregation network. The control processing layer is further used to receive status information of each network element such that the control processing layer can determine when to initiate aggregation, and set a network traffic offloading ratio. The hardware layer includes a structure such as a processor or a memory used for supporting the aggregation controller to implement the foregoing functions.

For example, the control processing layer receives respective network load reported by a first network and a second network. The policy configuration layer determines, according to the network load of the first network, the network load of the second network, and the configured aggregation policy, whether to use a network transmission manner of aggregating the first network with the second network. If the policy configuration layer determines to use the network transmission manner of aggregating the first network with the second network, the control processing layer generates the aggregation flow table, where the aggregation flow table includes a management policy for managing network traffic of the first network and network traffic of the second network, and the control processing layer separately sends the aggregation flow table to the terminal and the gateway, where there is a communication connection between the aggregation controller and each of the terminal and the gateway.

Referring to FIG. 10A1 and FIG. 10A2, FIG. 10A1 and FIG. 10A2 are a schematic diagram of a procedure in which a terminal sends a data packet when an aggregation controller actively initiates aggregation. For example, the terminal is a mobile phone terminal. A process in which the terminal sends an uplink data packet is first described, and the process may include the following steps.

Step 1001: A mobile phone terminal first registers information, such as an IP address of a virtual bridge, an IP address of a 3G NIC, and an IP address of a WiFi NIC, with an aggregation controller.

Step 1002: Before aggregation, the mobile phone terminal chooses a proper port according to a requirement of an application program and a network status, to perform single-path transmission.

Step 1003: The aggregation controller determines, according to a pre-formulated aggregation policy and network statuses of a 3G network and a WiFi network, when to perform aggregation.

Step 1004: The aggregation controller generates an aggregation flow table.

Step 1005: The aggregation controller delivers the aggregation flow table to the mobile phone terminal and a gateway.

Step 1006: When there is a to-be-transmitted first uplink data packet in the mobile phone terminal, the mobile phone terminal first determines, according to the aggregation flow table, whether the first uplink data packet is transmitted to the gateway using the 3G network or the WiFi network.

Step 1007: If the mobile phone terminal determines to send the first uplink data packet using the 3G network, the mobile phone terminal sends the first uplink data packet to a base station, the base station forwards the first uplink data packet to a GGSN, and then the GGSN forwards the first uplink data packet to the gateway.

Step 1008: If the mobile phone terminal determines to send the first uplink data packet using the WiFi network, the mobile phone terminal sends the first uplink data packet to an AP, the AP forwards the first uplink data packet to a BRAS, and then the BRAS forwards the first uplink data packet to the gateway.

Step 1009: After receiving uplink data packets sent from different networks, the gateway aggregates the first uplink data packet and a second uplink data packet that have same host identifiers and same source port numbers, into a same TCP connection, and encapsulates the first uplink data packet and the second uplink data packet into a third uplink data packet.

Step 1010: The gateway sends, to an external Internet, the uplink data packet obtained after aggregation, and forwards, to a server using the Internet, the uplink data packet obtained after aggregation.

Step 1011: The aggregation controller determines, according to the pre-formulated aggregation policy and the network statuses of the 3G network and the WiFi network, to end aggregation.

Step 1012: The aggregation controller instructs the mobile phone terminal to stop aggregation.

Step 1013: The mobile phone terminal chooses a proper port according to the requirement of the application program and the network status, to perform single-path transmission.

Referring to FIG. 10B1 and FIG. 10B2, FIG. 10B1 and FIG. 10B2 are a schematic diagram of a procedure in which a terminal receives a data packet when an aggregation controller actively initiates aggregation. For example, the terminal is a mobile phone terminal. A process in which the terminal sends an uplink data packet is described in the foregoing embodiment shown in FIG. 10A1 and FIG. 10A2, and after the process of sending the uplink data packet is completed, the following describes a process in which the terminal receives a downlink data packet. Referring to the following description, the process may include the following steps Step 1014: A mobile phone terminal first registers information, such as an IP address of a virtual bridge, an IP address of a 3G NIC, and an IP address of a WiFi NIC, with an aggregation controller.

Step 1015: Before aggregation, the mobile phone terminal chooses a proper port according to a requirement of an application program and a network status, to perform single-path transmission.

Step 1016: The aggregation controller determines, according to a pre-formulated aggregation policy and network statuses of a 3G network and a WiFi network, when to perform aggregation.

Step 1017: The aggregation controller generates an aggregation flow table.

Step 1018: The aggregation controller delivers the aggregation flow table to the mobile phone terminal and a gateway.

Step 1019: When receiving a to-be-transmitted first downlink data packet from an external Internet, the gateway first determines, according to the aggregation flow table, whether the first downlink data packet is transmitted to the mobile phone terminal using the 3G network or the WiFi network.

Step 1020: If the gateway determines to send the first downlink data packet using the 3G network, the gateway sends the first downlink data packet to a GGSN, the GGSN forwards the first downlink data packet to a base station, and then the base station forwards the first downlink data packet to the mobile phone terminal.

Step 1021: If the gateway determines to send the first downlink data packet using the WiFi network, the gateway sends the first downlink data packet to a BRAS, the BRAS forwards the first downlink data packet to an AP, and then the AP forwards the first downlink data packet to the mobile phone terminal.

Step 1022: After receiving downlink data packets sent from different networks, the mobile phone terminal aggregates the first downlink data packet and a second downlink data packet that have same destination ports, into a same TCP connection, and encapsulates the first downlink data packet and the second downlink data packet into a third downlink data packet.

Step 1023: The mobile phone terminal sends, to the application program, the downlink data packet obtained after aggregation.

Step 1024: The aggregation controller determines, according to the pre-formulated aggregation policy and the network statuses of the 3G network and the WiFi network, to end aggregation.

Step 1025: The aggregation controller instructs the mobile phone terminal to stop aggregation.

Step 1026: The mobile phone terminal chooses a proper port according to the requirement of the application program and the network status, to perform single-path transmission.

Figure 10C:
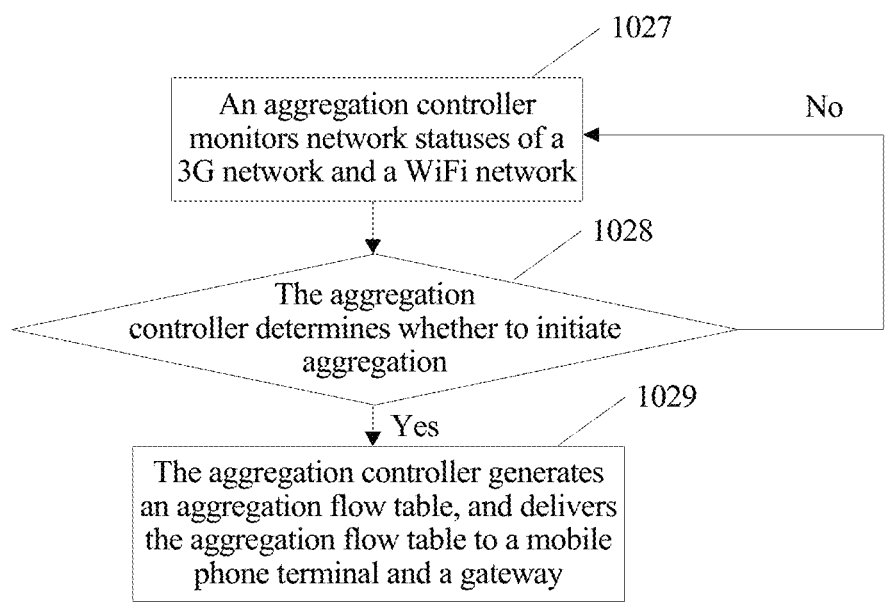
FIG. 10C is a schematic flowchart diagram of a procedure in which an aggregation controller actively initiates aggregation according to an embodiment of the present disclosure.

Referring to FIG. 10C, FIG. 10C is a schematic diagram of a procedure in which an aggregation controller actively initiates aggregation, and the procedure may include the following steps.

Step 1027: An aggregation controller monitors network statuses of a 3G network and a WiFi network.

Step 1028: The aggregation controller determines, according to a pre-formulated aggregation policy and the network statuses of the 3G network and the WiFi network, whether to initiate aggregation, if the aggregation controller determines to initiate aggregation, triggers execution of step 1029, and if the aggregation controller determines not to initiate aggregation, continues to execute step 1027.

Step 1029: The aggregation controller generates an aggregation flow table, and delivers the aggregation flow table to a mobile phone terminal and a gateway.

Figure 10D:
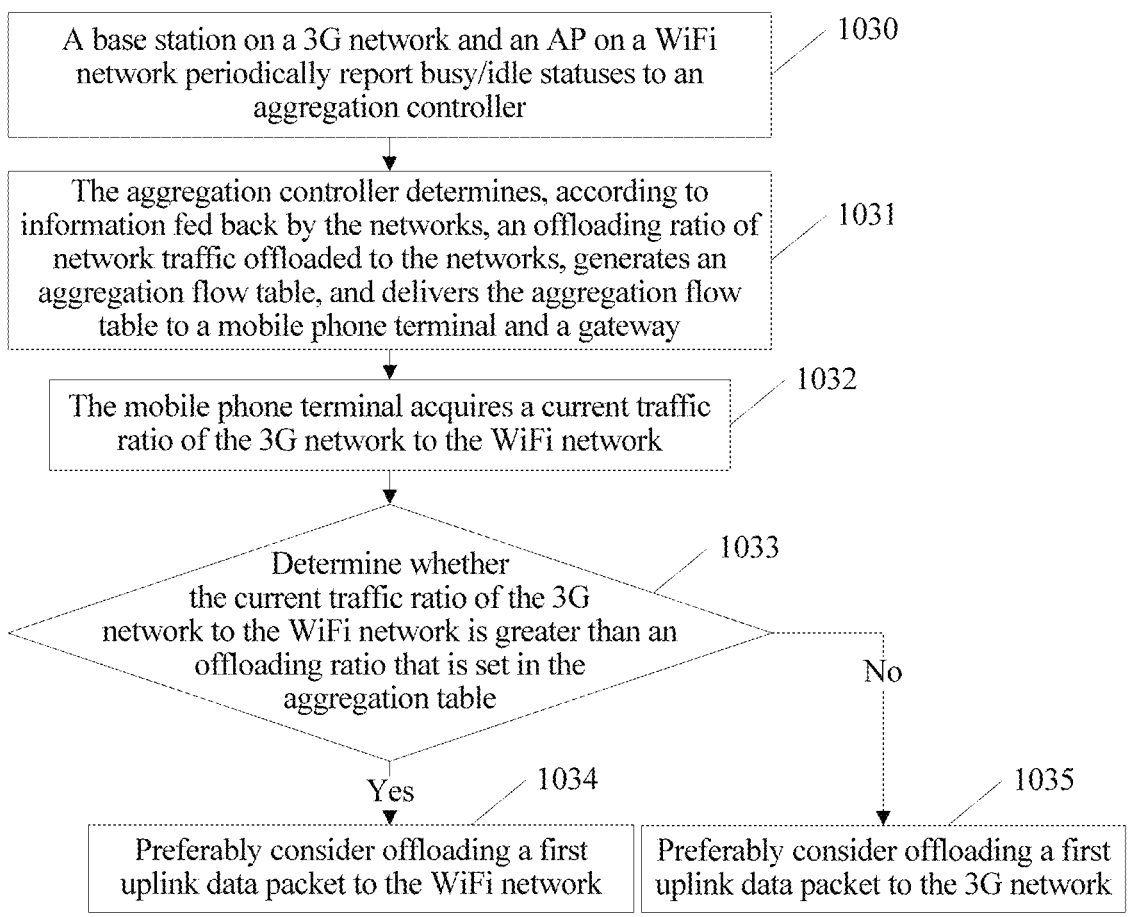
FIG. 10D is a schematic flowchart diagram of a procedure in which a terminal sends a data packet when another aggregation controller actively initiates aggregation according to an embodiment of the present disclosure.

Referring to FIG. 10D, FIG. 10D is a schematic diagram of a procedure in which a terminal sends a data packet when an aggregation controller actively initiates aggregation. A process in which the terminal sends an uplink data packet is first described, and the process may include the following steps.

Step 1030: A base station on a 3G network and an AP on a WiFi network report their respective busy/idle statuses to an aggregation controller at intervals.

Step 1031: The aggregation controller determines, according to information fed back by the networks, an offloading ratio of network traffic offloaded to the networks, generates an aggregation flow table, and delivers the aggregation flow table to a mobile phone terminal and a gateway.

Step 1032: When there is a to-be-transmitted first uplink data packet in the mobile phone terminal, the mobile phone terminal acquires a current traffic ratio of the 3G network to the WiFi network.

Step 1033: The mobile phone terminal determines whether the current traffic ratio of the 3G network to the WiFi network is greater than a network traffic offloading ratio that is set in the aggregation flow table, if yes, executes step 1034, otherwise, executes step 1035.

Step 1034: The mobile phone terminal preferably considers offloading the first uplink data packet to the WiFi network, and forwarding the first uplink data packet to the gateway using the WiFi network.

Step 1035: The mobile phone terminal preferably considers offloading a first uplink data packet to the 3G network, and forwarding the first uplink data packet to the gateway using the 3G network.

Figure 10E:
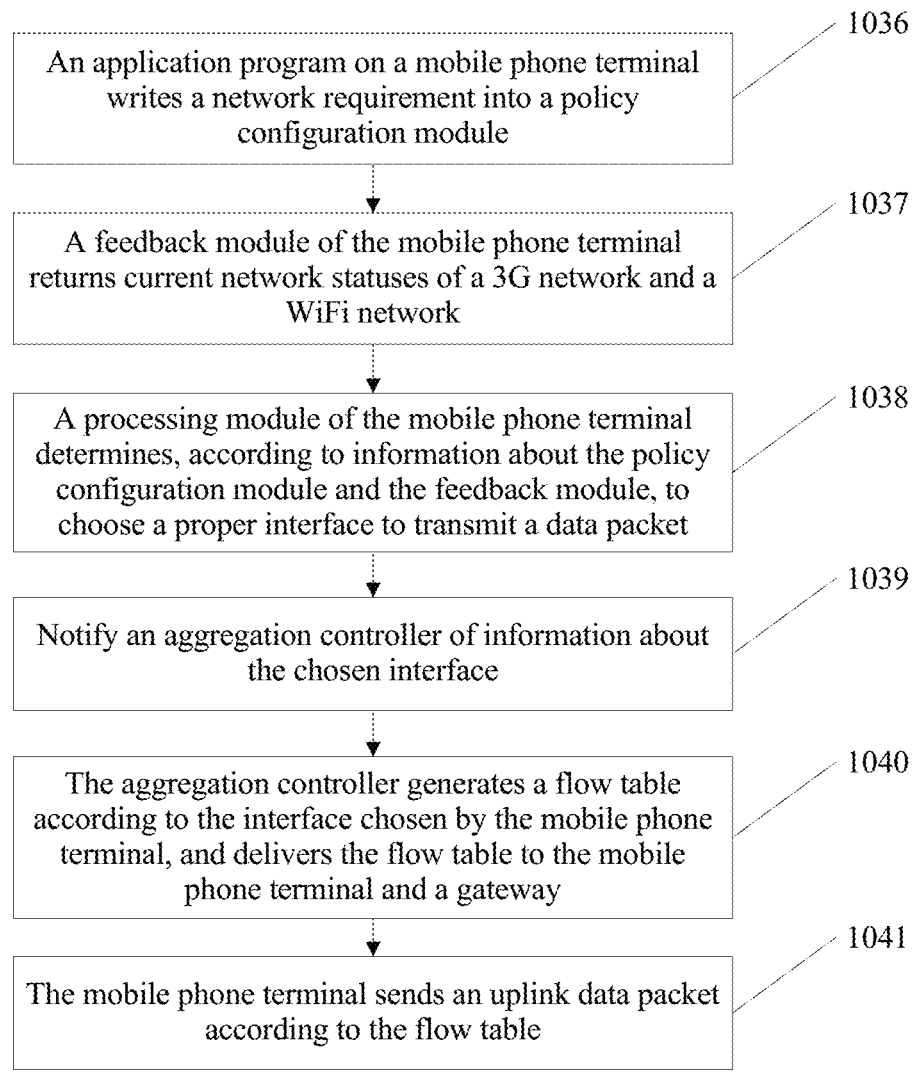
FIG. 10E is a schematic flowchart diagram of a procedure in which a terminal sends a data packet when aggregation is not performed according to an embodiment of the present disclosure.

When an application program on a mobile phone terminal has no aggregation requirement, the mobile phone terminal may determine to end aggregation, choose an optimal interface, and transmit a data packet using only one network. Referring to FIG. 10E, FIG. 10E is a schematic diagram of a procedure in which a terminal sends a data packet when aggregation is not performed, and the procedure may include the following steps Step 1036: Each application program on a mobile phone terminal may write a network requirement into the mobile phone terminal during initiation, where the network requirement includes a condition of initiating aggregation, a standard of choosing an interface when aggregation is not performed, and the like.

Step 1037: The mobile phone terminal returns current network statuses of a 3G network and a WiFi network.

Step 1038: The mobile phone terminal determines, according to an aggregation policy, to choose a proper interface to transmit a data packet.

Step 1039: The mobile phone terminal sends information about the chosen interface to an aggregation controller.

Step 1040: The aggregation controller generates an aggregation flow table according to the interface chosen by the mobile phone terminal, and delivers the aggregation flow table to the mobile phone terminal and a gateway.

Step 1041: The mobile phone terminal sends an uplink data packet according to the aggregation flow table delivered by the aggregation controller, to perform single-path transmission according to the chosen interface.

Figure 11A:
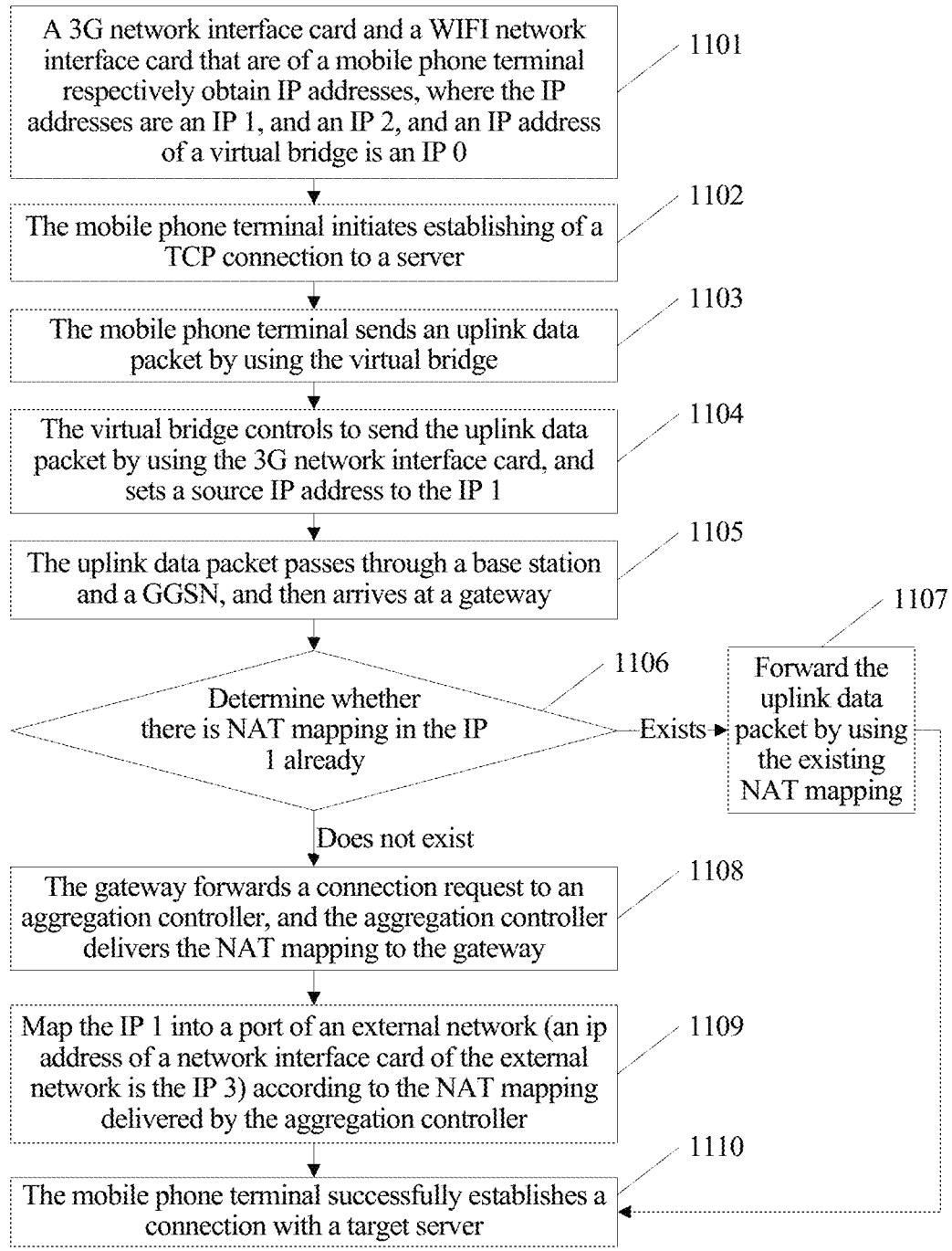
FIG. 11A is a schematic flowchart diagram of a procedure in which a terminal and a server establish a TCP connection according to an embodiment of the present disclosure.

When an application program on a terminal establishes a TCP connection with a server for the first time, it is assumed that a data packet is sent using a 3G NIC and using a 3G network. Referring to FIG. 11A, FIG. 11A is a schematic diagram of a procedure in which a terminal establishes a TCP connection with a server, and the procedure may include the following steps.

Step 1101: A 3G NIC, a WiFi NIC, and a virtual bridge that are of a mobile phone terminal respectively obtain IP addresses, IP 1, an IP 2, and IP 0.

Step 1102: The mobile phone terminal initiates establishing of a TCP connection to a server.

Step 1103: The mobile phone terminal sends an uplink data packet using the virtual bridge, where a source IP address of the uplink data packet is an IP (IP0) of the virtual bridge, and a TCP four-tuple structure of the to-be-transmitted uplink data packet in the mobile phone terminal is shown in the following Table 1.

TABLE 1

| Source IP address | Source port number | Destination IP address | Destination port number |
|---|---|---|---|
| IP0 | src_port | server_ip | server_port |

Step 1104: The virtual bridge controls to send the uplink data packet using the 3G NIC, and changes the source IP address into the IP 1, where a TCP four-tuple structure of the uplink data packet sent from the 3G NIC is shown in the following Table 2.

TABLE 2

| Source IP address | Source port number | Destination IP address | Destination port number |
|---|---|---|---|
| IP1 | src_port | server_ip | server_port |

Step 1105: If the uplink data packet is sent using the 3G network, the uplink data packet passes through a base station and a GGSN, and then arrives at a gateway.

Step 1106: The gateway determines whether there is NAT mapping for the IP 1 already, if there is the NAT mapping, triggers execution of step 1107, and if there is no corresponding NAT mapping, triggers execution of step 1108.

Step 1107: The gateway forwards the uplink data packet using the existing NAT mapping, where an IP address of the gateway is an IP 3, a port number of the gateway is src_port', and a TCP four-tuple structure of the uplink data packet sent from the gateway is shown in the following Table 3.

TABLE 3

| Source IP address | Source port number | Destination IP address | Destination port number |
|---|---|---|---|
| IP3 | src_port' | server_ip | server_port |

Step 1108: The gateway requests new NAT mapping from an aggregation controller, and the aggregation controller delivers the NAT mapping to the gateway.

Step 1109: The gateway maps the IP 1 into a port IP 3 of an external network according to the NAT mapping delivered by the aggregation controller, and forwards the uplink data packet to an external Internet.

Step 1110: The mobile phone terminal successfully establishes a TCP connection with a target server.

Figure 11B:
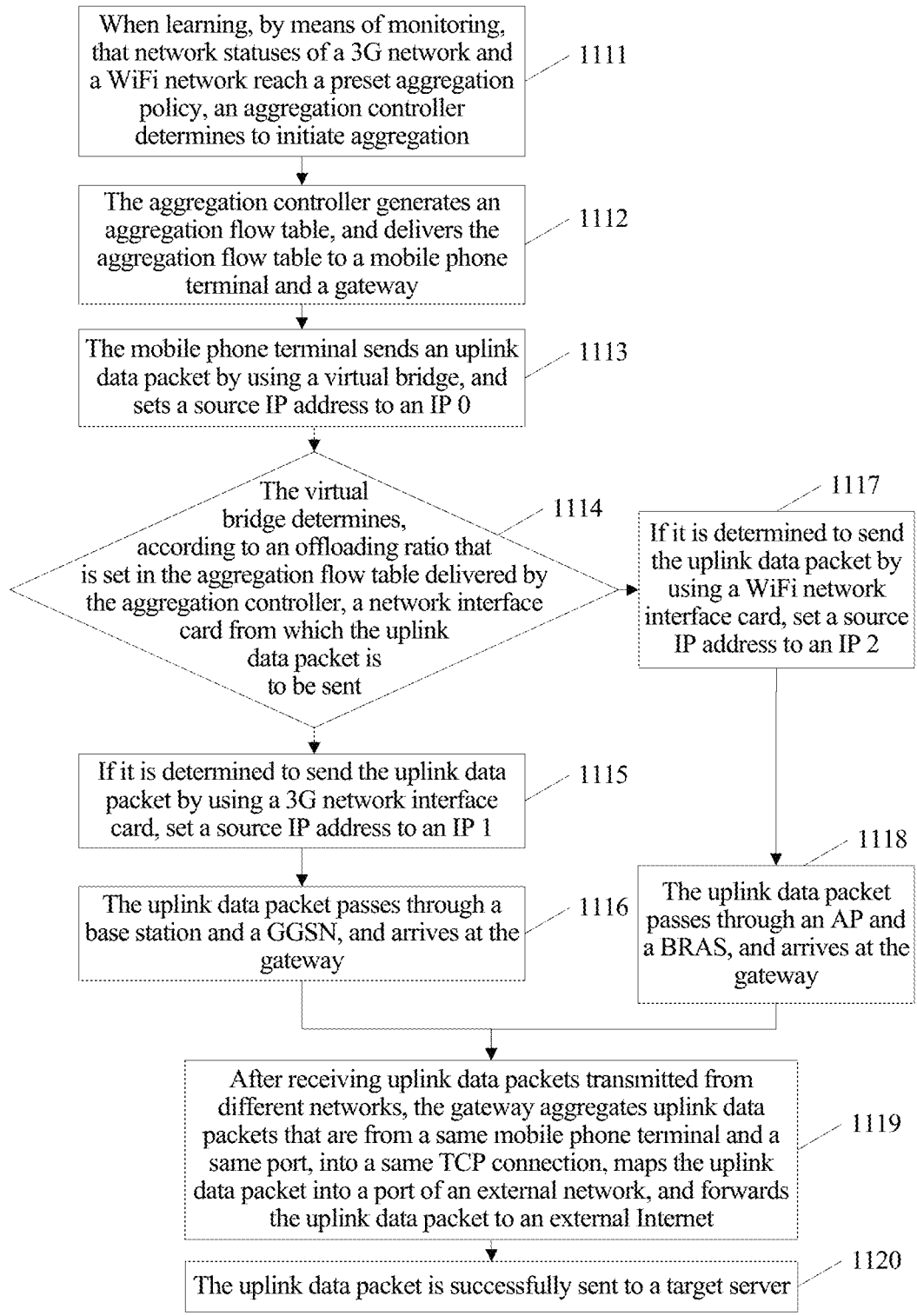
FIG. 11B is a schematic flowchart diagram of a procedure in which a terminal sends an uplink data packet when an aggregation controller actively initiates aggregation according to an embodiment of the present disclosure.

An aggregation controller monitors network statuses of a 3G network and a WiFi network in real time, and when the network statuses reach a preset aggregation threshold, the aggregation controller initiates aggregation, and it is assumed that a data packet is sent using a 3G NIC and using a 3G network. Referring to FIG. 11B, FIG. 11B is a schematic diagram of a procedure in which a terminal sends an uplink data packet when an aggregation controller actively initiates aggregation, and the procedure may include the following steps Step 1111: An aggregation controller monitors network statuses of a 3G network and a WiFi network, and after a preset aggregation policy is met, the aggregation controller initiates aggregation.

Step 1112: The aggregation controller generates an aggregation flow table, and delivers the aggregation flow table to a mobile phone terminal and a gateway.

Step 1113: The mobile phone terminal sends an uplink data packet using a virtual bridge, and sets a source IP address to an IP 0, where a TCP four-tuple structure of the to-be-transmitted uplink data packet in the terminal is shown in the following Table 4.

TABLE 4

| Source IP address | Source port number | Destination IP address | Destination port number |
|---|---|---|---|
| IP0 | src_port | server_ip | server_port |

Step 1114: The mobile phone terminal determines, according to an offloading ratio that is set in the aggregation flow table delivered by the aggregation controller, a network to which the uplink data packet is to be offloaded, if the mobile phone terminal determines to send the uplink data packet using the 3G network, steps 1115 and 1116 are executed, and if the mobile phone terminal determines to send the uplink data packet using the WiFi network, steps 1117 and 1118 are executed.

Step 1115: If the mobile phone terminal determines to send the uplink data packet using the 3G network, the mobile phone terminal changes the source IP address of the uplink data packet into an IP 1.

Step 1116: The mobile phone terminal sends the uplink data packet to a base station, the base station forwards the uplink data packet to a GGSN, and then the GGSN forwards the uplink data packet to the gateway, where a TCP four-tuple structure of the uplink data packet sent from the 3G NIC is shown in the following Table 5.

TABLE 5

| Source IP address | Source port number | Destination IP address | Destination port number |
|---|---|---|---|
| IP1 | src_port | server_ip | server_port |

Step 1117: If the mobile phone terminal determines to send the uplink data packet using the WiFi network, the mobile phone terminal changes the source IP address of the uplink data packet into an IP 2.

Step 1118: The mobile phone terminal sends the uplink data packet to an AP, the AP forwards the uplink data packet to a BRAS, and then the BRAS forwards the uplink data packet to the gateway, where a TCP four-tuple structure of the uplink data packet sent from the WiFi NIC is shown in the following Table 6.

TABLE 6

| Source IP address | Source port number | Destination IP address | Destination port number |
|---|---|---|---|
| IP2 | src_port | server_ip | server_port |

Step 1119: After receiving data packets from different networks, the gateway aggregates uplink data packets that are from a same mobile phone terminal and a same port, into a same TCP connection, maps the uplink data packet into a port of an external network, and forwards the uplink data packet to an external Internet, where a TCP four-tuple structure of the uplink data packet sent from the gateway is shown in the following Table 7.

TABLE 7

| Source IP address | Source port number | Destination IP address | Destination port number |
|---|---|---|---|
| IP3 | src_port' | server_ip | server_port |

Step 1120: The uplink data packet is successfully sent to a target server.

Figure 11C:
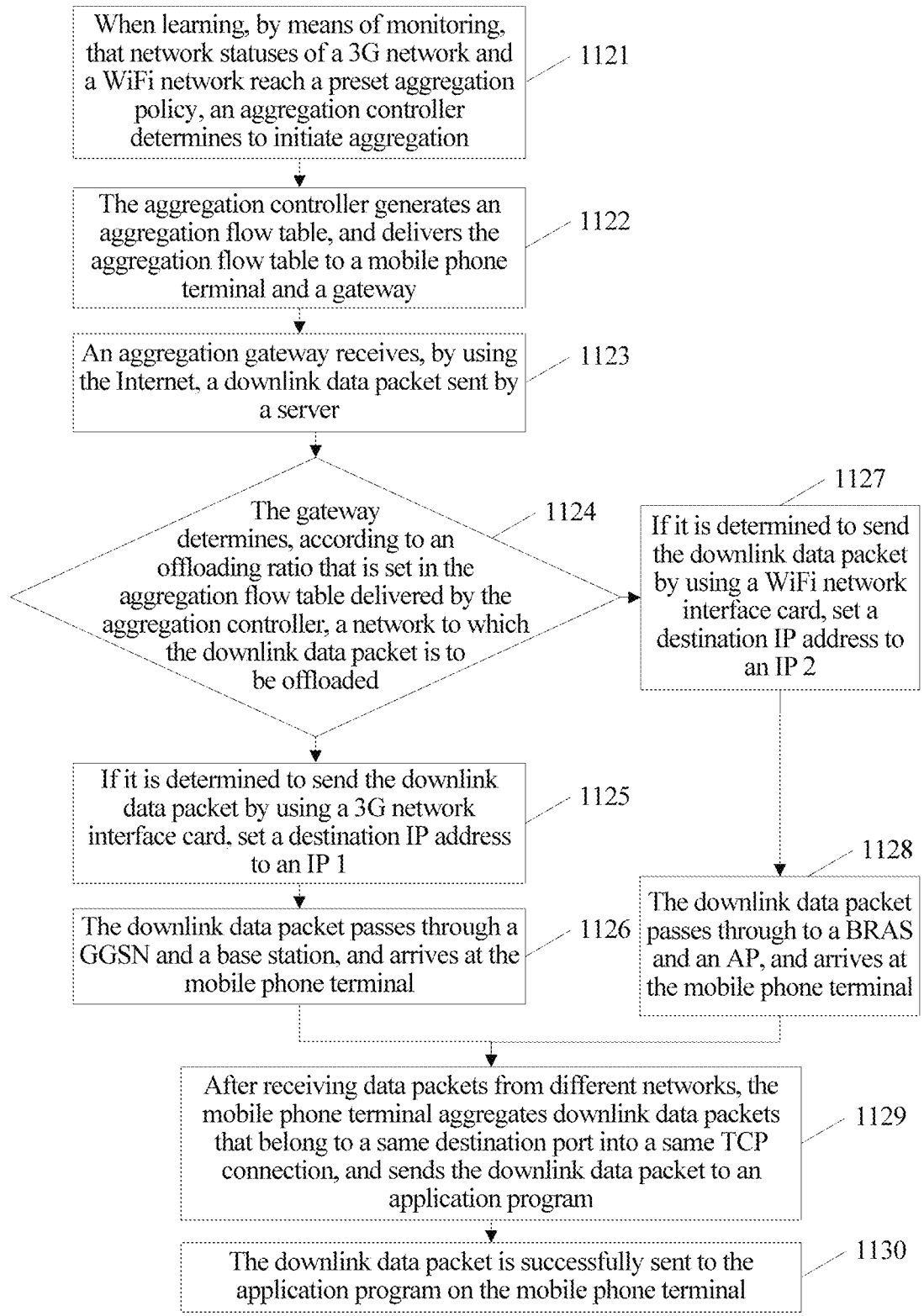
FIG. 11C is a schematic flowchart diagram of a procedure in which a terminal receives a downlink data packet when an aggregation controller actively initiates aggregation according to an embodiment of the present disclosure.
Figure 13A:
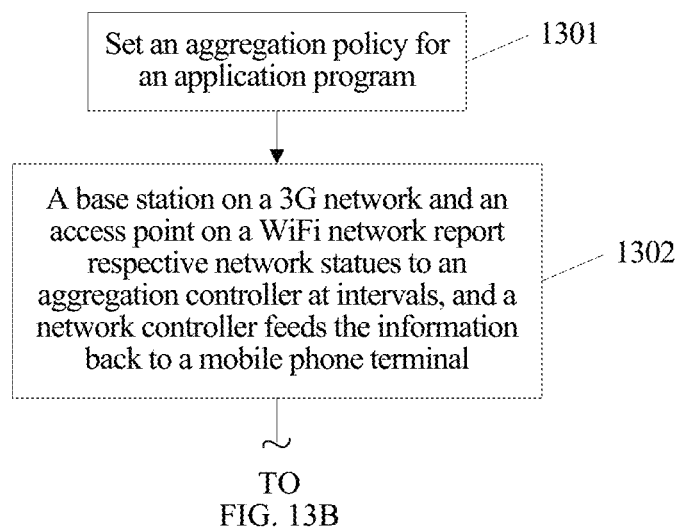
FIG. 13A, FIG. 13B, FIG. 13C, and FIG. 13D are a schematic flowchart diagram of a procedure in which a terminal chooses a transmission network according to an embodiment of the present disclosure.
Figure 13B:
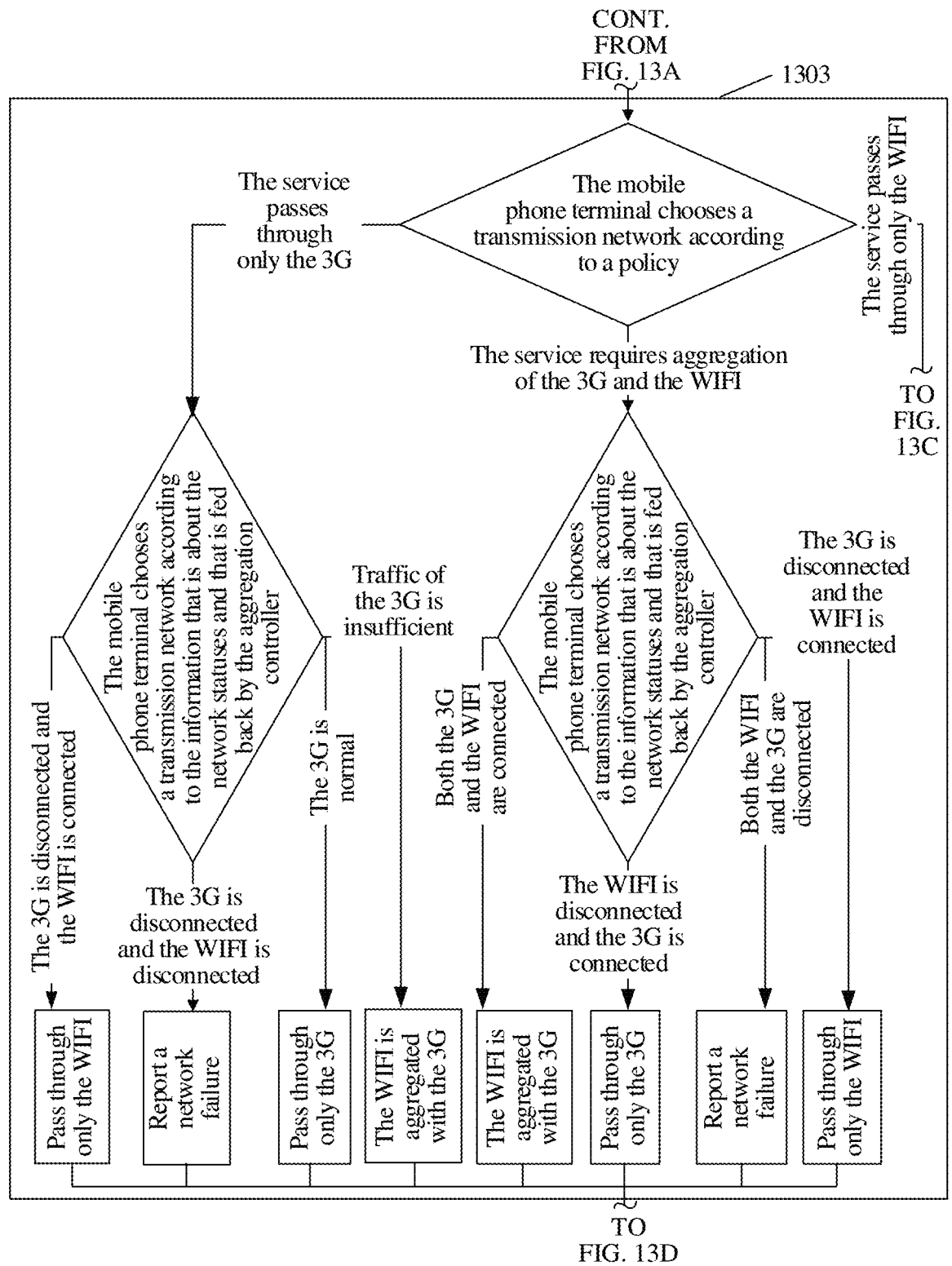
Figure 13C:
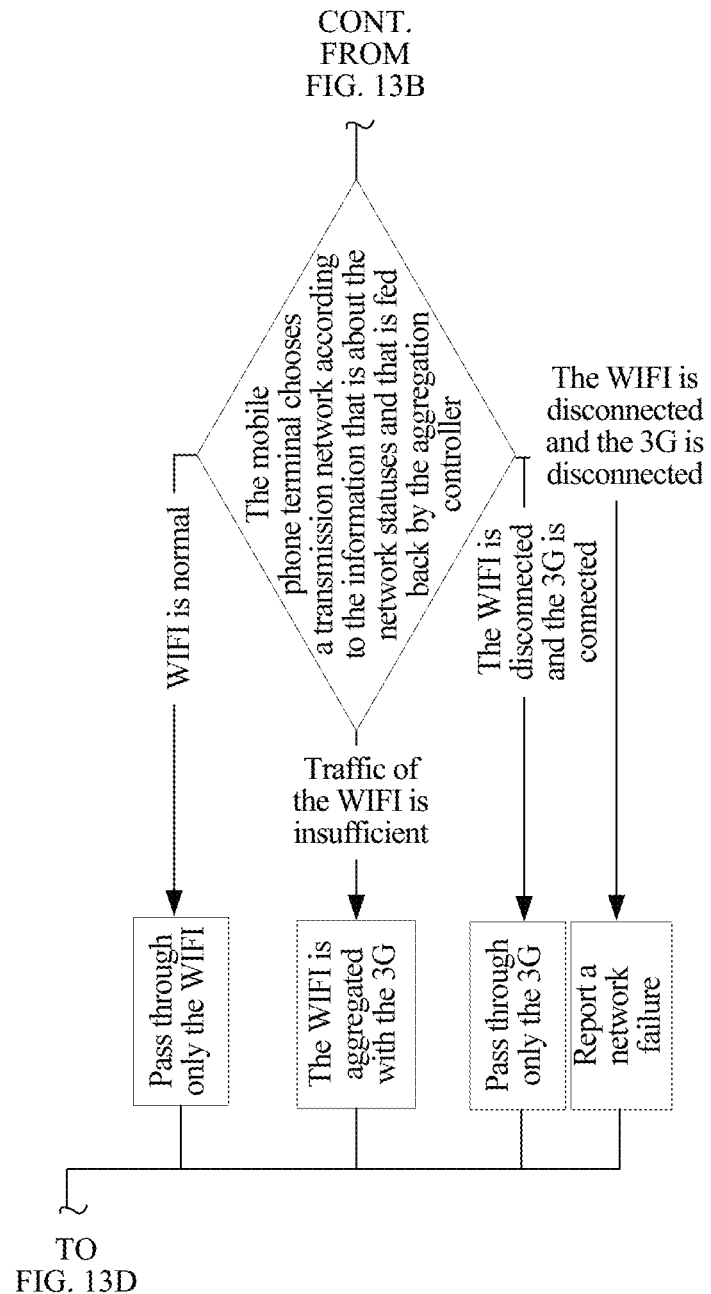
Figure 13D:
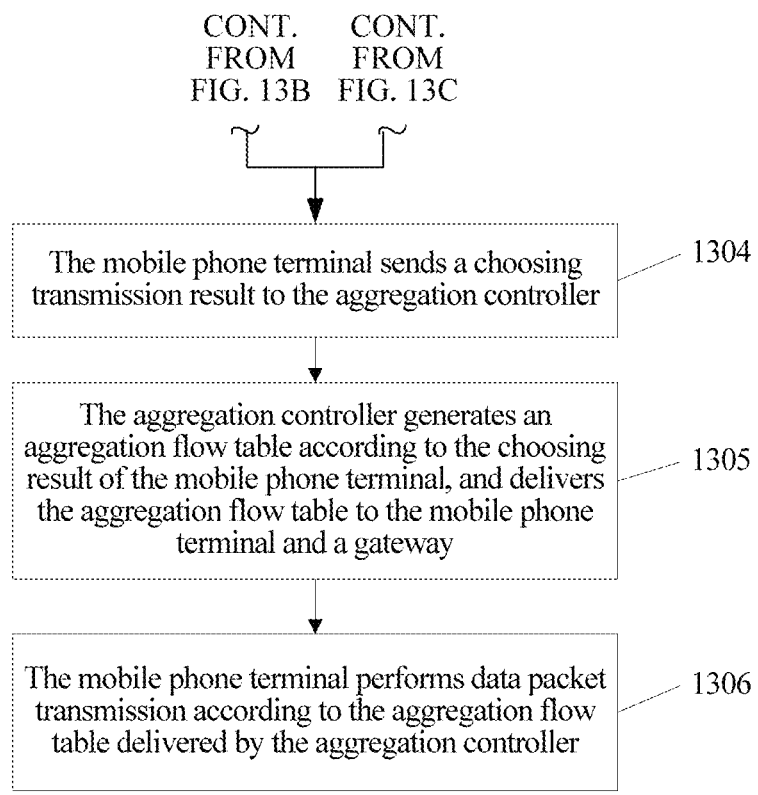

An aggregation controller monitors network statuses of a 3G network and a WiFi network in real time, and when the network statuses reach a preset aggregation threshold, the aggregation controller initiates aggregation, and it is assumed that a data packet is sent using a 3G NIC and using a 3G network. A process in which a terminal sends an uplink data packet is described in the embodiment shown in FIG. 11B, and after the process of sending the uplink data packet is completed, the following describes a process in which the terminal receives a downlink data packet. Referring to the following content description, and referring to FIG. 11C, FIG. 11C is a schematic diagram of a procedure in which a terminal receives a downlink data packet when an aggregation controller actively initiates aggregation, and the procedure may include the following steps.

Step 1121: An aggregation controller monitors network statuses of a 3G network and a WiFi network, and after a preset aggregation policy is met, the aggregation controller initiates aggregation.

Step 1122: The aggregation controller generates an aggregation flow table, and delivers the aggregation flow table to a mobile phone terminal and a gateway.

Step 1123: The gateway receives, using the Internet, a downlink data packet sent by a server, where a TCP four-tuple structure of a to-be-transmitted downlink data packet in the gateway is shown in the following Table 8.

TABLE 8

| Source IP address | Source port number | Destination IP address | Destination port number |
|---|---|---|---|
| server_ip | server_port | IP3 | src_port' |

Step 1124: The gateway determines, according to an offloading ratio that is set in the aggregation flow table delivered by the aggregation controller, a network to which the downlink data packet is to be offloaded, if the gateway determines to send the downlink data packet using the 3G network, steps 1125 and 1126 are executed, and if the gateway determines to send the downlink data packet using the WiFi network, steps 1127 and 1128 are executed.

Step 1125: If the gateway determines to send the downlink data packet using the 3G network, the gateway changes a destination IP address of the downlink data packet into an IP 1, and changes a destination port into src_port, where a TCP four-tuple structure of the downlink data packet sent from the gateway is shown in the following Table 9

TABLE 9

| Source IP address | Source port number | Destination IP address | Destination port number |
|---|---|---|---|
| server_ip | server_port | IP1 | src_port |

Step 1126: The gateway sends the downlink data packet to a GGSN, the GGSN forwards the downlink data packet to a base station, and then the base station forwards the downlink data packet to the mobile phone terminal.

Step 1127: If the gateway determines to send the downlink data packet using the WiFi network, the gateway changes a destination IP address of the downlink data packet into an IP 2, and changes a destination port into src_port, where a TCP four-tuple structure of the downlink data packet sent from the gateway is shown in the following Table 10.

TABLE 10

| Source IP address | Source port number | Destination IP address | Destination port number |
|---|---|---|---|
| server_ip | server_port | IP2 | src_port |

Step 1128: The gateway sends the downlink data packet to a BRAS, the BRAS forwards the downlink data packet to an AP, and then the AP forwards the downlink data packet to the mobile phone terminal.

Step 1129: After receiving data packets from different networks, the mobile phone terminal aggregates downlink data packets that belong to a same destination port into a same TCP connection, and sends them to an application program, where a TCP four-tuple structure of the downlink data packet sent from a virtual bridge is shown in the following Table 11.

TABLE 11

| Source IP address | Source port number | Destination IP address | Destination port number |
|---|---|---|---|
| server_ip | server_port | IP0 | src_port |

Step 1130: The downlink data packet is successfully sent to the application program on the mobile phone terminal.

Referring to FIG. 12A1 and FIG. 12A2, FIG. 12A1 and FIG. 12A2 are a schematic diagram of a procedure in which a terminal sends a data packet when an aggregation controller passively initiates aggregation. A process in which the terminal sends an uplink data packet is first described, and the process may include the following steps.

Step 1201: Before aggregation, a mobile phone terminal chooses a proper port according to a requirement of an application program and a network status, to perform single-path transmission.

Step 1202: The mobile phone terminal determines, according to a pre-formulated aggregation policy and network statuses of a 3G network and a WiFi network, whether to initiate aggregation.

Step 1203: The mobile phone terminal initiates an aggregation request to an aggregation controller.

Step 1204: The aggregation controller generates an aggregation flow table.

Step 1205: The aggregation controller delivers the aggregation flow table to the mobile phone terminal and a gateway.

Step 1206: When there is a to-be-transmitted first uplink data packet in the mobile phone terminal, the mobile phone terminal first determines, according to the aggregation flow table, whether the first uplink data packet is transmitted to the gateway using the 3G network or the WiFi network.

Step 1207: If the mobile phone terminal determines to send the first uplink data packet using the 3G network, the mobile phone terminal sends the first uplink data packet to a base station, the base station forwards the first uplink data packet to a GGSN, and then the GGSN forwards the first uplink data packet to the gateway.

Step 1208: If the mobile phone terminal determines to send the first uplink data packet using the WiFi network, the mobile phone terminal sends the first uplink data packet to an AP, the AP forwards the first uplink data packet to a BRAS, and then the BRAS forwards the first uplink data packet to the gateway.

Step 1209: After receiving uplink data packets sent from different networks, the gateway aggregates the first uplink data packet and a second uplink data packet that have same host identifiers and same source port numbers, into a same TCP connection, and encapsulates the first uplink data packet and the second uplink data packet into a third uplink data packet.

Step 1210: The gateway sends, to an external Internet, the uplink data packet obtained after aggregation, and forwards, to a server using the Internet, the uplink data packet obtained after aggregation.

Step 1211: When the network statuses change, the mobile phone terminal determines, according to the pre-formulated aggregation policy and the network statuses of the 3G network and the WiFi network, to end aggregation.

Step 1212: The mobile phone terminal chooses the proper port according to the requirement of the application program and the network status, to perform single-path transmission.

Referring to FIG. 12B1 and FIG. 12B2, FIG. 12B1 and FIG. 12B2 are a schematic diagram of a procedure in which a terminal receives a data packet when an aggregation controller passively initiates aggregation. A process in which the terminal sends an uplink data packet is described in the foregoing embodiment shown in FIG. 12A1 and FIG. 12A2, and after the process of sending the uplink data packet is completed, the following describes a process in which the terminal receives a downlink data packet. Referring to the following description, the process may include the following steps.

Step 1213: A mobile phone terminal chooses a proper port according to a requirement of an application program and a network status, to perform single-path transmission.

Step 1214: The mobile phone terminal determines, according to a pre-formulated aggregation policy and network statuses of a 3G network and a WiFi network, when to perform aggregation.

Step 1215: The mobile phone terminal initiates an aggregation request to an aggregation controller.

Step 1216: The aggregation controller generates an aggregation flow table.

Step 1217: The aggregation controller delivers the aggregation flow table to the mobile phone terminal and a gateway.

Step 1218: When receiving a to-be-transmitted first downlink data packet from an external Internet, the gateway first determines, according to the aggregation flow table, whether the first downlink data packet is transmitted to the mobile phone terminal using the 3G network or the WiFi network.

Step 1219: If the gateway determines to send the first downlink data packet using the 3G network, the gateway sends the first downlink data packet to a GGSN, the GGSN forwards the first downlink data packet to a base station, and then the base station forwards the first downlink data packet to the mobile phone terminal.

Step 1220: If the gateway determines to send the first downlink data packet using the WiFi network, the gateway sends the first downlink data packet to a BRAS, the BRAS forwards the first downlink data packet to an AP, and then the AP forwards the first downlink data packet to the mobile phone terminal.

Step 1221: After receiving downlink data packets sent from different networks, the mobile phone terminal aggregates the first downlink data packet and a second downlink data packet that have same destination ports, into a same TCP connection, and encapsulates the first downlink data packet and the second downlink data packet into a third downlink data packet.

Step 1222: The mobile phone terminal sends, to the application program, the downlink data packet obtained after aggregation.

Step 1223: The mobile phone terminal determines, according to the pre-formulated aggregation policy and the network statuses of the 3G network and the WiFi network, to end aggregation.

Step 1224: The mobile phone terminal chooses the proper port according to the requirement of the application program and the network status, to perform single-path transmission.

It should be noted that a difference between the foregoing embodiment described in FIG. 10A1 and FIG. 10A2 and the embodiment described in FIG. 12A1 and FIG. 12A2 lies in that in the embodiment shown in FIG. 10A1 and FIG. 10A2, a terminal sends a data packet when an aggregation controller actively initiates aggregation, and in the embodiment shown in FIG. 12A1 and FIG. 12A2, a terminal sends a data packet when an aggregation controller passively initiates aggregation. Similarly, a difference between the foregoing embodiment described in FIG. 10B1 and FIG. 10B2 and the embodiment described in FIG. 12B1 and FIG. 12B2 lies in that in the embodiment shown in FIG. 10B1 and FIG. 10B2, a terminal receives a data packet when an aggregation controller actively initiates aggregation, and in the embodiment shown in FIG. 12B1 and FIG. 12B2, a terminal receives a data packet when an aggregation controller passively initiates aggregation.

Referring to FIG. 13A, FIG. 13B, FIG. 13C, and FIG. 13D, FIG. 13A, FIG. 13B, FIG. 13C, and FIG. 13D are schematic diagram of a procedure in which a terminal chooses a transmission network, and the procedure may include the following steps.

Step 1301: A policy configuration module of a terminal includes two tables, that is, an APP-service type table and a service type-route application table (RAT), and an aggregation policy of an application program may be determined based on the two tables, where the following Table 12 is the APP-service type table and Table 13 is the service type-RAT.

TABLE 12

| gmail | email |
|---|---|
| pps | Stream |

TABLE 13

| email | Send using only a 3G network |
|---|---|
| Stream | Send using only a WiFi network |

Step 1302: A base station on a 3G network and an access point on a WiFi network report their respective network statues to an aggregation controller at intervals, and the aggregation controller feeds information about the network statuses back to the terminal.

Step 1303: The terminal chooses a transmission network according to a preset aggregation policy and the network statuses information that is sent by the aggregation controller, where the preset aggregation policy and the information about the network statuses may be further shown in the following Table 14.

TABLE 14

| Preset configuration policy | network statuses Information fed back by an aggregation controller | Transmission network chosen by a terminal for an uplink data packet |
|---|---|---|
| An application program expects that an uplink data packet is sent using a 3G network | The 3G network is disconnected and a WiFi network is normally connected | Choose the 3G network to transmit the uplink data packet, to avoid a failure in sending the data packet |
| | The 3G network is disconnected and a WiFi network is disconnected | Report a network connection failure |
| | The 3G network is normally connected | Choose the 3G network to transmit the uplink data packet |
| | Traffic of the 3G network is insufficient | Integrate the 3G network with the WiFi network |
| An application program expects that an uplink data packet is sent using a 3G network and a WiFi network | The 3G network is normally connected and the WiFi network is normally connected | Integrate the 3G network with the WiFi network |
| | The 3G network is normally connected and the WiFi network is disconnected | Choose the 3G network to transmit the uplink data packet |
| | The 3G network is disconnected and the WiFi network is disconnected | Report a network connection failure |
| | The 3G network is disconnected and the WiFi network is normally connected | Choose the WiFi network to transmit the uplink data packet |
| An application program expects that an uplink data packet is sent using a WiFi network | The WiFi network is normally connected | Choose the WiFi network to transmit the uplink data packet |
| | Traffic of the WiFi network is insufficient and a 3G network is normally connected | Integrate the 3G network with the WiFi network |
| | The WiFi network is disconnected and a 3G network is normally connected | Choose the 3G network to transmit the uplink data packet |
| | A 3G network is disconnected and the WiFi network is disconnected | Report a network connection failure |

Step 1304: The mobile phone terminal sends a result of choosing the transmission network to the aggregation controller.

Step 1305: The aggregation controller generates an aggregation flow table according to the result, and delivers the aggregation flow table to the mobile phone terminal and a gateway.

Step 1306: The mobile phone terminal sends a data packet according to the aggregation flow table delivered by the aggregation controller.

It can be learned from the foregoing description that, both a terminal and a gateway acquires an aggregation flow table, where the aggregation flow table includes a management policy used for managing network traffic of a first network and network traffic of a second network, for a to-be-transmitted first uplink data packet, according to the aggregation flow table, the terminal may choose the first network to transmit the first uplink data packet to a gateway, or may choose the second network to transmit the first uplink data packet to a gateway. After the gateway receives the first uplink data packet, the gateway encapsulates the first uplink data packet and a second uplink data packet into a third uplink data packet. Then the gateway sends the third uplink data packet to the Internet. Because the terminal may choose a transmission network for a single uplink data packet according to the aggregation flow table without being limited to a method in the prior art that data can be transmitted using multiple networks only when multiple TCP connections are established, used traffic of each network can be flexibly controlled according to the aggregation flow table, and even if only one TCP connection is established, a transmission network can also be chosen for a single uplink data packet such that an objective of using multiple networks is achieved, network bandwidth can be increased by means of aggregation, the used traffic of each network can be controlled according to the aggregation flow table, and management of network traffic is implemented.

To better implement the foregoing solutions in the embodiments of the present disclosure, the following further provides related apparatuses that are configured to implement the foregoing solutions.

Figure 14:
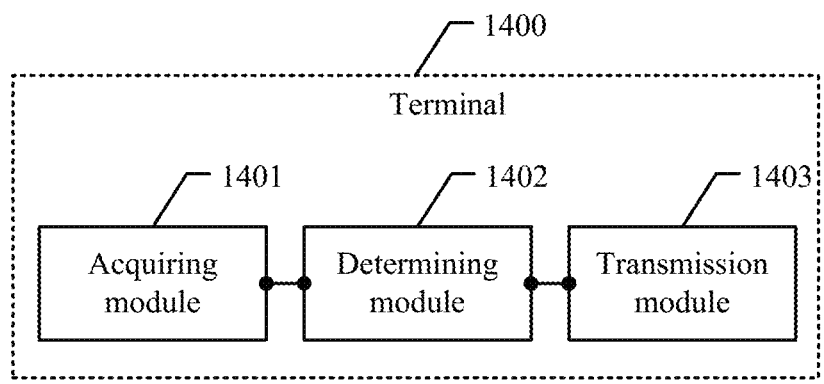
FIG. 14 is a schematic diagram of a compositional structure of a terminal according to an embodiment of the present disclosure.

Referring to FIG. 14, a terminal 1400 provided in an embodiment of the present disclosure includes an acquiring module 1401, a determining module 1402, and a transmission module 1403.

The acquiring module 1401 is configured to acquire an aggregation flow table, where the aggregation flow table includes a management policy for managing network traffic of a first network and network traffic of a second network.

The determining module 1402 is configured to determine, from the first network and the second network and according to the aggregation flow table acquired by the acquiring module 1401, a transmission network used for transmitting a first uplink data packet, where an internetworking IP address of a first NIC that is in the terminal and that is corresponding to the first network is a first address, and an IP address of a second NIC that is in the terminal and that is corresponding to the second network is a second address.

The transmission module 1403 is configured to, if it is determined to transmit the first uplink data packet using the first network, send the first uplink data packet to the first network using the first NIC corresponding to the first network, and forward the first uplink data packet to a gateway using the first network, where a source IP address carried when the first uplink data packet is transmitted using the first network is the first address, or if it is determined to transmit the first uplink data packet using the second network, send the first uplink data packet to the second network using the second NIC corresponding to the second network, and forward the first uplink data packet to the gateway using the second network, where a source IP address carried when the first uplink data packet is transmitted using the second network is the second address.

In some embodiments of the present disclosure, the acquiring module 1401 is further configured to acquire network load of the first network and network load of the second network using the first NIC and the second NIC, or using an application program installed on the terminal.

The determining module 1402 is further configured to determine, according to the network load of the first network, the network load of the second network, and a configured aggregation policy, whether to use a network transmission manner of aggregating the first network with the second network.

The acquiring module 1401 is further configured to, if it is determined to use the network transmission manner of aggregating the first network with the second network, send an aggregation request to an aggregation controller, where there is a communication connection between the aggregation controller and the terminal, and receive an aggregation flow table returned after the aggregation controller receives the aggregation request, or if it is determined to use the network transmission manner of aggregating the first network with the second network, generate the aggregation flow table, or if it is determined to use the network transmission manner of aggregating the first network with the second network, send an aggregation request to the gateway, and receive an aggregation flow table returned after the gateway receives the aggregation request.

In some embodiments of the present disclosure, the acquiring module 1401 is further configured to acquire the network load of the first network and the network load of the second network using the first NIC and the second NIC, or the application program installed on the terminal.

The determining module 1402 is further configured to determine, according to the network load of the first network, the network load of the second network, and the preset aggregation policy, whether to stop using the network transmission manner of aggregating the first network with the second network.

The transmission module 1403 is further configured to, if it is determined to stop using the network transmission manner of aggregating the first network with the second network and if there is a to-be-transmitted second uplink data packet, send, using a NIC that is in the terminal and that is corresponding to a transmission network configured using the aggregation policy, the second uplink data packet to the transmission network configured using the aggregation policy, where a source IP address carried by the second uplink data packet is an IP address of the NIC that is in the terminal and that is corresponding to the transmission network configured using the aggregation policy.

Figure 15A:
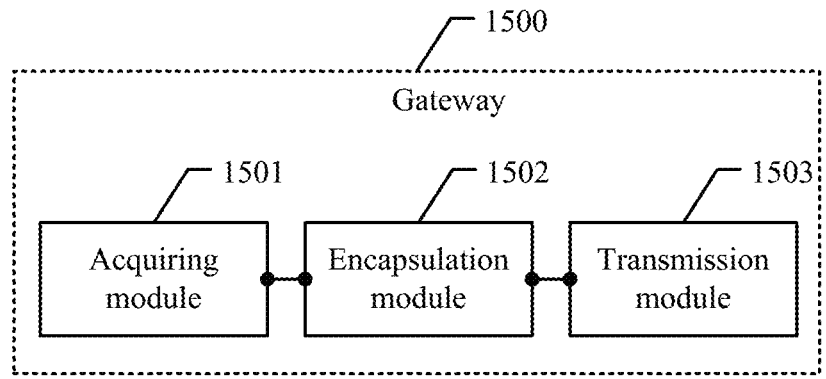
FIG. 15A is a schematic diagram of a compositional structure of a gateway according to an embodiment of the present disclosure.

Referring to FIG. 15A, a gateway 1500 provided in an embodiment of the present disclosure includes an acquiring module 1501, an encapsulation module 1502, and a transmission module 1503.

The acquiring module 1501 is configured to receive a second uplink data packet from a first network or a second network, and acquire a host identifier and a source port number that are of the second uplink data packet from the second uplink data packet, where the second uplink data packet is a data packet that is sent by a terminal using the first network or the second network determined according to an aggregation flow table.

The encapsulation module 1502 is configured to encapsulate the second uplink data packet and a first uplink data packet into a third uplink data packet, where the first uplink data packet is a data packet that is received by the gateway from the first network or the second network and that has a same host identifier and a same source port number as the second uplink data packet.

The transmission module 1503 is configured to send the third uplink data packet to the Internet, and send the third uplink data packet to a target server using the Internet, where a source IP address of the third uplink data packet is a third address, and the third address is an IP address that is allocated by the Internet to the gateway and that is used to receive data from the Internet and send data to the Internet.

Figure 15B:
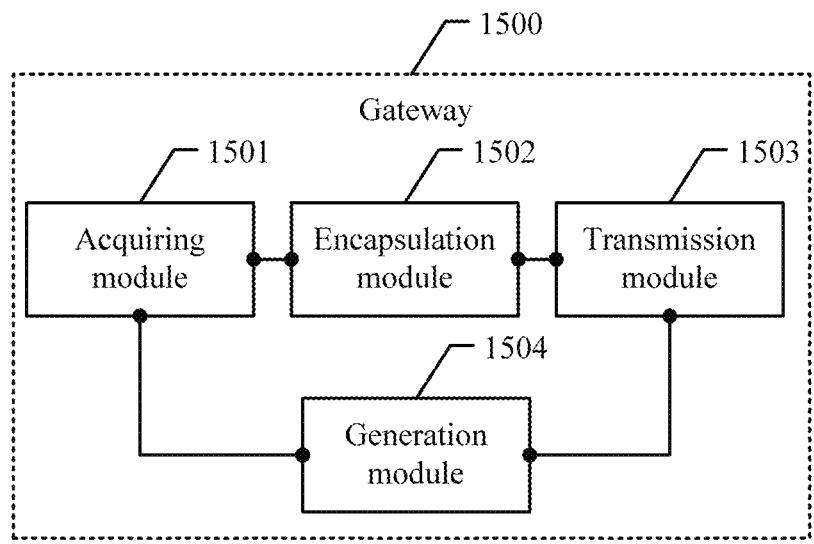
FIG. 15B is a schematic diagram of a compositional structure of another gateway according to an embodiment of the present disclosure.

Referring to FIG. 15B, in some embodiments of the present disclosure, the gateway 1500 may further include a generation module 1504.

The acquiring module 1501 is further configured to receive an aggregation request, where the aggregation request is sent to the gateway after the terminal determines to use a network transmission manner of aggregating the first network with the second network.

The generation module 1504 is configured to learn, according to the aggregation request, that the terminal determines to use the network transmission manner of aggregating the first network with the second network, and generate an aggregation flow table, where the aggregation flow table includes a management policy for managing network traffic of the first network and network traffic of the second network.

The transmission module 1503 is further configured to return, to the terminal, the aggregation flow table requested in the aggregation request.

Figure 16:
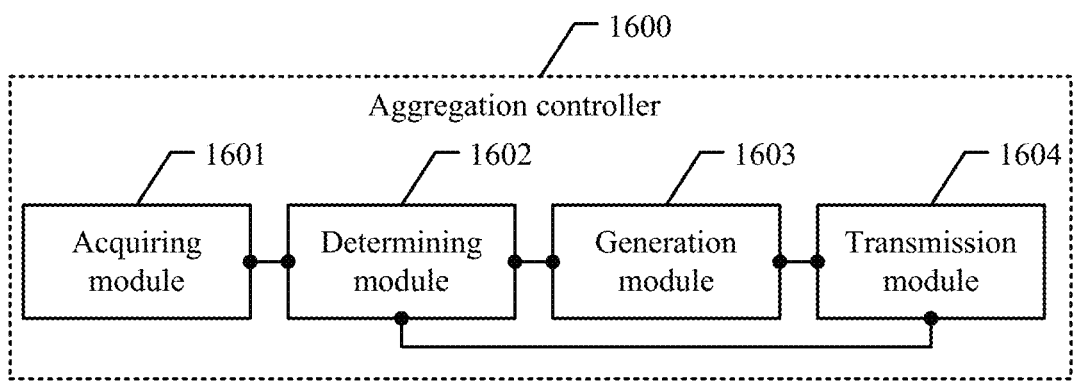
FIG. 16 is a schematic diagram of a compositional structure of an aggregation controller according to an embodiment of the present disclosure.

Referring to FIG. 16, an aggregation controller 1600 provided in an embodiment of the present disclosure includes an acquiring module 1601, a determining module 1602, a generation module 1603, and a transmission module 1604.

The acquiring module 1601 is configured to receive respective network load reported by a first network and a second network.

The determining module 1602 is configured to determine, according to the network load of the first network, the network load of the second network, and a configured aggregation policy, whether to use a network transmission manner of aggregating the first network with the second network.

The generation module 1603 is configured to, if it is determined to use the network transmission manner of aggregating the first network with the second network, generate an aggregation flow table, where the aggregation flow table includes a management policy for managing network traffic of the first network and network traffic of the second network.

The transmission module 1604 is configured to separately send the aggregation flow table to a terminal and a gateway, where there is a communication connection between the aggregation controller and each of the terminal and the gateway.

In some embodiments of the present disclosure, the acquiring module 1601 is further configured to receive the respective network load reported by the first network and the second network.

The determining module 1602 is further configured to determine, according to the network load of the first network, the network load of the second network, and the configured aggregation policy, whether to stop using the network transmission manner of aggregating the first network with the second network.

The transmission module 1604 is further configured to, if it is determined to stop using the network transmission manner of aggregating the first network with the second network, instruct the terminal and the gateway to stop using the network transmission manner of aggregating the first network with the second network.

Figure 17:
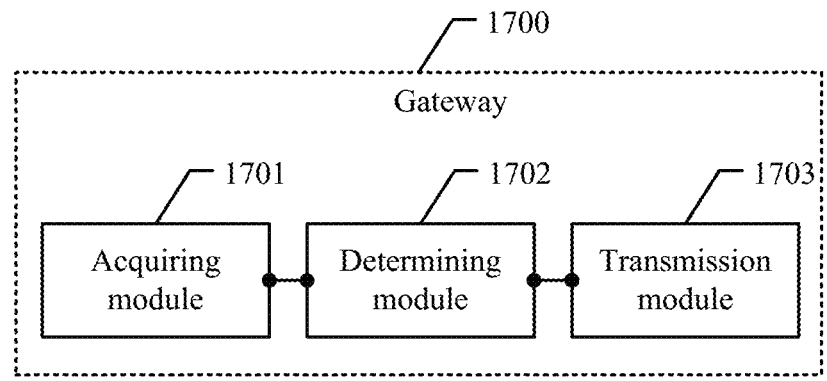
FIG. 17 is a schematic diagram of a compositional structure of another gateway according to an embodiment of the present disclosure.

Referring to FIG. 17, another gateway 1700 provided in an embodiment of the present disclosure includes an acquiring module 1701, a determining module 1702, and a transmission module 1703.

The acquiring module 1701 is configured to acquire an aggregation flow table, where the aggregation flow table includes a management policy for managing network traffic of a first network and network traffic of a second network.

The acquiring module 1701 is further configured to receive a first downlink data packet sent by a target server using the Internet.

The determining module 1702 is configured to determine, from the first network and the second network and according to the aggregation flow table, a transmission network used for transmitting the first downlink data packet.

The transmission module 1703 is configured to, if it is determined to transmit the first downlink data packet using the first network, send the first downlink data packet to the first network, and forward the first downlink data packet to a first NIC in a terminal using the first network, where a destination IP address carried when the first downlink data packet is transmitted using the first network is a first address, and the first address is an IP address of the first NIC that is in the terminal and that is corresponding to the first network, or if it is determined to transmit the first downlink data packet using the second network, send the first downlink data packet to the second network, and forward the first downlink data packet to a second NIC in the terminal using the second network, where a destination IP address carried when the first downlink data packet is transmitted using the second network is a second address, and the second address is an IP address of the second NIC that is in the terminal and that is corresponding to the second network.

In some embodiments of the present disclosure, the acquiring module 1701 is further configured to acquire aggregation end information, where the aggregation end information includes ending use of a network transmission manner of aggregating the first network with the second network, and the transmission module 1703 is further configured to, if there is a to-be-transmitted second downlink data packet, send, using a transmission network configured using a stored aggregation policy, the second downlink data packet to the transmission network configured using the aggregation policy, where a destination IP address carried by the second downlink data packet is an IP address of a NIC that is in the terminal and that is corresponding to the transmission network configured using the aggregation policy.

In some embodiments of the present disclosure, the acquiring module is further configured to receive respective network load reported by the first network and the second network, determine, according to the network load of the first network, the network load of the second network, and the configured aggregation policy, whether to stop using the network transmission manner of aggregating the first network with the second network, and if it is determined to stop using the network transmission manner of aggregating the first network with the second network, generate the aggregation end information, or receive the aggregation end information sent by an aggregation controller or the terminal, where there is a communication connection between the gateway and the aggregation controller.

Figure 18A:
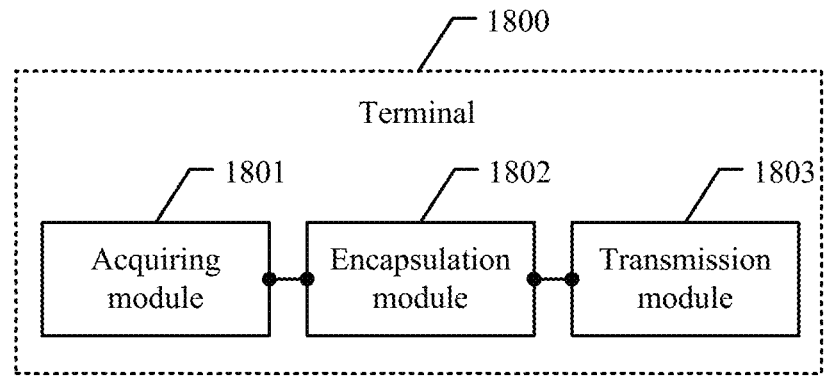
FIG. 18A is a schematic diagram of a compositional structure of another terminal according to an embodiment of the present disclosure.

Referring to FIG. 18A, a terminal 1800 provided in an embodiment of the present disclosure includes an acquiring module 1801, an encapsulation module 1802, and a transmission module 1803.

The acquiring module 1801 is configured to receive a second downlink data packet from a first network or a second network, and acquire a destination port number of the second downlink data packet from the second downlink data packet, where the second downlink data packet is a data packet that is sent by a gateway using the first network or the second network determined according to an aggregation flow table.

The encapsulation module 1802 is configured to encapsulate the second downlink data packet and a first downlink data packet into a third downlink data packet, where the first downlink data packet is a data packet that is received by the terminal from the first network or the second network and that has a same host identifier and a same destination port number as the second downlink data packet.

The transmission module 1803 is configured to send, according to a destination port of the third downlink data packet, the third downlink data packet to an application program corresponding to the third downlink data packet.

Figure 18B:
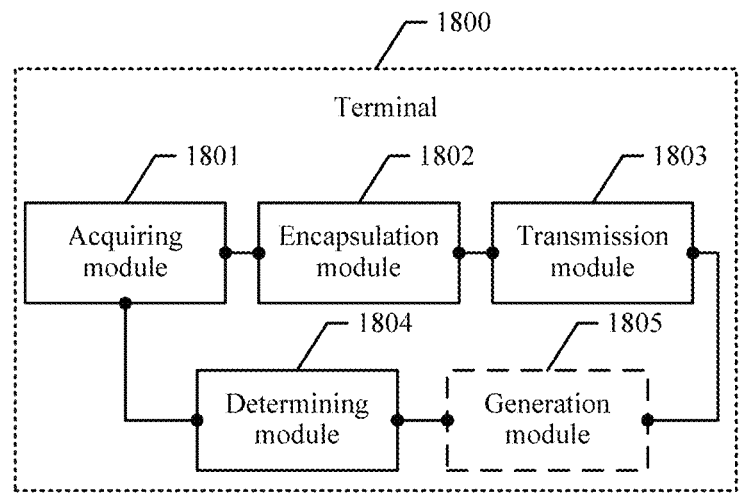
FIG. 18B is a schematic diagram of a compositional structure of another terminal according to an embodiment of the present disclosure.

Referring to FIG. 18B, in some embodiments of the present disclosure, the terminal 1800 may further include a determining module 1804 and a generation module 1805.

The acquiring module 1801 is further configured to acquire network load of the first network and network load of the second network using a first NIC and a second NIC, or using an application program installed on the terminal, where the first NIC is a NIC that is in the terminal and that is corresponding to the first network, and the second NIC is a NIC that is in the terminal and that is corresponding to the second network.

The determining module 1804 is configured to determine, according to the network load of the first network, the network load of the second network, and a configured aggregation policy, whether to use a network transmission manner of aggregating the first network with the second network.

The transmission module 1803 is further configured to, if it is determined to use the network transmission manner of aggregating the first network with the second network, send an aggregation request to an aggregation controller such that the aggregation controller generates the aggregation flow table after receiving the aggregation request and sends the aggregation flow table to the gateway, where there is a communication connection between the aggregation controller and the terminal.

Alternatively, the generation module 1805 is configured to, if it is determined to use the network transmission manner of aggregating the first network with the second network, generate the aggregation flow table, and the transmission module 1803 is configured to send the aggregation flow table to the gateway.

In some embodiments of the present disclosure, the acquiring module 1801 is further configured to acquire the network load of the first network and the network load of the second network using the first NIC and the second NIC, or the application program installed on the terminal.

The determining module 1804 is further configured to determine, according to the network load of the first network, the network load of the second network, and the configured aggregation policy, whether to stop using the network transmission manner of aggregating the first network with the second network.

The transmission module 1803 is further configured to, if it is determined to stop using the network transmission manner of aggregating the first network with the second network, initiate an end request to the aggregation controller such that the aggregation controller generates aggregation end information and sends the aggregation end information to the terminal and the gateway, where the aggregation end information includes ending the use of the network transmission manner of aggregating the first network with the second network, receive, using a transmission network configured using the aggregation policy, a fourth downlink data packet forwarded by the gateway, and send the fourth downlink data packet to an application program corresponding to the fourth downlink data packet.

It can be learned that, a determining module may determine, according to network load of a first network, network load of a second network, and a configured aggregation policy, whether to use a network transmission manner of aggregating the first network with the second network, and determine whether to stop using the network transmission manner of aggregating the first network with the second network, when the determining module determines to use the network transmission manner of aggregating the first network with the second network, a generation module may further generate an aggregation flow table such that a gateway chooses, from the first network and the second network and according to the aggregation flow table, a network for transmitting a downlink data packet.

Figure 19:
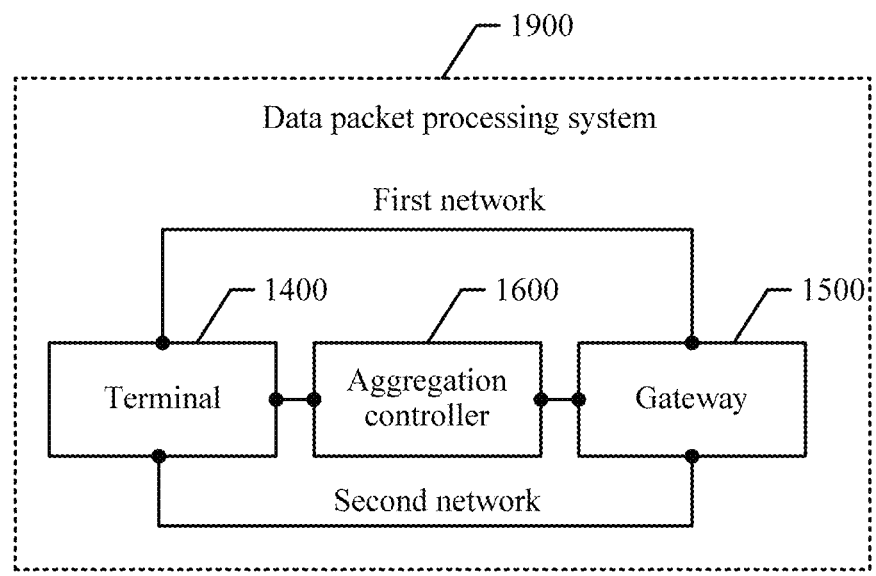
FIG. 19 is a schematic diagram of a compositional structure of a data packet processing system according to an embodiment of the present disclosure.

Referring to FIG. 19, an embodiment of the present disclosure further provides a data packet processing system 1900, which may include the terminal 1400 shown in FIG. 14, the gateway 1500 shown in FIG. 15A or FIG. 15B, and the aggregation controller 1600 shown in FIG. 16, where the terminal 1400 accesses the first network and the second network, and the aggregation controller 1600 is separately connected to the terminal 1400 and the gateway 1500 in a communication-capable manner, or the terminal 1800 shown in FIG. 18, the gateway 1700 shown in FIG. 17, and the aggregation controller 1600 shown in FIG. 16, where the terminal 1800 accesses the first network and the second network, and the aggregation controller 1600 is separately connected to the terminal 1800 and the gateway 1700 in a communication-capable manner.

It can be learned from the foregoing embodiment that, both a terminal and a gateway acquire an aggregation flow table, where the aggregation flow table includes a management policy for managing network traffic of a first network and network traffic of a second network, for a to-be-transmitted first uplink data packet, according to the aggregation flow table, the terminal may choose the first network to transmit the first uplink data packet to a gateway, or the terminal may choose the second network to transmit the first uplink data packet to a gateway, after the gateway receives a second uplink data packet, the gateway encapsulates the second uplink data packet and the first uplink data packet into a third uplink data packet, where the first uplink data packet is a data packet that is received by the gateway from the first network and the second network and that has a same host identifier and a same source port number as the second uplink data packet. Then the gateway sends the third uplink data packet to the Internet. Because the terminal may choose a transmission network for a single uplink data packet according to the aggregation flow table without being limited to a method in the prior art that data can be transmitted using multiple networks only when multiple TCP connections are established, used traffic of each network can be flexibly controlled according to the aggregation flow table, and even if only one TCP connection is established, a transmission network can also be chosen for a single uplink data packet such that an objective of using multiple networks is achieved, network bandwidth can be increased by means of aggregation, the used traffic of each network can be controlled according to the aggregation flow table, and management of network traffic is implemented.

An embodiment of the present disclosure further provides a computer storage medium, where the computer storage medium stores a program instruction, and when the program instruction is executed, some or all method procedures recorded in the foregoing method embodiments are executed.

Figure 20:
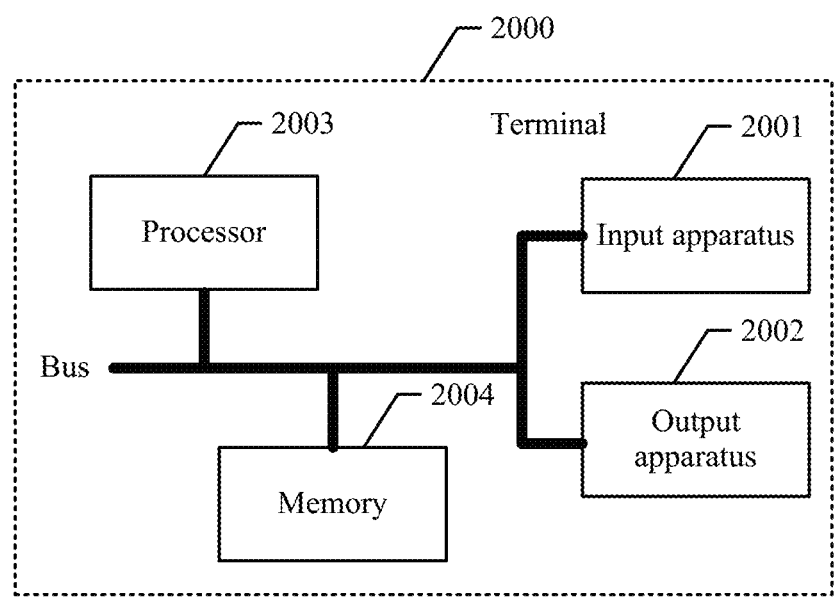
FIG. 20 is a schematic diagram of a compositional structure of another terminal according to an embodiment of the present disclosure.

The following describes another terminal provided in an embodiment of the present disclosure. Referring to FIG. 20, a terminal 2000 includes an input apparatus 2001, an output apparatus 2002, a processor 2003, and a memory 2004 (there may be one or more processors 2003 in the terminal 2000, and one processor is used as an example in FIG. 20). In some embodiments of the present disclosure, the input apparatus 2001, the output apparatus 2002, the processor 2003, and the memory 2004 may be connected to each other using a bus or in another manner. For example, the input apparatus 2001, the output apparatus 2002, the processor 2003, and the memory 2004 are connected to each other using a bus in FIG. 20.

By invoking an operation instruction stored in the memory 2004, the processor 2003 is configured to execute the steps of the terminal as described in the foregoing method embodiments.

Figure 21:
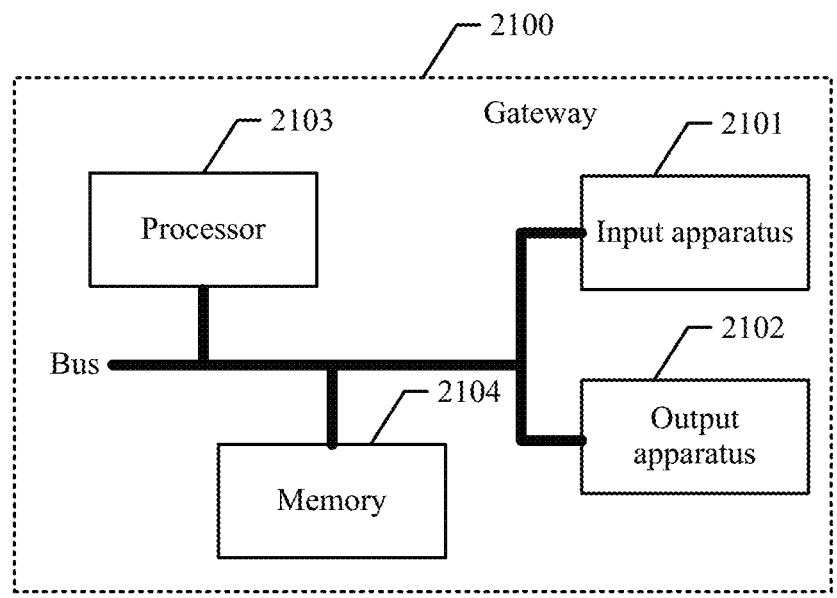
FIG. 21 is a schematic diagram of a compositional structure of another gateway according to an embodiment of the present disclosure.

The following describes another gateway provided in an embodiment of the present disclosure. Referring to FIG. 21, a gateway 2100 includes an input apparatus 2101, an output apparatus 2102, a processor 2103, and a memory 2104 (there may be one or more processors 2103 in the gateway 2100, and one processor is used as an example in FIG. 21). In some embodiments of the present disclosure, the input apparatus 2101, the output apparatus 2102, the processor 2103, and the memory 2104 may be connected to each other using a bus or in another manner. For example, the input apparatus 2101, the output apparatus 2102, the processor 2103, and the memory 2104 are connected to each other using a bus in FIG. 21.

By invoking an operation instruction stored in the memory 2104, the processor 2103 is configured to execute the steps of the gateway as described in the foregoing method embodiments.

Figure 22:
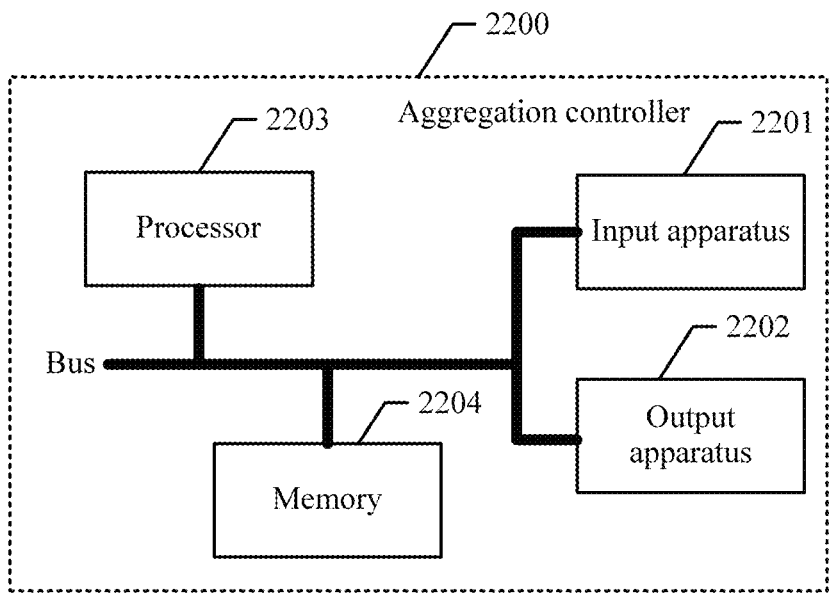
FIG. 22 is a schematic diagram of a compositional structure of an aggregation controller according to an embodiment of the present disclosure.

The following describes another aggregation controller provided in an embodiment of the present disclosure. Referring to FIG. 22, an aggregation controller 2200 includes an input apparatus 2201, an output apparatus 2202, a processor 2203, and a memory 2204 (there may be one or more processors 2203 in the aggregation controller 2200, and one processor is used as an example in FIG. 22). In some embodiments of the present disclosure, the input apparatus 2201, the output apparatus 2202, the processor 2203, and the memory 2204 may be connected to each other using a bus or in another manner. For example, the input apparatus 2201, the output apparatus 2202, the processor 2203, and the memory 2204 are connected to each other using a bus in FIG. 22.

By invoking an operation instruction stored in the memory 2204, the processor 2203 is configured to execute the steps of the aggregation controller as described in the foregoing method embodiments.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be further implemented as one or more communications buses or signal cables. Persons of ordinary skill in the art may understand and implement the embodiments of the present disclosure without creative efforts.

Based on the description of the foregoing implementation manners, persons skilled in the art may clearly understand that the present disclosure may be implemented by software in addition to necessary universal hardware, or by dedicated hardware, including a dedicated integrated circuit, a dedicated processor, a dedicated memory, a dedicated component, and the like. Generally, any functions that can be performed by a computer program can be easily implemented using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the prior art may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

In conclusion, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

The invention claimed is:

1. A data packet processing method, comprising:
    acquiring, by a terminal from a configuration, an aggregation policy indicating one or more conditions in which network traffic is to be transmitted simultaneously via a first network and a second network, wherein the first network corresponds to a first network interface card comprising a first Internet Protocol (IP) address, and wherein the second network corresponds to a second network interface card that comprises a second IP address;
    determining, by the terminal, that network traffic is to be transmitted simultaneously via the first network and the second network according to the aggregation policy and network environment parameters of the first network and the second network, wherein a first source IP address carried in a first uplink data packet and a second source IP address carried in a second uplink data packet is a third IP address identifying a virtual bridge, and wherein the terminal comprises the virtual bridge;
    establishing, by the terminal, a Transmission Control Protocol (TCP) connection with a gateway using the third IP address of the virtual bridge;
    changing, by the virtual bridge, the first source IP address from the third IP address identifying the virtual bridge to the first IP address identifying the first network interface card;
    changing, by the virtual bridge, the second source IP address from the third IP address identifying the virtual bridge to the second IP address identifying the second network interface card;
    sending, by the terminal using the first network interface card, the first uplink data packet to the gateway via the first network;
    sending, by the terminal using the second network interface card, the second uplink data packet to the gateway via the second network, wherein the first uplink data packet and the second uplink data packet belong to the TCP connection; and
    sending, by the terminal, a single uplink data packet to the gateway using at least one of the first network or the second network, wherein the first network and the second network are both available for sending the single uplink data packet to the gateway even when the TCP connection is the only single-path TCP connection established between the terminal and the gateway.

2. The data packet processing method of claim 1, wherein the virtual bridge manages the first network interface card and the second network interface card.

3. The data packet processing method of claim 2, further comprising:
receiving, by the terminal, a first downlink data packet from the first network;
receiving, by the terminal, a second downlink data packet from the second network, wherein the first downlink data packet has a same host identifier as the second downlink data packet;
changing, by the virtual bridge, a destination IP address carried in the first downlink data packet from the IP address of the first network interface card to the IP address of the virtual bridge; and
changing, by the virtual bridge, a destination IP address carried in the second downlink data packet from the IP address of the second network interface card to the IP address of the virtual bridge.

4. The data packet processing method of claim 1, wherein the network environment parameters comprise at least one of network load, network traffic volume, or transmission delay, and wherein the one or more conditions comprise at least one of:
a load ratio of the first network being greater than a first threshold and a load ratio of the second network being less than a second threshold;
a network traffic volume of the first network being greater than a third threshold and a network traffic volume of the second network being less than a fourth threshold; or
a transmission delay of the first network being greater than a fifth threshold and a transmission delay of the second network being less than a sixth threshold.

5. The data packet processing method of claim 1, further comprising controlling a ratio of uplink data packets sent using the first network to uplink data packets sent using the second network according to a management policy for managing network traffic of the first network and network traffic of the second network.

6. The data packet processing method of claim 1, wherein the first network is a cellular network, and wherein the second network is a wireless local area network (WLAN).

7. The data packet processing method of claim 1, further comprising:
forwarding the aggregation policy to an aggregation controller; and
receiving an aggregation flow table from the aggregation controller in response to forwarding the aggregation policy to the aggregation controller.

8. The data packet processing method of claim 1, further comprising generating an aggregation flow based on the aggregation policy.

9. A terminal, comprising:
a processor;
a first network interface card configured to communicate with a first network, wherein the first network interface card is coupled to the processor and associated with a first Internet Protocol (IP) address;
a second network interface card configured to communicate with a second network, wherein the second network interface card is coupled to the processor and associated with a second IP address;
a virtual bridge coupled to the processor and associated with a third IP address, wherein a first source IP address carried in a first uplink data packet and a second source IP address carried in a second uplink data packet is the third IP address of the virtual bridge, and wherein the virtual bridge is configured to:
establish a Transmission Control Protocol (TCP) connection with a gateway using the third IP address identifying the virtual bridge;
change the first source IP address carried in the first uplink data packet from the third IP address identifying the virtual bridge to the first IP address identifying the first network interface card; and
change the second source IP address carried in the second uplink data packet from the third IP address identifying the virtual bridge to the second IP address identifying the second network interface card;
a memory storing instructions and coupled to the processor, wherein the processor is configured to execute the instructions to:
acquire, from a configuration, an aggregation policy indicating one or more conditions in which network traffic is to be transmitted simultaneously via the first network and the second network;
determine that network traffic is to be transmitted simultaneously to the first network and the second network according to the aggregation policy and network environment parameters of the first network and the second network;
send the first uplink data packet to the gateway via the first network using the first network interface card;
send the second uplink data packet to the gateway via the second network using the second network interface card, wherein the first uplink data packet and the second uplink data packet belong to the TCP connection; and
send a single uplink data packet to the gateway using at least one of the first network or the second network, wherein the first network and the second network are both available for sending the single uplink data packet to the gateway even when the TCP connection is the only single-path TCP connection established between the terminal and the gateway.

10. The terminal of claim 9, wherein the virtual bridge manages the first network interface card and the second network interface card.

11. The terminal of claim 10, wherein the first network interface card is further configured to receive a first downlink data packet from the first network, wherein the second network interface card is further configured to receive a second downlink data packet from the second network, wherein the first downlink data packet has a same host identifier as the second downlink data packet, and wherein the virtual bridge is further configured to:
change a destination IP address carried in the first downlink data packet from the first IP address to the third IP address; and
change a destination IP address carried in the second downlink data packet from the second IP address to the third IP address.

12. The terminal of claim 9, wherein the network environment parameters comprise at least one of network load, network traffic volume, or transmission delay, and wherein the one or more conditions comprise at least one of:
a load ratio of the first network being greater than a first threshold and a load ratio of the second network being less than a second threshold;
a network traffic volume of the first network being greater than a third threshold and a volume network traffic of the second network being less than a fourth threshold; or a transmission delay of the first network being greater than a fifth threshold and a transmission delay of the second network being less than a sixth threshold.

13. The terminal of claim 9, wherein the instructions further cause the processor to control a ratio of uplink data packets sent using the first network to uplink data packets sent using the second network according to a management policy for managing network traffic of the first network and network traffic of the second network.

14. The terminal of claim 9, wherein the first network is a cellular network, and wherein the second network is a wireless local area network (WLAN).

15. The terminal of claim 9, wherein the processor is further configured to execute the instructions to:
   forward the aggregation policy to an aggregation controller; and
   receive an aggregation flow table from the aggregation controller in response to forwarding the aggregation policy to the aggregation controller.

16. The terminal of claim 9, wherein the processor is further configured to execute the instructions to generate an aggregation flow based on the aggregation policy.

17. A gateway, comprising:
   a processor; and
   a memory comprising instructions and coupled to the processor, wherein the processor is configured to execute the instructions to:
      receive a first downlink data packet from a server, wherein the first downlink data packet comprises an Internet Protocol (IP) address of the gateway as a destination IP address;
      receive a second downlink data packet from the server, wherein the second downlink data packet comprises the IP address of the gateway as the destination IP address;
      determine that the destination IP address carried in the first downlink data packet and the second downlink data packet is the IP address of the gateway;
      change the destination IP address carried in the first downlink data packet from the IP address of the gateway to a first IP address of a first network interface card at a terminal, wherein the first network interface card is configured to communicate with a first network;
      change the destination IP address carried in the second downlink data packet from the IP address of the gateway to a second IP address of a second network interface card at the terminal, wherein the second network interface card is configured to communicate with a second network;
      send the first downlink data packet to a terminal using the first network;
      send the second downlink data packet to the terminal using the second network; and
      receive a single uplink data packet from the terminal using at least one of the first network or the second network, wherein the first network and the second network are both available for receiving the single uplink data packet from the terminal even when the TCP connection is the only single-path TCP connection established between the terminal and the gateway.

18. The gateway of claim 17, wherein the instructions further cause the processor to:
   receive a first uplink data packet from the first network, wherein a first source IP address carried in the first uplink data packet is the first IP address of the first network interface card;
   receive a second uplink data packet from the second network, wherein a second source IP address carried in the second uplink data packet is the second IP address of the second network interface card, and wherein the first uplink data packet has a same host identifier as the second uplink data packet;
   change the first source IP address from the first IP address of the first network interface card to the IP address of the gateway;
   change the second source IP address from the second IP address of the second network interface card to the IP address of the gateway; and
   send the first uplink data packet and the second uplink data packet to a target server using an Internet.

19. The gateway of claim 17, wherein the instructions further cause the processor to:
   determine, according to an offloading ratio, to send the first downlink data packet to the terminal using the first network; and
   determine, according to the offloading ratio, to send the second downlink data packet to the terminal using the second network, wherein the offloading ratio is set in an aggregation flow table.

20. The gateway of claim 17, wherein the instructions further cause the processor to:
   receive a first network load of the first network;
   receive a second network load of the second network; and
   determine, according to a management policy for managing network traffic of the first network and network traffic of the second network, whether to send either of the first downlink data packet and the second downlink data packet to the terminal.

* * * * *